(12) United States Patent
Hsu et al.

(10) Patent No.: US 7,924,920 B2
(45) Date of Patent: *Apr. 12, 2011

(54) MOTION VECTOR CODING AND DECODING IN INTERLACED FRAME CODED PICTURES

(75) Inventors: Pohsiang Hsu, Redmond, WA (US); Thomas W. Holcomb, Bothell, WA (US); Chih-Lung Lin, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1213 days.

This patent is subject to a terminal disclaimer.

(21) Appl. No.: 10/933,882

(22) Filed: Sep. 2, 2004

(65) Prior Publication Data

US 2005/0053293 A1    Mar. 10, 2005

Related U.S. Application Data

(60) Provisional application No. 60/501,081, filed on Sep. 7, 2003.

(51) Int. Cl.
  H04N 7/30  (2006.01)
  H04N 7/34  (2006.01)
  H04N 7/36  (2006.01)
  H04N 7/50  (2006.01)
  H04N 7/38  (2006.01)

(52) U.S. Cl. ......... 375/240.15; 375/240.14; 375/240.16; 375/240.25

(58) Field of Classification Search ............ 375/240.12, 375/240.16
See application file for complete search history.

(56) References Cited

U.S. PATENT DOCUMENTS

| 4,454,546 A | 6/1984 | Mori |
| 4,661,849 A | 4/1987 | Hinman |
| 4,661,853 A | 4/1987 | Roeder et al. |
| 4,691,329 A | 9/1987 | Juri et al. |
| 4,695,882 A | 9/1987 | Wada et al. |
| 4,796,087 A | 1/1989 | Guichard et al. |

(Continued)

FOREIGN PATENT DOCUMENTS

CN       1226781       8/1999

(Continued)

OTHER PUBLICATIONS

U.S. Appl. No. 60/341,674, filed Dec. 17, 2001, Lee et al.

(Continued)

*Primary Examiner* — Joseph G Ustaris
*Assistant Examiner* — David N Werner
(74) *Attorney, Agent, or Firm* — Klarquist Sparkman, LLP

(57) ABSTRACT

In one aspect, an encoder/decoder receives information for four field motion vectors for a macroblock in an interlaced frame-coded, forward-predicted picture and processes the macroblock using the four field motion vectors. In another aspect, an encoder/decoder determines a number of valid candidate motion vectors and calculates a field motion vector predictor. The encoder/decoder does not perform a median operation on the valid candidates if there are less than three of them. In another aspect, an encoder/decoder determines valid candidates, determines field polarities for the valid candidates, and calculates a motion vector predictor based on the field polarities. In another aspect, an encoder/decoder determines one or more valid candidates, determines a field polarity for each individual valid candidate, allocates each individual valid candidate to one of two sets (e.g., opposite polarity and same polarity sets) depending on its field polarity, and calculates a motion vector predictor based on the two sets.

38 Claims, 31 Drawing Sheets

U.S. PATENT DOCUMENTS

| | | | |
|---|---|---|---|
| 4,800,432 A | 1/1989 | Barnett et al. | |
| 4,849,812 A | 7/1989 | Borgers et al. | |
| 4,862,267 A | 8/1989 | Gillard et al. | |
| 4,864,393 A | 9/1989 | Harradine et al. | |
| 4,999,705 A | 3/1991 | Puri | |
| 5,021,879 A | 6/1991 | Vogel | |
| 5,068,724 A | 11/1991 | Krause et al. | |
| 5,089,887 A | 2/1992 | Robert et al. | |
| 5,091,782 A | 2/1992 | Krause et al. | |
| 5,103,306 A | 4/1992 | Weiman et al. | |
| 5,105,271 A | 4/1992 | Niihara | |
| 5,111,292 A | 5/1992 | Kuriacose et al. | |
| 5,117,287 A | 5/1992 | Koike et al. | |
| 5,144,426 A | 9/1992 | Tanaka et al. | |
| 5,155,594 A | 10/1992 | Bernstein et al. | |
| 5,157,490 A | 10/1992 | Kawai et al. | |
| 5,175,618 A | 12/1992 | Ueda | |
| 5,193,004 A | 3/1993 | Wang et al. | |
| 5,223,949 A | 6/1993 | Honjo | |
| 5,227,878 A * | 7/1993 | Puri et al. | 375/240.15 |
| 5,258,836 A | 11/1993 | Murata | |
| 5,274,453 A | 12/1993 | Maeda | |
| 5,287,420 A | 2/1994 | Barrett | |
| 5,298,991 A | 3/1994 | Yagasaki et al. | |
| 5,317,397 A | 5/1994 | Odaka et al. | |
| 5,319,463 A | 6/1994 | Hongu et al. | |
| 5,343,248 A | 8/1994 | Fujinami | |
| 5,347,308 A | 9/1994 | Wai | |
| 5,376,968 A | 12/1994 | Wu et al. | |
| 5,376,971 A | 12/1994 | Kadono et al. | |
| 5,379,351 A | 1/1995 | Fandrianto et al. | |
| 5,386,234 A | 1/1995 | Veltman et al. | |
| 5,400,075 A | 3/1995 | Savatier | |
| 5,412,430 A | 5/1995 | Nagata | |
| 5,412,435 A | 5/1995 | Nakajima | |
| RE34,965 E | 6/1995 | Sugiyama | |
| 5,422,676 A | 6/1995 | Herpel et al. | |
| 5,424,779 A | 6/1995 | Odaka | |
| 5,426,464 A | 6/1995 | Casavant et al. | |
| 5,428,396 A | 6/1995 | Yagasaki | |
| 5,442,400 A | 8/1995 | Sun | |
| 5,448,297 A | 9/1995 | Alattar et al. | |
| 5,453,799 A | 9/1995 | Yang et al. | |
| 5,457,495 A | 10/1995 | Hartung | |
| 5,461,421 A | 10/1995 | Moon | |
| RE35,093 E | 11/1995 | Wang et al. | |
| 5,465,118 A | 11/1995 | Hancock et al. | |
| 5,467,086 A | 11/1995 | Jeong | |
| 5,467,136 A | 11/1995 | Odaka | |
| 5,477,272 A | 12/1995 | Zhang | |
| RE35,158 E | 2/1996 | Sugiyama | |
| 5,491,523 A | 2/1996 | Sato | |
| 5,510,840 A | 4/1996 | Yonemitsu et al. | |
| 5,517,327 A | 5/1996 | Nakatani et al. | |
| 5,539,466 A | 7/1996 | Igarashi et al. | |
| 5,544,286 A | 8/1996 | Laney | |
| 5,546,129 A | 8/1996 | Lee | |
| 5,550,541 A | 8/1996 | Todd | |
| 5,550,847 A | 8/1996 | Zhu | |
| 5,552,832 A | 9/1996 | Astle | |
| 5,565,922 A | 10/1996 | Krause | |
| 5,574,504 A | 11/1996 | Yagasaki et al. | |
| 5,594,504 A | 1/1997 | Ebrahimi | |
| 5,594,813 A | 1/1997 | Fandrianto et al. | |
| 5,598,215 A | 1/1997 | Watanabe | |
| 5,598,216 A | 1/1997 | Lee | |
| 5,617,144 A | 4/1997 | Lee | |
| 5,619,281 A | 4/1997 | Jung | |
| 5,621,481 A | 4/1997 | Yasuda et al. | |
| 5,623,311 A | 4/1997 | Phillips et al. | |
| 5,648,819 A | 7/1997 | Tranchard | |
| 5,650,829 A | 7/1997 | Sugimoto et al. | |
| 5,654,771 A | 8/1997 | Tekalp et al. | |
| 5,659,365 A | 8/1997 | Wilkinson | |
| 5,666,461 A | 9/1997 | Igarashi et al. | |
| 5,668,608 A | 9/1997 | Lee | |
| 5,668,932 A | 9/1997 | Laney | |
| 5,687,097 A | 11/1997 | Mizusawa et al. | |
| 5,689,306 A | 11/1997 | Jung | |
| 5,692,063 A | 11/1997 | Lee et al. | |
| 5,694,173 A | 12/1997 | Kimura et al. | |
| 5,699,476 A | 12/1997 | Van Der Meer | |
| 5,701,164 A | 12/1997 | Kato | |
| 5,715,005 A | 2/1998 | Masaki | |
| 5,717,441 A | 2/1998 | Serizawa et al. | |
| 5,731,850 A | 3/1998 | Maturi et al. | |
| 5,748,784 A | 5/1998 | Sugiyama | |
| 5,748,789 A | 5/1998 | Lee et al. | |
| 5,767,898 A | 6/1998 | Urano et al. | |
| 5,784,175 A | 7/1998 | Lee | |
| 5,786,860 A | 7/1998 | Kim et al. | |
| 5,787,203 A | 7/1998 | Lee et al. | |
| 5,793,897 A | 8/1998 | Jo et al. | |
| 5,796,855 A | 8/1998 | Lee | |
| 5,799,113 A | 8/1998 | Lee | |
| RE35,910 E | 9/1998 | Nagata et al. | |
| 5,825,830 A | 10/1998 | Kopf | |
| 5,825,929 A | 10/1998 | Chen et al. | |
| 5,835,144 A | 11/1998 | Matsumura et al. | |
| 5,835,146 A * | 11/1998 | Stone | 375/240.15 |
| 5,835,149 A | 11/1998 | Astle | |
| 5,844,613 A | 12/1998 | Chaddha | |
| 5,847,776 A | 12/1998 | Khmelnitsky | |
| 5,859,668 A | 1/1999 | Aono et al. | |
| 5,874,995 A | 2/1999 | Naimpally et al. | |
| 5,901,248 A | 5/1999 | Fandrianto et al. | |
| 5,905,535 A * | 5/1999 | Kerdranvat | 348/416.1 |
| 5,905,542 A | 5/1999 | Linzer | |
| 5,923,375 A | 7/1999 | Pau | |
| 5,929,940 A | 7/1999 | Jeannin | |
| 5,946,042 A | 8/1999 | Kato | |
| 5,946,043 A | 8/1999 | Lee et al. | |
| 5,949,489 A | 9/1999 | Nishikawa et al. | |
| 5,959,673 A | 9/1999 | Lee | |
| 5,963,258 A | 10/1999 | Nishikawa et al. | |
| 5,963,259 A | 10/1999 | Nakaya et al. | |
| 5,963,673 A | 10/1999 | Kodama et al. | |
| 5,970,173 A | 10/1999 | Lee et al. | |
| 5,970,175 A | 10/1999 | Nishikawa et al. | |
| 5,973,743 A | 10/1999 | Han | |
| 5,973,755 A | 10/1999 | Gabriel | |
| 5,982,437 A | 11/1999 | Okazaki et al. | |
| 5,982,438 A | 11/1999 | Lin et al. | |
| 5,990,960 A | 11/1999 | Murakami et al. | |
| 5,991,447 A | 11/1999 | Eifrig et al. | |
| 6,002,439 A | 12/1999 | Murakami et al. | |
| 6,005,980 A | 12/1999 | Eifrig et al. | |
| RE36,507 E | 1/2000 | Iu | |
| 6,011,596 A | 1/2000 | Burl | |
| 6,026,195 A | 2/2000 | Eifrig et al. | |
| 6,035,070 A | 3/2000 | Moon et al. | |
| 6,040,863 A | 3/2000 | Kato | |
| 6,052,150 A | 4/2000 | Kikuchi | |
| 6,057,884 A | 5/2000 | Chen et al. | |
| 6,058,212 A | 5/2000 | Yokohama | |
| 6,067,322 A | 5/2000 | Wang | |
| 6,081,209 A * | 6/2000 | Schuyler et al. | 341/51 |
| 6,094,225 A | 7/2000 | Han | |
| RE36,822 E | 8/2000 | Sugiyama | |
| 6,097,759 A | 8/2000 | Murakami et al. | |
| 6,111,914 A | 8/2000 | Bist | |
| 6,130,963 A | 10/2000 | Uz et al. | |
| 6,148,027 A | 11/2000 | Song et al. | |
| 6,148,033 A | 11/2000 | Pearlstein et al. | |
| 6,154,495 A | 11/2000 | Yamaguchi et al. | |
| 6,167,090 A | 12/2000 | Iizuka | |
| 6,188,725 B1 | 2/2001 | Sugiyama | |
| 6,188,794 B1 | 2/2001 | Nishikawa et al. | |
| 6,201,927 B1 | 3/2001 | Comer | |
| 6,205,176 B1 | 3/2001 | Sugiyama | |
| 6,208,761 B1 | 3/2001 | Passagio et al. | |
| 6,215,905 B1 | 4/2001 | Lee et al. | |
| 6,219,070 B1 | 4/2001 | Baker et al. | |
| 6,219,464 B1 | 4/2001 | Greggain et al. | |
| 6,233,017 B1 | 5/2001 | Chaddha | |
| 6,236,806 B1 | 5/2001 | Kojima et al. | |
| RE37,222 E | 6/2001 | Yonemitsu | |

| | | |
|---|---|---|
| 6,243,418 B1 | 6/2001 | Kim |
| 6,259,741 B1 | 7/2001 | Chen et al. |
| 6,263,024 B1 | 7/2001 | Matsumoto |
| 6,263,065 B1 | 7/2001 | Durinovic-Johri et al. |
| 6,266,091 B1 | 7/2001 | Saha et al. |
| 6,271,885 B2 | 8/2001 | Sugiyama |
| 6,272,179 B1* | 8/2001 | Kadono ............... 375/240.16 |
| 6,275,528 B1 | 8/2001 | Isozaki et al. |
| 6,275,531 B1 | 8/2001 | Li |
| 6,281,942 B1 | 8/2001 | Wang |
| 6,282,243 B1 | 8/2001 | Kazui et al. |
| 6,289,049 B1 | 9/2001 | Kim et al. |
| 6,289,132 B1 | 9/2001 | Goertzen |
| 6,292,585 B1 | 9/2001 | Yamaguchi et al. |
| 6,295,376 B1 | 9/2001 | Nakaya |
| 6,307,887 B1 | 10/2001 | Gabriel |
| 6,307,973 B2 | 10/2001 | Nishikawa et al. |
| 6,310,918 B1 | 10/2001 | Saha et al. |
| 6,320,593 B1 | 11/2001 | Sachs et al. |
| 6,324,216 B1 | 11/2001 | Igarashi |
| 6,337,881 B1 | 1/2002 | Chaddha |
| 6,339,656 B1 | 1/2002 | Marui |
| 6,377,628 B1 | 4/2002 | Schultz et al. |
| 6,381,275 B1* | 4/2002 | Fukuhara et al. ........ 375/240.06 |
| 6,381,277 B1* | 4/2002 | Chun et al. ............... 375/240.12 |
| 6,381,279 B1 | 4/2002 | Taubman |
| 6,393,059 B1 | 5/2002 | Sugiyama |
| 6,396,876 B1 | 5/2002 | Babonneau et al. |
| 6,404,813 B1 | 6/2002 | Haskell et al. |
| 6,408,029 B1 | 6/2002 | McVeigh et al. |
| 6,418,166 B1 | 7/2002 | Wu et al. |
| 6,421,383 B2 | 7/2002 | Beattie |
| 6,430,316 B1 | 8/2002 | Wilkinson |
| 6,441,842 B1 | 8/2002 | Fandrianto et al. |
| 6,442,204 B1 | 8/2002 | Snook et al. |
| 6,449,312 B1 | 9/2002 | Zhang et al. |
| 6,493,392 B1* | 12/2002 | Chung et al. ............. 375/240.27 |
| 6,496,608 B1 | 12/2002 | Chui |
| 6,519,005 B2 | 2/2003 | Bakhmutsky et al. |
| 6,519,287 B1 | 2/2003 | Hawkins et al. |
| 6,529,632 B1 | 3/2003 | Nakaya et al. |
| 6,539,056 B1 | 3/2003 | Sato et al. |
| 6,563,953 B2 | 5/2003 | Lin et al. |
| 6,647,061 B1 | 11/2003 | Panusopone et al. |
| 6,650,781 B2 | 11/2003 | Nakaya |
| 6,661,470 B1 | 12/2003 | Kawakami et al. |
| 6,671,323 B1 | 12/2003 | Tahara et al. |
| 6,704,360 B2 | 3/2004 | Haskell et al. |
| 6,728,317 B1 | 4/2004 | Demos |
| RE38,563 E | 8/2004 | Eifrig et al. |
| 6,778,610 B2 | 8/2004 | Lin |
| 6,782,053 B1* | 8/2004 | Lainema ............... 375/240.16 |
| 6,950,469 B2 | 9/2005 | Karczewicz et al. |
| 6,968,008 B1 | 11/2005 | Ribas-Corbera et al. |
| 6,980,596 B2 | 12/2005 | Wang et al. |
| 6,983,018 B1 | 1/2006 | Lin et al. |
| 7,020,200 B2 | 3/2006 | Winger |
| 7,023,919 B2 | 4/2006 | Cho et al. |
| 7,233,621 B2 | 6/2007 | Jeon |
| 7,295,616 B2 | 11/2007 | Sun et al. |
| 7,317,839 B2 | 1/2008 | Holcomb |
| 7,453,941 B1 | 11/2008 | Yamori et al. |
| 7,486,734 B2 | 2/2009 | Machida |
| 7,567,617 B2* | 7/2009 | Holcomb ............... 375/240.13 |
| 7,616,692 B2* | 11/2009 | Holcomb et al. ........ 375/240.16 |
| 7,623,574 B2* | 11/2009 | Holcomb ............... 375/240.16 |
| 7,630,438 B2* | 12/2009 | Mukerjee et al. ....... 375/240.16 |
| 7,742,529 B1 | 6/2010 | Ghanbari |
| 2001/0019586 A1 | 9/2001 | Kang et al. |
| 2001/0050957 A1 | 12/2001 | Nakaya et al. |
| 2002/0186890 A1 | 12/2002 | Lee et al. |
| 2003/0076883 A1* | 4/2003 | Bottreau et al. ......... 375/240.12 |
| 2003/0095603 A1 | 5/2003 | Lan et al. |
| 2003/0099292 A1 | 5/2003 | Wang et al. |
| 2003/0099294 A1 | 5/2003 | Wang et al. |
| 2003/0112864 A1 | 6/2003 | Karczewicz et al. |
| 2003/0113026 A1 | 6/2003 | Srinivasan et al. |
| 2003/0142748 A1 | 7/2003 | Tourapis |
| 2003/0152146 A1 | 8/2003 | Lin et al. |
| 2003/0156646 A1 | 8/2003 | Hsu et al. |
| 2003/0161402 A1 | 8/2003 | Horowitz |
| 2003/0179826 A1 | 9/2003 | Jeon |
| 2003/0202705 A1 | 10/2003 | Sun |
| 2004/0057523 A1 | 3/2004 | Koto et al. |
| 2004/0136461 A1 | 7/2004 | Kondo et al. |
| 2005/0013497 A1 | 1/2005 | Hsu et al. |
| 2005/0013498 A1 | 1/2005 | Srinivasan |
| 2005/0036700 A1 | 2/2005 | Nakaya |
| 2005/0036759 A1 | 2/2005 | Lin et al. |
| 2005/0053137 A1* | 3/2005 | Holcomb ............... 375/240.16 |
| 2005/0053147 A1 | 3/2005 | Mukerjee et al. |
| 2005/0053149 A1 | 3/2005 | Mukerjee et al. |
| 2005/0053292 A1 | 3/2005 | Mukerjee et al. |
| 2005/0058205 A1 | 3/2005 | Holcomb et al. |
| 2005/0100093 A1 | 5/2005 | Holcomb |
| 2005/0226335 A1 | 10/2005 | Lee et al. |
| 2006/0013307 A1 | 1/2006 | Olivier et al. |

FOREIGN PATENT DOCUMENTS

| | | |
|---|---|---|
| CN | 1293868 | 5/2001 |
| EP | 0 279 053 | 8/1988 |
| EP | 0 397 402 | 11/1990 |
| EP | 0 526 163 | 2/1993 |
| EP | 0535746 | 4/1993 |
| EP | 535746 A2 * | 4/1993 |
| EP | 0 540 350 | 5/1993 |
| EP | 0 588 653 | 3/1994 |
| EP | 0 614 318 | 9/1994 |
| EP | 0 625 853 | 11/1994 |
| EP | 0 651 574 | 5/1995 |
| EP | 0 771 114 | 5/1997 |
| EP | 0 786 907 | 7/1997 |
| EP | 0 825 778 | 2/1998 |
| EP | 0 830 029 | 3/1998 |
| EP | 0 884 912 | 12/1998 |
| EP | 0 944 245 | 9/1999 |
| GB | 2328337 | 2/1999 |
| GB | 2332115 | 6/1999 |
| GB | 2343579 | 5/2000 |
| JP | 61205086 | 9/1986 |
| JP | 62 213 494 | 9/1987 |
| JP | 3001688 | 1/1991 |
| JP | 3 129 986 | 3/1991 |
| JP | 6 078 295 | 3/1994 |
| JP | 6 078 298 | 3/1994 |
| JP | 06-276481 | 9/1994 |
| JP | 06-276511 | 9/1994 |
| JP | 6292188 | 10/1994 |
| JP | 7-274171 | 10/1995 |
| JP | 08-140099 | 5/1996 |
| JP | 08-251601 | 9/1996 |
| JP | 09-322163 | 12/1997 |
| JP | 10 056 644 | 2/1998 |
| JP | 2001-346215 | 12/2001 |
| JP | 2002-532027 | 9/2002 |
| JP | 2004-048711 | 2/2004 |
| JP | 2004-215229 | 7/2004 |
| WO | WO 98/03018 | 1/1998 |
| WO | WO 00/33581 | 8/2000 |
| WO | WO 03/026296 | 3/2003 |

OTHER PUBLICATIONS

U.S. Appl. No. 60/488,710, filed Jul. 18, 2003, Srinivasan et al.
Reader, "History of MPEG Video Compression—Ver. 4.0," 99 pp., document marked Dec. 16, 2003.
Printouts of FTP directories from http://ftp3.itu.ch , 8 pp. (downloaded from the World Wide Web on Sep. 20, 2005.).
U.S. Appl. No. 60/501,081, filed Sep. 7, 2003, Srinivasan et al.
U.S. Appl. No. 60/501,133, filed Sep. 7, 2003, Holcomb et al.
"DivX Multi Standard Video Encoder," 2 pp. (Downloaded from the World Wide Web on Jan. 24, 2006).
Flierl et al., "Multihypothesis Motion Estimation for Video Coding," Proc. DCC, 10 pp. (Mar. 2001).
Fogg, "Survey of Software and Hardware VLC Architectures," SPIE vol. 2186, pp. 29-37 ( no date of publication).

Girod, "Efficiency Analysis of Multihypothesis Motion-Compensated Prediction for Video Coding," IEEE Transactions on Image Processing, vol. 9, No. 2, pp. 173-183 (Feb. 2000).

Horn et al., "Estimation of Motion Vector Fields for Multiscale Motion Compensation," Proc. Picture Coding Symp. (PCS 97), pp. 141-144 (Sep. 1997).

Hsu et al., "A Low Bit-Rate Video Codec Based on Two-Dimensional Mesh Motion Compensation with Adaptive Interpolation," IEEE Transactions on Circuits and Systems for Video Technology, vol. II, No. 1, pp. 111-117 (Jan. 2001).

IBM Technical Disclosure Bulletin, Advanced Motion Estimation for Moving Picture.

Expert Group Encoders, vol. 39, No. 4, pp. 323-324 (Apr. 1996).

ISO/IEC, "MPEG-4 Video Verification Model Version 10.0," ISO/IEC JTC1/SC29/WG11, MPEG98/N1992, (ed. Ebrahimi) (document marked Feb. 1998).

Iwahashi et al., "A Motion Compensation Technique for Downscaled Pictures in Layered Coding," IEICE Transactions on Comm., vol. E77-B, No. 8, pp. 1007-1012 (Aug. 1994).

Joint Video Team (JVT) of ISO/IEC MPEG and ITU-T VCEG, "Joint Committee Draft (CD)," JVT-C167, 3rd Meeting: Fairfax, Virginia, USA, 142 pp. (May 2002).

Konrad et al., "On Motion Modeling and Estimation for Very Low Bit Rate Video Coding," Visual Comm. & Image Processing (VCIP '95), 12 pp. (May 1995).

Kossentini et al., "Predictive RD Optimized Motion Estimation for Very Low Bit-rate Video Coding," IEEE J. on Selected Areas in Communications, vol. 15, No. 9 pp. 1752-1763 (Dec. 1997).

Lopes et al., "Analysis of Spatial Transform Motion Estimation with Overlapped Compensation and Fractional-pixel Accuracy," IEEE Proc. Visual Image Signal Processing, vol. 146, No. 6, pp. 339-344 (Dec. 1999).

"Overview of MPEG-2 Test Model 5," 5 pp. [Downloaded from the World Wide Web on Mar. 1, 2006].

Ribas-Corbera et al., "On the Optimal Motion Vector Accuracy for Block-based Motion-Compensated Video Coders," Proc. SPIE Digital Video Compression, San Jose, CA, 13 pp. (1996).

Schultz et al., "Subpixel Motion Estimation for Super-Resolution Image Sequence Enhancement," Journal of Visual Comm. & Image Representation, vol. 9, No. 1, pp. 38-50 (Mar. 1998).

Sullivan et al., "The H.264/AVC Advanced Video Coding Standard: Overview and Introduction to the Fidelity Range Extensions," 21 pp. (Aug. 2004).

"The TML Project Web-Page and Archive," (including pages of code marked "image.cpp for H.26L decoder, Copyright 1999" and "image. c"), 24 pp. [Downloaded from the World Wide Web on Jun. 1, 2005].

Triggs, "Empirical Filter Estimation for Subpixel Interpolation and Matching," Int'l Conf. Computer Vision '01, Vancouver, Canada, 8 pp. (Jul. 2001).

Triggs, "Optimal Filters for Subpixel Interpolation and Matching," Int'l Conf. Computer Vision '01, Vancouver, Canada, 10 pp. (Jul. 2001).

Wang et al., "Interlace Coding Tools for H.26L Video Coding," ITU-T SG16/Q.6 VCEG-O37, pp. 1-20 (Dec. 2001).

Weiss et al., "Real Time Implementation of Subpixel Motion Estimation for Broadcast Applications," pp. 7/1-7/3 (1990).

Wiegand et al., "Long-term Memory Motion Compensated Prediction," IEEE Transactions on Circuits & Systems for Video Technology, vol. 9, No. 1, pp. 70-84 (Feb. 1999).

Wiegand, "Joint Model No. 1, Revision 1 (JM1-r1)," JVT-A003R1, Pattaya, Thailand, 80 pp. (Dec. 2001) [document marked "Generated: Jan. 18, 2002"].

Wien, "Variable Block-Size Transforms for Hybrid Video Coding," Dissertation, 182 pp. (Feb. 2004).

Wu et al., "Joint estimation of forward and backward motion vectors for interpolative prediction of video," IEEE Transactions on Image Processing, vol. 3, No. 5, pp. 684-687 (Sep. 1994).

Yang et al., "Very High Efficiency VLSI Chip-pair for Full Search Block Matching with Fractional Precision," Proc. ICASSP/IEEE Int'l Conf. on Acoustics, Speech & Signal Processing, Glasgow, pp. 2437-2440 (May 1989).

Zhang et al., "Adaptive Field/Frame Selection for High Compression Coding," MERL TR-2003-29, 13 pp. (Jan. 2003).

Microsoft Corporation, "Microsoft Debuts New Windows Media Player 9 Series, Redefining Digital Media on the PC," 4 pp. (Sep. 4, 2002) [Downloaded from the World Wide Web on May 14, 2004].

Mook, "Next-Gen Windows Media Player Leaks to the Web," *BetaNews*, 17 pp. (Jul. 19, 2002) [Downloaded from the World Wide Web on Aug. 8, 2003].

Joint Video Team of ISO/IEC MPEG and ITU-T VCEG, "Final Joint Committee Draft of Joint Video Specification (ITU-T Recommendation H.264, ISO/IEC 14496-10 AVC," 206 pp. (Aug. 2002).

Bartkowiak et al., "Color Video Compression Based on Chrominance Vector Quantization," 7th Int'l Workshop on Systems, Signals and Image Processing, IWSSIP 2000, Maribor 7-9 VI, pp. 107-110 (Jun. 2000).

Benzler et al., "Improving multiresolution motion compensating hybrid coding by drift reduction," Picture Coding Symposium, 4 pp. (Mar. 1996).

Benzler et al., "Motion and aliasing compensating prediction with quarter-pel accuracy and adaptive overlapping blocks as proposal for MPEG-4 tool evaluation—Technical description," ISO/IEC JTC1/SC29/WG11, MPEG 95/0552, 5 pp. (document marked Dec. 1995).

Benzler, "Results of core experiments P8 (Motion and Aliasing Compensating Prediction)," ISO/IEC JTC1/SC29/WG11, MPEG 97/2625, 8 pp. (document marked Oct. 1997).

Borman et al., "Block-matching Sub-pixel Motion Estimation from Noisy, Under-Sampled Frames—an Empirical Performance Evaluation," *SPIE Visual Comm. & Image Processing*, 10 pp. (Jan. 1999).

Office Action dated Aug. 1, 2008, from Chinese Patent Application No. 200480025454.9, 16 pp.

Conklin et al., "Multi-resolution Motion Estimation," *Proc. ICASSP '97*, Munich, Germany, 4 pp. (Apr. 1997).

de Haan et al., "Sub-pixel motion estimation with 3-D recursive search block-matching," Signal Processing: Image Comm.6, pp. 229-239 (month unknown, 1994).

Ericsson, "Fixed and Adaptive Predictors for Hybrid Predictive/Transform Coding," *IEEE Transactions on Comm.*, vol. COM-33, No. 12, pp. 1291-1302 (Dec. 1985).

Girod, "Motion-Compensating Prediction with Fractional-Pel Accuracy," *IEEE Transactions on Comm.*, vol. 41, No. 4, pp. 604-612 (Apr. 1993).

Girod, "Motion Compensation: Visual Aspects, Accuracy, and Fundamental Limits," *Motion Analysis and Image Sequence Processing*, Kluwer Academic Publishers, pp. 125-152 (Mar. 1993).

International Preliminary Report on Patentability dated Mar. 23, 2006, from International Patent Application No. PCT/US2004/029035, 5 pp.

International Search Report dated Mar. 4, 2005, from International Patent Application No. PCT/US2004/029035, 3 pp.

ISO/IEC, "ISO/IEC 11172-2: Information Technology—Coding of Moving Pictures and Associated Audio for Storage Media at up to About 1,5 Mbit/s," 122 pp. (Aug. 1993).

ISO/IEC, "Information Technology—Coding of Audio-Visual Objects: Visual, ISO/IEC 14496-2, Committee Draft," 330 pp. (Mar. 1998).

ITU—Q15-F-24, "MVC Video Codec—Proposal for H.26L," Study Group 16, Video Coding Experts Group (Question 15), 28 pp. (document marked as generated in Oct. 1998).

ITU-T, "H.26L Test Model Long Term No. 5 (TML-5) draft0," Study Group 16, Video Coding Experts Group (Question 15), Document Q15-K-59, 35 pp. (ed. Gisle Bjontegaard) (Document dated Oct. 2000).

ITU-T, "ITU-T Recommendation H.261: Video Codec for Audiovisual Services at px64 kbits," 28 pp. (Mar. 1993).

ITU-T, "ITU-T Recommendation H.262: Information Technology—Generic Coding of Moving Pictures and Associated Audio Information: Videol," 218 pp. (Jul. 1995).

ITU-T, "ITU-T Recommendation H.263: Video Coding for Low Bit Rate Communication," 167 pp. (Feb. 1998).

Jeong et al., "Adaptive Huffman Coding of 2-D DCT Coefficients for Image Sequence Compression," Signal Processing: Image Communication, vol. 7, 11 pp. (Mar. 1995).

Keys, "Cubic Convolution Interpolation for Digital Image Processing," *IEEE Transactions on Acoustics, Speech & Signal Processing*, vol. ASSP-29, No. 6, pp. 1153-1160 (Dec. 1981).

Morimoto et al., "Fast Electronic Digital Image Stabilization," *Proc. ICPR*, Vienna, Austria, 5 pp. (Aug. 1996).

Patel et al., "Performance of a Software MPEG Video Decoder," *Proc. of the First ACM Intl Conf on Multimedia*, pp. 75-82 (Aug. 1993).

Ribas-Corbera et al., "On the Optimal Block Size for Block-based Motion-Compensated Video Coders," *SPIE Proc. of Visual Comm. & Image Processing*, vol. 3024, 12 pp. (Jan. 1997).

Schultz et al., "Subpixel Motion Estimation for Super-Resolution Image Sequence Enhancement," Journal of Visual Comm. & Image Representation, vol. 9, No. 1, pp. 38-50 (Mar. 1998).

Tourapis et al., "Predictive Motion Vector Field Adaptive Search Technique (PMVFAST)—Enhancing Block Based Motion Estimation," *Proc. Visual Communications and Image Processing*, 10 pp. (Jan. 2001).

"Video Coding Using Wavelet Decomposition for Very Low Bit-Rate Networks," 16 pp. (month unknown, 1997).

Wang et al., "Adaptive frame/field coding for JVT Video Coding," ITU-T SG16 Q.6 JVT-B071, 24 pp. (Jan. 2002).

Wedi, "Complexity Reduced Motion Compensated Prediction with 1/8-pel Displacement Vector Resolution," ITU Study Group 16, Video Coding Experts Group (Question 6), Document VCEG-L20, 8 pp. (Document dated Dec. 2000).

Written Opinion dated Mar. 4, 2005, from International Patent Application No. PCT/US2004/029035, 5 pp.

Yu et al., "Two-Dimensional Motion Vector Coding for Low Bitrate Videophone Applications," *Proc. Int'l Conf. on Image Processing*, Los Alamitos, US, pp. 414-417, IEEE Comp. Soc. Press (Oct. 1995).

Zhu, "RTP Payload Format for H.263 Video Streams," *IETF Request for Comments 2190*, 12 pp. (Sep. 1997).

Davis et al., "Equivalence of subpixel motion estimators based on optical flow and block matching," *Proc. IEEE Int'l Symposium on Computer Vision*, pp. 7-12 (Nov. 1995).

First Examination Report dated Nov. 10, 2008, from Indian Patent Application No. 594/DELNP/2006, 2 pp.

Notice on Grant of Patent Right for Invention dated Apr. 17, 2009, from Chinese Patent Application No. 200480025454.9, 4 pp.

Sun et al., "Improved TML Loop Filter with Lower Complexity," ITU-T VCEG-N17, 8 pp. (Aug. 2001).

Huang et al., "Hardware architecture design for variable block size motion estimation in MPEG-4 AVC/JVT/ITU-T H.264," *Proc. of the 2003 Int'l Symposium on Circuits & Sys. (ISCAS '03)*, vol. 2, pp. 796-799 (May 2003).

Hatori, *Digital Video Network*, pp. 25-29 (Dec. 2002).

Miki, *All about MPEG-4*, pp. 44-46 (Sep. 1998).

Notice of Rejection dated Oct. 22, 2010, from Japanese Patent Application No. 2006-525511, 25 pp.

Ono et al., *Basic Technologies on International Image Coding Standards*, pp. 268-275 (Mar. 1998).

\* cited by examiner

Figure 1, prior art
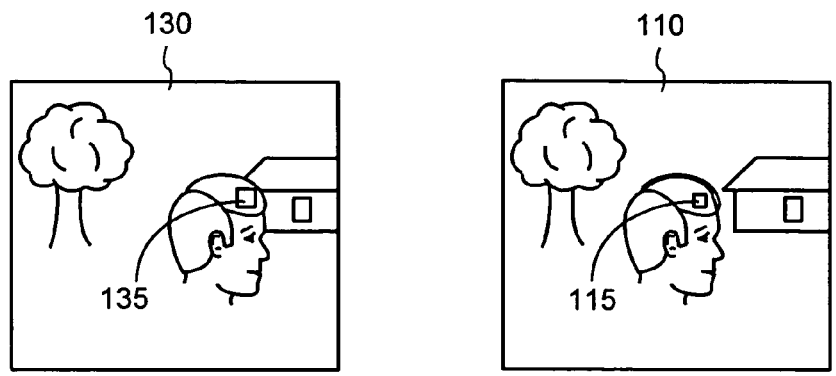
Figure 4, prior art
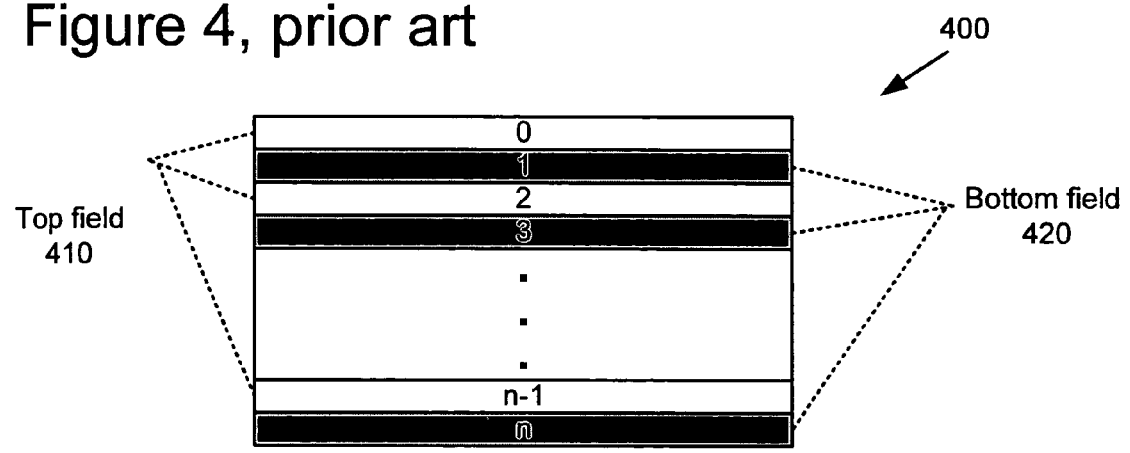

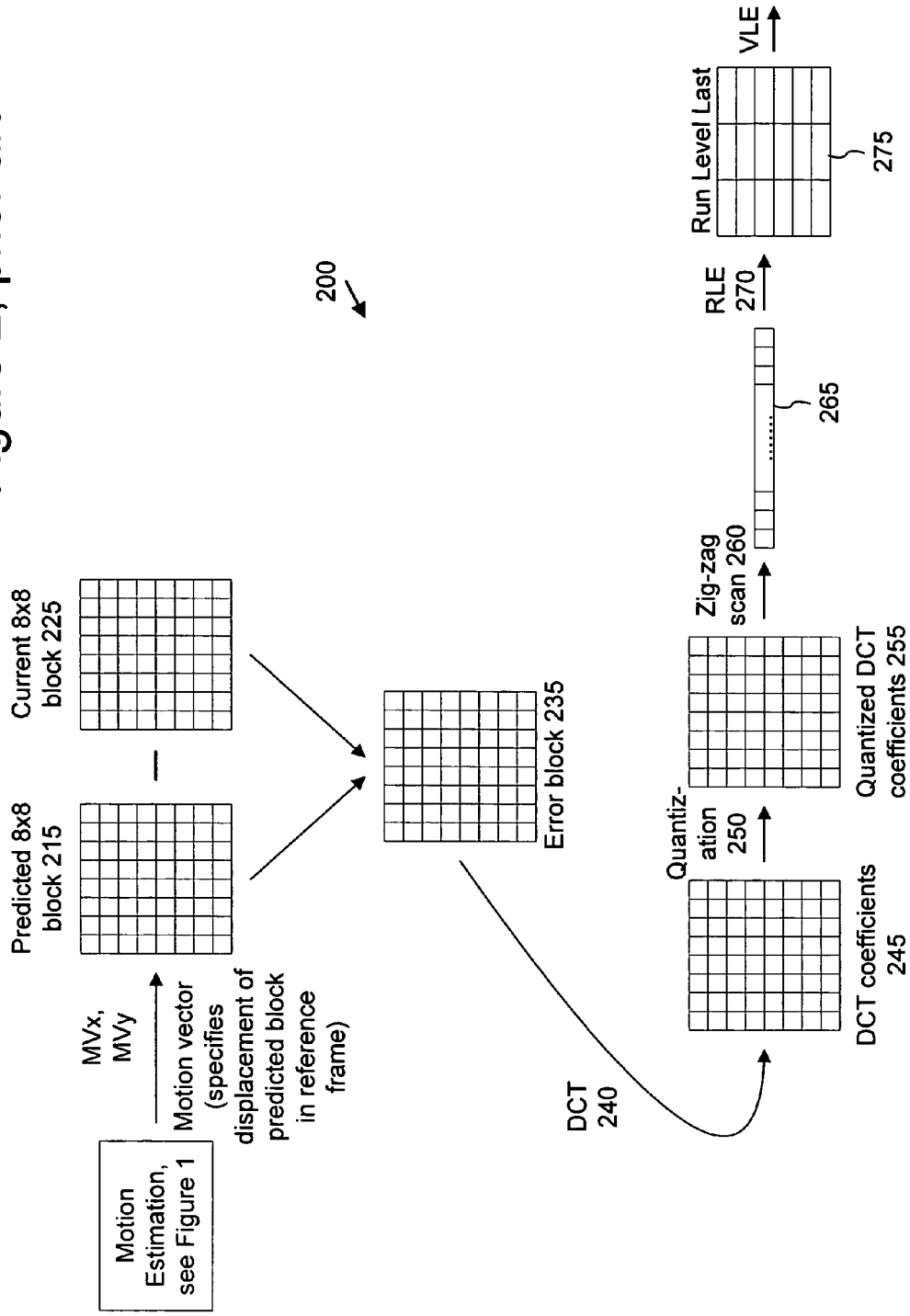

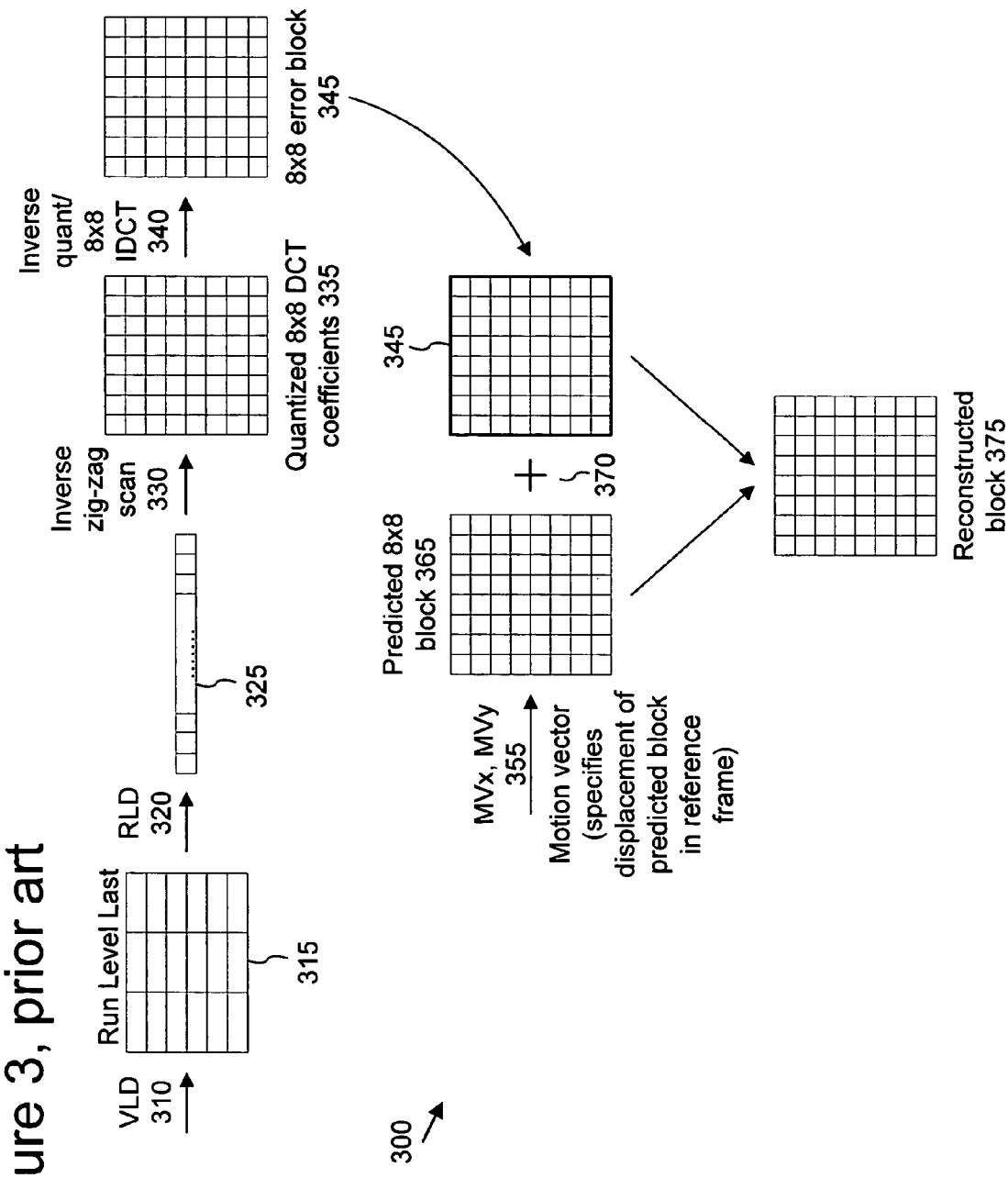
Figure 3, prior art

Figure 5A, prior art
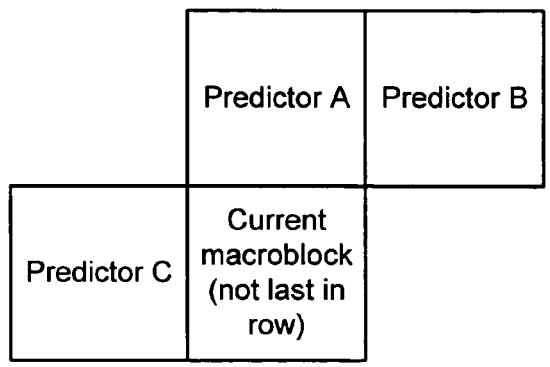
Figure 5B, prior art
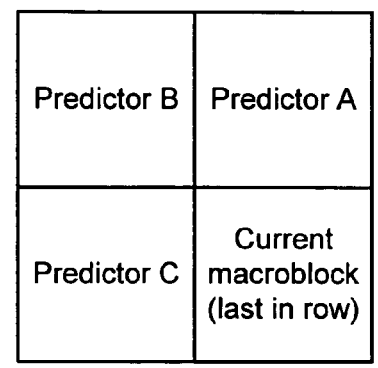
Figure 6A, prior art
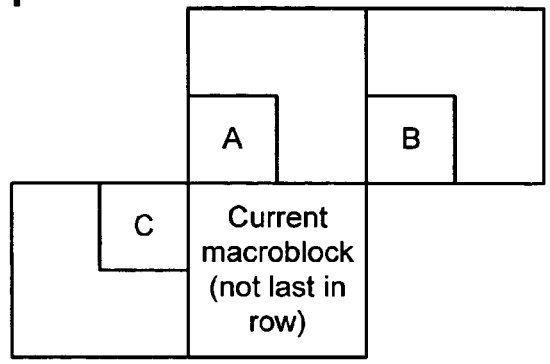
Figure 6B, prior art
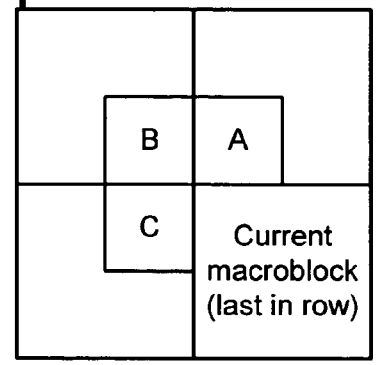

Figure 7A, prior art
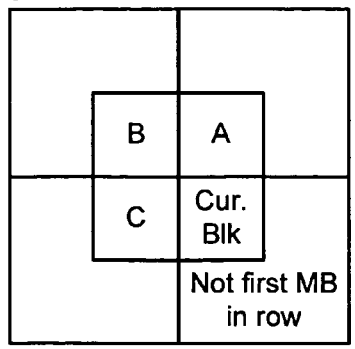
Figure 7B, prior art
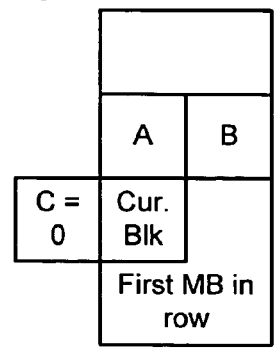
Figure 8A, prior art
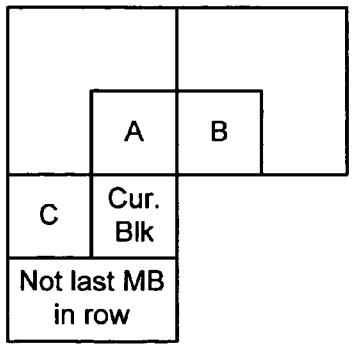
Figure 8B, prior art
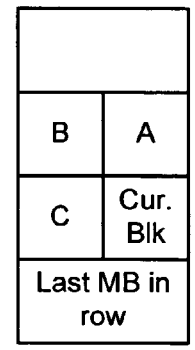
Figure 9, prior art
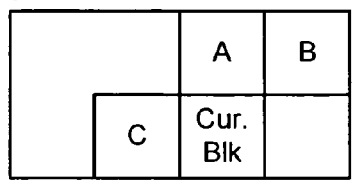
Figure 10, prior art
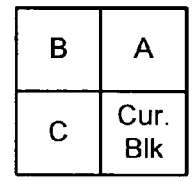

Figure 11, prior art

|  | Predictor A (compute average if field-coded) | Predictor B (compute average if field-coded) |
|---|---|---|
| Predictor C (compute average if field-coded) | Current macroblock | |

Figure 12, prior art

|  | Predictor A | Predictor B |
|---|---|---|
| Predictor C | Current | |

Figure 13, prior art

|  | Predictor A | Predictor B |
|---|---|---|
| Predictor C | Current | |

```
Median3 (a, b, c) {
    if (a > b) {
        if (b > c)
            median = b
        else if (a > c)
            median = c
        else
            median = a
    }
    else if (a > c)
        median = a
    else if (b > c)
        median = c
    else median = b
    return median
}
```

Software 1580 implementing video encoder or decoder with described techniques and tools

Figure 22
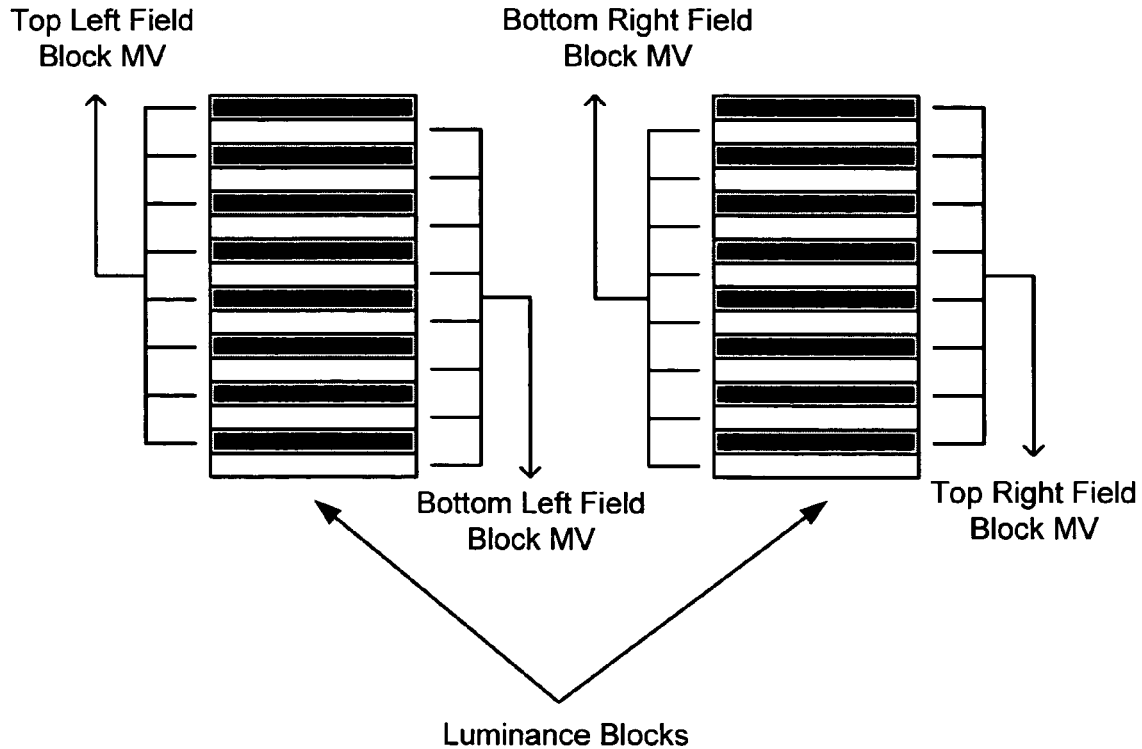
Luminance Blocks
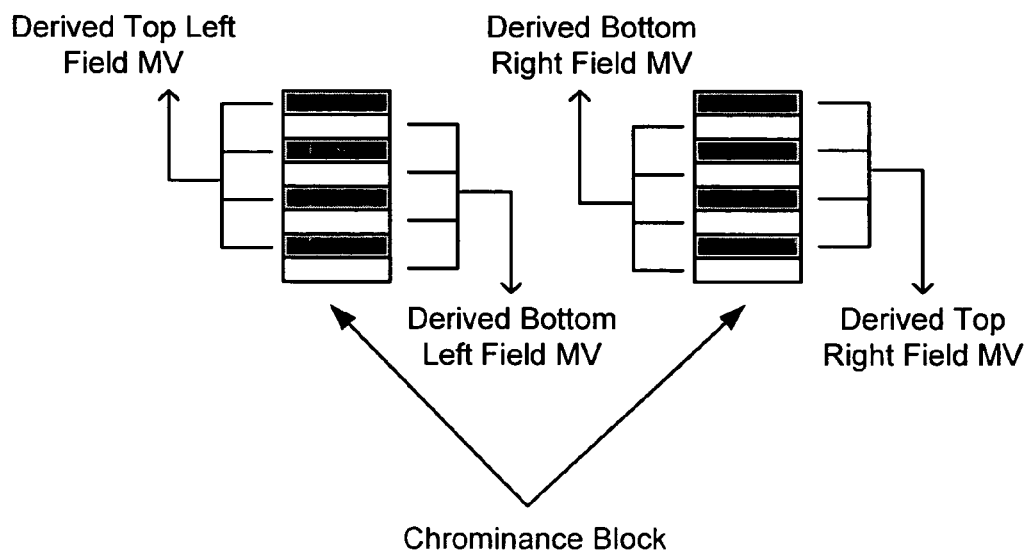
Chrominance Block

Entry Point Layer Bitstream Syntax 2700

Frame Layer Interlace P-frame Bitstream Syntax 2800

Macroblock Layer Interlace P-frame Bitstream Syntax 2900

```
if (A exists and A is not intra coded) {
    if (A is 1 MV) {
        Add MV of A to the set of candidate MVs.
    } else if (A is 4 Frame MV) {
        Add the top right block MV of A to the set of candidate MVs.
    } else if (A is 2 Field MV) {
        Average the two field MVs of A and add the resulting MV to the set of candidate MVs.
    } else if (A is 4 Field MV) {
        Average the top right block field MV and bottom right block field MV of A and add the
            resulting MV to the set of candidate MVs.
    }
} if (B exists and B is not intra coded) {
    if (B is 1 MV) {
        Add MV of B to the set of candidate MVs.
    } else if (B is 4 Frame MV) {
        Add the bottom left block MV of B to the set of candidate MVs.
    } else if (B is 2 Field MV) {
        Average the two field MVs of B and add the resulting MV to the set of candidate MVs.
    } else if (B is 4 Field MV) {
        Average the top left block field MV and bottom left block field MV of B and add the resulting
        MV to the set of candidate MVs.
    }
} if (C exists and C is not intra coded) {
    if (C is 1 MV) {
        Add MV of C to the set of candidate MVs.
    } else if (C is 4 Frame MV) {
        if (C is top right MB) {
            Add the bottom left block MV of C to the set of candidate MVs.
        } else { // C is top left MB
            Add the bottom right block MV of C to the set of candidate MVs.
        }
    } else if (C is 2 Field MV) {
        Average the two field MVs of C and add the resulting MV to the set of candidate MVs.
    } else if (C is 4 Field MV) {
        if (C is top right MB) {
            Average the top left block field MV and bottom left block field MV of C and add the
            resulting MV to the set of candidate MVs.
        } else { // C is top left MB
            Average the top right block field MV and bottom right block field MV of C and add the
            resulting MV to the set of candidate MVs.
        }
    }
}
```

```
// Top Left Block MV
if (A exists and A is not intra coded) {
    if (A is 1 MV) {
        Add MV of A to the set of candidate MVs.
    } else if (A is 4 Frame MV) {
        Add the top right block MV of A to the set of candidate MVs.
    } else if (A is 2 Field MV) {
        Average the two field MVs of A and add the resulting MV to the set of candidate MVs.
    } else if (A is 4 Field MV) {
        Average the top right block field MV and bottom right block field MV of A and add the
        resulting MV to the set of candidate MVs.
    }
}
if (B exists and B is not intra coded) {
    if (B is 1 MV) {
        Add MV of B to the set of candidate MVs.
    } else if (B is 4 Frame MV) {
        Add the bottom left block MV of B to the set of candidate MVs.
    } else if (B is 2 Field MV) {
        Average the two field MVs of B and add the resulting MV to the set of candidate MVs.
    } else if (B is 4 Field MV) {
        Average the top left block field MV and bottom left block field MV of B and add the resulting
        MV to the set of candidate MVs.
    }
}
if (C exists and C is not intra coded) {
    if (C is 1 MV) {
        Add MV of C to the set of candidate MVs.
    } else if (C is 4 Frame MV) {
        if (C is top right MB) {
            Add the bottom left block MV of C to the set of candidate MVs.
        } else { // C is top left MB
            Add the bottom right block MV of C to the set of candidate MVs.
        }
    } else if (C is 2 Field MV) {
        Average the two field MVs of C and add the resulting MV to the set of candidate MVs.
    } else if (C is 4 Field MV) {
        if (C is top right MB) {
            Average the top left block field MV and bottom left block field MV of C and add the
            resulting MV to the set of candidate MVs.
        } else { // C is top left MB
            Average the top right block field MV and bottom right block field MV of C and add the
            resulting MV to the set of candidate MVs.
        }
    }
}
```

Figure 32

```
// Top Right Block MV
Add the top left block MV of the current MB to the set of candidate MVs.

if (B exists and B is not intra coded) {
    if (B is 1 MV) {
        Add MV of B to the set of candidate MVs.
    } else if (B is 4 Frame MV) {
        Add the bottom right block MV of B to the set of candidate MVs.
    } else if (B is 2 Field MV) {
        Average the two field MVs of B and add the resulting MV to the set of candidate MVs.
    } else if (B is 4 Field MV) {
        Average the top right block field MV and bottom right
        block field MV of B and add the resulting MV to the set of candidate MVs.
    }
} if (C exists and C is not intra coded) {
    if (C is 1 MV) {
        Add MV of C to the set of candidate MVs.
    } else if (C is 4 Frame MV) {
        if (C is top right MB) {
            Add the bottom left block MV of C to the set of candidate MVs.
        } else { // C is top left MB
            Add the bottom right block MV of C to the set of candidate MVs.
        }
    } else if (C is 2 Field MV) {
        Average the two field MVs of C and add the resulting MV to the set of candidate MVs.
    } else if (C is 4 Field MV) {
        if (C is top right MB) {
            Average the top left block field MV and bottom left block field MV of C and add the
            resulting MV to the set of candidate MVs.
        } else { // C is top left MB
            Average the top right block field MV and bottom right block field MV of C and add the
            resulting MV to the set of candidate MVs.
        }
    }
}
```

```
// Bottom Left Block MV
if (A exists and A is not intra coded) {
    if (A is 1 MV) {
        Add MV of A to the set of candidate MVs.
    } else if (A is 4 Frame MV) {
        Add the bottom right block MV of A to the set of candidate MVs.
    } else if (A is 2 Field MV) {
        Average the two field MVs of A and add the resulting MV to the set of candidate
        MVs.
    } else if (A is 4 Field MV) {
        Average the top right block field MV and bottom right block field MV of A and add the
resulting MV to the set of candidate MVs.
    }
}

Add the top left block MV of the current MB to the set of candidate MVs.

Add the top right block MV of the current MB to the set of candidate MVs.
```

```
// Bottom Right Block MV
Add the bottom left block MV of the current MB to the set of candidate MVs.

Add the top left block MV of the current MB to the set of candidate MVs.

Add the top right block MV of the current MB to the set of candidate MVs.
```

```
// Top Field MV
if (A exists and A is not intra coded) {
  if (A is 1 MV) {
    Add MV of A to the set of candidate MVs.
  } else if (A is 4 Frame MV) {
    Add the top right block MV of A to the set of candidate MVs.
  } else if (A is 2 Field MV) {
    Add the top field MV of A to the set of candidate MVs.
  } else if (A is 4 Field MV) {
    Add the top right field block MV of A to the set of candidate MVs.
  }
}
if (B exists and B is not intra coded) {
  if (B is 1 MV) {
    Add MV of B to the set of candidate MVs.
  } else if (B is 4 Frame MV) {
    Add the bottom left block MV of B to the set of candidate MVs.
  } else if (B is 2 Field MV) {
    Add the top field MV of B to the set of candidate MVs.
  } else if (B is 4 Field MV) {
    Add the top left field block MV of B to the set of candidate MVs.
  }
}
if (C exists and C is not intra coded) {
  if (C is 1 MV) {
    Add MV of C to the set of candidate MVs.
  } else if (C is 4 Frame MV) {
    if (C is top right MB) {
      Add the bottom left block MV of C to the set of candidate MVs.
    } else { // C is top left MB
      Add the bottom right block MV of C to the set of candidate MVs.
    }
  } else if (C is 2 Field MV) {
    Add the top field MV of C to the set of candidate MVs.
  } else if (C is 4 Field MV) {
    if (C is top right MB) {
      Add the top left field block MV of C to the set of candidate MVs.
    } else { // C is top left MB
      Add the top right field block MV of C to the set of candidate MVs.
    }
  }
}
```

```
// Bottom Field MV
if (A exists and A is not intra coded) {
   if (A is 1 MV) {
      Add MV of A to the set of candidate MVs.
   } else if (A is 4 Frame MV) {
      Add the bottom right block MV of A to the set of candidate MVs.
   } else if (A is 2 Field MV) {
      Add the bottom field MV of A to the set of candidate MVs.
   } else if (A is 4 Field MV) {
      Add the bottom right field block MV of A to the set of candidate MVs.
   }
}
if (B exists and B is not intra coded) {
   if (B is 1 MV) {
      Add MV of B to the set of candidate MVs.
   } else if (B is 4 Frame MV) {
      Add the bottom left block MV of B to the set of candidate MVs.
   } else if (B is 2 Field MV) {
      Add the bottom field MV of B to the set of candidate MVs.
   } else if (B is 4 Field MV) {
      Add the bottom left field block MV of B to the set of candidate MVs.
   }
}
if (C exists and C is not intra coded) {
   if (C is 1 MV) {
      Add MV of C to the set of candidate MVs.
   } else if (C is 4 Frame MV) {
      if (C is top right MB) {
         Add the bottom left block MV of C to the set of candidate MVs.
      } else { // C is top left MB
         Add the bottom right block MV of C to the set of candidate MVs.
      }
   } else if (C is 2 Field MV) {
      Add the bottom field MV of C to the set of candidate MVs.
   } else if (C is 4 Field MV) {
      if (C is top right MB) {
         Add the bottom left field block MV of C to the set of candidate MVs.
      } else { // C is top left MB
         Add the bottom right field block MV of C to the set of candidate MVs.
      }
   }
}
```

```
// Top Left Field Block MV
if (A exists and A is not intra coded) {
    if (A is 1 MV) {
        Add MV of A to the set of candidate MVs.
    } else if (A is 4 Frame MV) {
        Add the top right block MV of A to the set of candidate MVs.
    } else if (A is 2 Field MV) {
        Add the top field MV of A to the set of candidate MVs.
    } else if (A is 4 Field MV) {
        Add the top right field block MV of A to the set of candidate MVs.
    }
}
if (B exists and B is not intra coded) {
    if (B is 1 MV) {
        Add MV of B to the set of candidate MVs.
    } else if (B is 4 Frame MV) {
        Add the bottom left block MV of B to the set of candidate MVs.
    } else if (B is 2 Field MV) {
        Add the top field MV of B to the set of candidate MVs.
    } else if (B is 4 Field MV) {
        Add the top left field block MV of B to the set of candidate MVs.
    }
}
if (C exists and C is not intra coded) {
    if (C is 1 MV) {
        Add MV of C to the set of candidate MVs.
    } else if (C is 4 Frame MV) {
        if (C is top right MB) {
            Add the bottom left block MV of C to the set of candidate MVs.
        } else { // C is top left MB
            Add the bottom right block MV of C to the set of candidate MVs.
        }
    } else if (C is 2 Field MV) {
        Add the top field MV of C to the set of candidate MVs.
    } else if (C is 4 Field MV) {
        if (C is top right MB) {
            Add the top left field block MV of C to the set of candidate MVs.
        } else { // C is top left MB
            Add the top right field block MV of C to the set of candidate MVs.
        }
    }
}
```

```
// Top Right Field Block MV
Add the top left field block MV of the current MB to the set of candidate MVs.

if (B exists and B is not intra coded) {
  if (B is 1 MV) {
    Add MV of B to the set of candidate MVs.
  } else if (B is 4 Frame MV) {
    Add the bottom right block MV of B to the set of candidate MVs.
  } else if (B is 2 Field MV) {
    Add the top field MV of B to the set of candidate MVs.
  } else if (B is 4 Field MV) {
    Add the top right field block MV of B to the set of candidate MVs.
  }
} if (C exists and C is not intra coded) {
  if (C is 1 MV) {
    Add MV of C to the set of candidate MVs.
  } else if (C is 4 Frame MV) {
    if (C is top right MB) {
      Add the bottom left block MV of C to the set of candidate MVs.
    } else { // C is top left MB
      Add the bottom right block MV of C to the set of candidate MVs.
    }
  } else if (C is 2 Field MV) {
    Add the top field MV of C to the set of candidate MVs.
  } else if (C is 4 Field MV) {
    if (C is top right MB) {
      Add the top left field block MV of C to the set of candidate MVs.
    } else { // C is top left MB
      Add the top right field block MV of C to the set of candidate MVs.
    }
  }
}
```

```
// Bottom Left Field Block MV
if (A exists and A is not intra coded) {
   if (A is 1 MV) {
      Add MV of A to the set of candidate MVs.
   } else if (A is 4 Frame MV) {
      Add the bottom right block MV of A to the set of candidate MVs.
   } else if (A is 2 Field MV) {
      Add the bottom field MV of A to the set of candidate MVs.
   } else if (A is 4 Field MV) {
      Add the bottom right field block MV of A to the set of candidate MVs.
   }
}
if (B exists and B is not intra coded) {
   if (B is 1 MV) {
      Add MV of B to the set of candidate MVs.
   } else if (B is 4 Frame MV) {
      Add the bottom left block MV of B to the set of candidate MVs.
   } else if (B is 2 Field MV) {
      Add the bottom field MV of B to the set of candidate MVs.
   } else if (B is 4 Field MV) {
      Add the bottom left field block MV of B to the set of candidate MVs.
   }
}
if (C exists and C is not intra coded) {
   if (C is 1 MV) {
      Add MV of C to the set of candidate MVs.
   } else if (C is 4 Frame MV) {
      if (C is top right MB) {
         Add the bottom left block MV of C to the set of candidate MVs.
      } else { // C is top left MB
         Add the bottom right block MV of C to the set of candidate MVs.
      }
   } else if (C is 2 Field MV) {
      Add the bottom field MV of C to the set of candidate MVs.
   } else if (C is 4 Field MV) {
      if (C is top right MB) {
         Add the bottom left field block MV of C to the set of candidate MVs.
      } else { // C is top left MB
         Add the bottom right field block MV of C to the set of candidate MVs.
      }
   }
}
```

```
// Bottom Right Field Block MV
Add the bottom left field block MV of the current MB to the set of candidate MVs.

if (B exists and B is not intra coded) {
   if (B is 1 MV) {
      Add MV of B to the set of candidate MVs.
   } else if (B is 4 Frame MV) {
      Add the bottom right block MV of B to the set of candidate MVs.
   } else if (B is 2 Field MV) {
      Add the bottom field MV of B to the set of candidate MVs.
   } else if (B is 4 Field MV) {
      Add the bottom right field block MV of B to the set of candidate MVs.
   }
} if (C exists and C is not intra coded) {
   if (C is 1 MV) {
      Add MV of C to the set of candidate MVs.
   } else if (C is 4 Frame MV) {
      if (C is top right MB) {
         Add the bottom left block MV of C to the set of candidate MVs.
      } else { // C is top left MB
         Add the bottom right block MV of C to the set of candidate MVs.
      }
   } else if (C is 2 Field MV) {
      Add the bottom field MV of C to the set of candidate MVs.
   } else if (C is 4 Field MV) {
      if (C is top right MB) {
         Add the bottom left field block MV of C to the set of candidate MVs.
      } else { // C is top left MB
         Add the bottom right field block MV of C to the set of candidate MVs.
      }
   }
}
```

Figure 41

```
if (TotalValidMV >= 2) {
    // Note that if there are only two valid MVs, then the
    // third ValidMV is set to be (0, 0)
    PMVx = median3 (ValidMVx [0], ValidMVx [1], ValidMVx [2]);
    PMVy = median3 (ValidMVy [0], ValidMVy [1], ValidMVy [2]);
} else if (TotalValidMV is 1) {
    PMVx = ValidMVx [0];
    PMVy = ValidMVy [0];
} else {
    PMVx = 0;
    PMVy = 0;
}
```

Figure 42

```
if (TotalValidMV == 3) {
    if (NumSameFieldMV == 3 || NumOppFieldMV == 3) {
        PMVx = median3 (ValidMVx [0], ValidMVx [1], ValidMVx [2]);
        PMVy = median3 (ValidMVy [0], ValidMVy [1], ValidMVy [2]);
    } else if (NumSameFieldMV >= NumOppFieldMV) {
        PMVx = SameFieldMVx [0];
        PMVy = SameFieldMVy [0];
    } else {
        PMVx = OppFieldMVx [0];
        PMVy = OppFieldMVy [0];
    }
} else if (TotalValidMV == 2) {
    if (NumSameFieldMV >= NumOppFieldMV) {
        PMVx = SameFieldMVx [0];
        PMVy = SameFieldMVy [0];
    } else {
        PMVx = OppFieldMVx [0];
        PMVy = OppFieldMVy [0];
    }
} else if (TotalValidMV == 1) {
    PMVx = ValidMVx [0];
    PMVy = ValidMVy [0];
} else {
    PMVx = 0;
    PMVy = 0;
}
```

```
offset_table1[9] = {0, 1, 2, 4, 8, 16, 32, 64, 128,}
offset_table2[9] = {0, 1, 3, 7, 15, 31, 63, 127, 255}
index = vlc_decode()     // Use the table indicated by MVTAB in the picture
layer
if (index == 71)
{
        dmv_x = get_bits(k_x)
        dmv_y = get_bits(k_y)
}
else
{
    if (extend_x == 1)
       offset_table = offset_table2
    else
       offset_table = offset_table1
 index1 = (index + 1) % 9
    if (index1 != 0)
    {
       val = get_bits (index1 + extend_x)
       sign = 0 - (val & 1)
       dmv_x = sign ^ ((val >> 1) + offset_table[index1])
       dmv_x = dmv_x - sign
    }
    else
       dmv_x = 0
    if (extend_y == 1)
       offset_table = offset_table2
    else
       offset_table = offset_table1
 index1 = (index + 1) / 9
    if (index1 != 0)
    {
       val = get_bits (index1 + extend_y)
       sign = 0 - (val & 1)
       dmv_y = sign ^ ((val >> 1) + offset_table[index1])
       dmv_y = dmv_y - sign
    }
    else
       dmv_y = 0
}
```

```
offset_table[9] = {0, 1, 2, 4, 8, 16, 32, 64, 128}
index = vlc_decode()     // Use the table indicated by MVTAB in the picture
layer
if (index == 0) {
        dmv_x = 1 - 2 * get_bits(1)
        dmv_y = 0
}
if (index == 125)
{
        dmv_x = get_bits(k_x - halfpel_flag)
        dmv_y = get_bits(k_y - halfpel_flag)
}
else
{
index1 = (index + 1) % 9
     val = get_bits (index1)
     sign = 0 - (val & 1)
     dmv_x = sign ^ ((val >> 1) + offset_table[index1])
     dmv_x = dmv_x - sign index1 = (index + 1) / 9
     val = get_bits (index1)
     sign = 0 - (val & 1)
     dmv_y = sign ^ ((val >> 1) + offset_table[index1])
     dmv_y = dmv_y - sign
}
```

```
Int s_RndTbl [] = {0, 0, 0, 1};
Int s_RndTblField [] = {0, 0, 1, 2, 4, 4, 5, 6, 2, 2, 3, 8, 6, 6, 7, 12};
CMV_X = (LMV_X + s_RndTbl[LMV_X & 3]) >> 1;
if (LMV is a field motion vector) {
      CMV_Y = (LMV_Y >> 4)*8 + s_RndTblField [LMV_Y & 0xF];
    } else {
      CMV_Y = (LMV_Y + s_RndTbl[LMV_Y & 3]) >> 1;
    }
```

MOTION VECTOR CODING AND DECODING IN INTERLACED FRAME CODED PICTURES

RELATED APPLICATION INFORMATION

This application claims the benefit of U.S. Provisional Patent Application No. 60/501,081, entitled "Video Encoding and Decoding Tools and Techniques," filed Sep. 7, 2003, which is hereby incorporated by reference.

The following co-pending U.S. patent applications relate to the present application and are hereby incorporated by reference: 1) U.S. patent application Ser. No. 10/934,929, entitled, "Macroblock Information Signaling For Interlaced Frames," filed concurrently herewith; and 2) U.S. patent application Ser. No. 10/933,908, entitled, "Chroma Motion Vector Derivation," filed concurrently herewith, now U.S. Pat. No. 7,352,905.

COPYRIGHT AUTHORIZATION

A portion of the disclosure of this patent document contains material which is subject to copyright protection. The copyright owner has no objection to the facsimile reproduction by any one of the patent disclosure, as it appears in the Patent and Trademark Office patent files or records, but otherwise reserves all copyright rights whatsoever.

TECHNICAL FIELD

Techniques and tools for interlaced video coding and decoding are described. For example, techniques and tools are described for coding and decoding motion vectors in interlaced frame coded pictures (e.g., interlaced P-frames).

BACKGROUND

Digital video consumes large amounts of storage and transmission capacity. A typical raw digital video sequence includes 15 or 30 pictures per second. Each picture can include tens or hundreds of thousands of pixels (also called pels). Each pixel represents a tiny element of the picture. In raw form, a computer commonly represents a pixel with 24 bits or more. Thus, the number of bits per second, or bit rate, of a typical raw digital video sequence can be 5 million bits/second or more.

Most computers and computer networks lack the resources to process raw digital video. For this reason, engineers use compression (also called coding or encoding) to reduce the bit rate of digital video. Compression can be lossless, in which quality of the video does not suffer but decreases in bit rate are limited by the complexity of the video. Or, compression can be lossy, in which quality of the video suffers but decreases in bit rate are more dramatic. Decompression reverses compression.

In general, video compression techniques include "intra" compression and "inter" or predictive compression. Intra compression techniques compress individual pictures, typically called I-frames or key frames. Inter compression techniques compress frames with reference to preceding and/or following frames, and inter-compressed frames are typically called predicted frames, P-frames, or B-frames.

I. Inter Compression in Windows Media Video, Versions 8 and 9

Microsoft Corporation's Windows Media Video, Version 8 ["WMV8"] includes a video encoder and a video decoder. The WMV8 encoder uses intra and inter compression, and the WMV8 decoder uses intra and inter decompression. Windows Media Video, Version 9 ["WMV9"] uses a similar architecture for many operations.

Inter compression in the WMV8 encoder uses block-based motion compensated prediction coding followed by transform coding of the residual error. FIGS. 1 and 2 illustrate the block-based inter compression for a predicted frame in the WMV8 encoder. In particular, FIG. 1 illustrates motion estimation for a predicted frame 110 and FIG. 2 illustrates compression of a prediction residual for a motion-compensated block of a predicted frame.

For example, in FIG. 1, the WMV8 encoder computes a motion vector for a macroblock 115 in the predicted frame 110. To compute the motion vector, the encoder searches in a search area 135 of a reference frame 130. Within the search area 135, the encoder compares the macroblock 115 from the predicted frame 110 to various candidate macroblocks in order to find a candidate macroblock that is a good match. The encoder outputs information specifying the motion vector (entropy coded) for the matching macroblock.

Since a motion vector value is often correlated with the values of spatially surrounding motion vectors, compression of the data used to transmit the motion vector information can be achieved by selecting a motion vector predictor based upon motion vectors of neighboring macroblocks and predicting the motion vector for the current macroblock using the motion vector predictor. The encoder can encode the differential between the motion vector and the predictor. After reconstructing the motion vector by adding the differential to the predictor, a decoder uses the motion vector to compute a prediction macroblock for the macroblock 115 using information from the reference frame 130, which is a previously reconstructed frame available at the encoder and the decoder. The prediction is rarely perfect, so the encoder usually encodes blocks of pixel differences (also called the error or residual blocks) between the prediction macroblock and the macroblock 115 itself.

FIG. 2 illustrates an example of computation and encoding of an error block 235 in the WMV8 encoder. The error block 235 is the difference between the predicted block 215 and the original current block 225. The encoder applies a discrete cosine transform ["DCT"] 240 to the error block 235, resulting in an 8×8 block 245 of coefficients. The encoder then quantizes 250 the DCT coefficients, resulting in an 8×8 block of quantized DCT coefficients 255. The encoder scans 260 the 8×8 block 255 into a one-dimensional array 265 such that coefficients are generally ordered from lowest frequency to highest frequency. The encoder entropy encodes the scanned coefficients using a variation of run length coding 270. The encoder selects an entropy code from one or more run/level/last tables 275 and outputs the entropy code.

FIG. 3 shows an example of a corresponding decoding process 300 for an inter-coded block. In summary of FIG. 3, a decoder decodes (310, 320) entropy-coded information representing a prediction residual using variable length decoding 310 with one or more run/level/last tables 315 and run length decoding 320. The decoder inverse scans 330 a one-dimensional array 325 storing the entropy-decoded information into a two-dimensional block 335. The decoder inverse quantizes and inverse discrete cosine transforms (together, 340) the data, resulting in a reconstructed error block 345. In a separate motion compensation path, the decoder computes a predicted block 365 using motion vector information 355 for displacement from a reference frame. The decoder combines 370 the predicted block 365 with the reconstructed error block 345 to form the reconstructed block 375.

The amount of change between the original and reconstructed frames is the distortion and the number of bits required to code the frame indicates the rate for the frame. The amount of distortion is roughly inversely proportional to the rate.

II. Interlaced Video and Progressive Video

A video frame contains lines of spatial information of a video signal. For progressive video, these lines contain samples starting from one time instant and continuing through successive lines to the bottom of the frame. A progressive I-frame is an intra-coded progressive video frame. A progressive P-frame is a progressive video frame coded using forward prediction, and a progressive B-frame is a progressive video frame coded using bi-directional prediction.

A typical interlaced video frame consists of two fields scanned starting at different times. For example, referring to FIG. 4, an interlaced video frame 400 includes top field 410 and bottom field 420. Typically, the even-numbered lines (top field) are scanned starting at one time (e.g., time t) and the odd-numbered lines (bottom field) are scanned starting at a different (typically later) time (e.g., time t+1). This timing can create jagged tooth-like features in regions of an interlaced video frame where motion is present because the two fields are scanned starting at different times. For this reason, interlaced video frames can be rearranged according to a field structure, with the odd lines grouped together in one field, and the even lines grouped together in another field. This arrangement, known as field coding, is useful in high-motion pictures for reduction of such jagged edge artifacts. On the other hand, in stationary regions, image detail in the interlaced video frame may be more efficiently preserved without such a rearrangement. Accordingly, frame coding is often used in stationary or low-motion interlaced video frames, in which the original alternating field line arrangement is preserved.

A typical progressive video frame consists of one frame of content with non-alternating lines. In contrast to interlaced video, progressive video does not divide video frames into separate fields, and an entire frame is scanned left to right, top to bottom starting at a single time.

III. P-Frame Coding and Decoding in a Previous WMV Encoder and Decoder

A previous WMV encoder and decoder use progressive and interlace coding and decoding in P-frames. In interlaced and progressive P-frames, a motion vector is encoded in the encoder by computing a differential between the motion vector and a motion vector predictor, which is computed based on neighboring motion vectors. And, in the decoder, the motion vector is reconstructed by adding the motion vector differential to the motion vector predictor, which is again computed (this time in the decoder) based on neighboring motion vectors. Thus, a motion vector predictor for the current macroblock or field of the current macroblock is selected based on the candidate motion vector predictors, and a motion vector differential is calculated based on the predictor. The motion vector can be reconstructed by adding the motion vector differential to the selected motion vector predictor at either the encoder or the decoder side. Typically, luminance motion vectors are reconstructed from the encoded motion information, and chrominance motion vectors are derived from the reconstructed luminance motion vectors.

A. Progressive P-Frame Coding and Decoding

For example, in the encoder and decoder, progressive P-frames can contain macroblocks encoded in one motion vector (1MV) mode or in four motion vector (4MV) mode, or skipped macroblocks, with a decision generally made on a macroblock-by-macroblock basis. P-frames with only 1MV macroblocks (and, potentially, skipped macroblocks) are referred to as 1MV P-frames, and P-frames with both 1MV and 4MV macroblocks (and, potentially, skipped macroblocks) are referred to as Mixed-MV P-frames. One luma motion vector is associated with each 1MV macroblock, and up to four luma motion vectors are associated with each 4MV macroblock (one for each block).

FIGS. 5A and 5B are diagrams showing the locations of macroblocks considered for candidate motion vector predictors for a macroblock in a 1MV progressive P-frame. The candidate predictors are taken from the left, top and top-right macroblocks, except in the case where the macroblock is the last macroblock in the row. In this case, Predictor B is taken from the top-left macroblock instead of the top-right. For the special case where the frame is one macroblock wide, the predictor is always Predictor A (the top predictor). When Predictor A is out of bounds because the macroblock is in the top row, the predictor is Predictor C. Various other rules address other special cases such as intra-coded predictors.

FIGS. 6A-10 show the locations of the blocks or macroblocks considered for the up-to-three candidate motion vectors for a motion vector for a 1MV or 4MV macroblock in a Mixed-MV frame. In the following figures, the larger squares are macroblock boundaries and the smaller squares are block boundaries. For the special case where the frame is one macroblock wide, the predictor is always Predictor A (the top predictor). Various other rules address other special cases such as top row blocks for top row 4MV macroblocks, top row 1MV macroblocks, and intra-coded predictors.

FIGS. 6A and 6B are diagrams showing locations of blocks considered for candidate motion vector predictors for a 1MV current macroblock in a Mixed-MV frame. The neighboring macroblocks may be 1MV or 4MV macroblocks. FIGS. 6A and 6B show the locations for the candidate motion vectors assuming the neighbors are 4MV (i.e., predictor A is the motion vector for block 2 in the macroblock above the current macroblock, and predictor C is the motion vector for block 1 in the macroblock immediately to the left of the current macroblock). If any of the neighbors is a 1MV macroblock, then the motion vector predictor shown in FIGS. 5A and 5B is taken to be the motion vector predictor for the entire macroblock. As FIG. 6B shows, if the macroblock is the last macroblock in the row, then Predictor B is from block 3 of the top-left macroblock instead of from block 2 in the top-right macroblock as is the case otherwise.

FIGS. 7A-10 show the locations of blocks considered for candidate motion vector predictors for each of the 4 luminance blocks in a 4MV macroblock. FIGS. 7A and 7B are diagrams showing the locations of blocks considered for candidate motion vector predictors for a block at position 0; FIGS. 8A and 8B are diagrams showing the locations of blocks considered for candidate motion vector predictors for a block at position 1; FIG. 9 is a diagram showing the locations of blocks considered for candidate motion vector predictors for a block at position 2; and FIG. 10 is a diagram showing the locations of blocks considered for candidate motion vector predictors for a block at position 3. Again, if a neighbor is a 1MV macroblock, the motion vector predictor for the macroblock is used for the blocks of the macroblock.

For the case where the macroblock is the first macroblock in the row, Predictor B for block 0 is handled differently than block 0 for the remaining macroblocks in the row (see FIGS. 7A and 7B). In this case, Predictor B is taken from block 3 in the macroblock immediately above the current macroblock instead of from block 3 in the macroblock above and to the left of current macroblock, as is the case otherwise. Similarly, for the case where the macroblock is the last macroblock in the row, Predictor B for block 1 is handled differently (FIGS. 8A and 8B). In this case, the predictor is taken from block 2 in the macroblock immediately above the current macroblock instead of from block 2 in the macroblock above and to the right of the current macroblock, as is the case otherwise. In general, if the macroblock is in the first macroblock column, then Predictor C for blocks 0 and 2 are set equal to 0.

B. Interlaced P-Frame Coding and Decoding in the Encoder and Decoder

The encoder and decoder use a 4:1:1 macroblock format for interlaced P-frames, which can contain macroblocks encoded in field mode or in frame mode, or skipped macroblocks, with a decision generally made on a macroblock-by-macroblock basis. Two motion vectors are associated with each field-coded inter-macroblock (one motion vector per field), and one motion vector is associated with each frame-coded inter-macroblock. An encoder jointly encodes motion information, including horizontal and vertical motion vector differential components, potentially along with other signaling information.

FIGS. 11, 12 and 13 show examples of candidate predictors for motion vector prediction for frame-coded 4:1:1 macroblocks and field-coded 4:1:1 macroblocks, respectively, in interlaced P-frames in the WMV encoder and decoder. FIG. 11 shows candidate predictors A, B and C for a current frame-coded 4:1:1 macroblock in an interior position in an interlaced P-frame (not the first or last macroblock in a macroblock row, not in the top row). Predictors can be obtained from different candidate directions other than those labeled A, B, and C (e.g., in special cases such as when the current macroblock is the first macroblock or last macroblock in a row, or in the top row, since certain predictors are unavailable for such cases). For a current frame-coded macroblock, predictor candidates are calculated differently depending on whether the neighboring macroblocks are field-coded or frame-coded. For a neighboring frame-coded macroblock, the motion vector is simply taken as the predictor candidate. For a neighboring field-coded macroblock, the candidate motion vector is determined by averaging the top and bottom field motion vectors.

FIGS. 12 and 13 show candidate predictors A, B and C for a current field in a field-coded 4:1:1 macroblock in an interior position in the field. In FIG. 12, the current field is a bottom field, and the bottom field motion vectors in the neighboring macroblocks are used as candidate predictors. In FIG. 13, the current field is a top field, and the top field motion vectors in the neighboring macroblocks are used as candidate predictors. Thus, for each field in a current field-coded macroblock, the number of motion vector predictor candidates for each field is at most three, with each candidate coming from the same field type (e.g., top or bottom) as the current field. Again, various special cases (not shown) apply when the current macroblock is the first macroblock or last macroblock in a row, or in the top row, since certain predictors are unavailable for such cases.

To select a predictor from a set of predictor candidates, the encoder and decoder use different selection algorithms, such as a median-of-three algorithm. A procedure for median-of-three prediction is described in pseudo-code 1400 in FIG. 14.

IV. Standards for Video Compression and Decompression

Several international standards relate to video compression and decompression. These standards include the Motion Picture Experts Group ["MPEG"] 1, 2, and 4 standards and the H.261, H.262 (another title for MPEG 2), H.263 and H.264 (also called JVT/AVC) standards from the International Telecommunication Union ["ITU"]. These standards specify aspects of video decoders and formats for compressed video information. Directly or by implication, they also specify certain encoder details, but other encoder details are not specified. These standards use (or support the use of) different combinations of intraframe and interframe decompression and compression.

A. Motion Estimation/Compensation in the Standards

One of the primary methods used to achieve data compression of digital video sequences in the international standards is to reduce the temporal redundancy between pictures. These popular compression schemes (MPEG-1, MPEG-2, MPEG-4, H.261, H.263, etc.) use motion estimation and compensation. For example, a current frame is divided into uniform square regions (e.g., blocks and/or macroblocks). A matching region for each current region is specified by sending motion vector information for the region. The motion vector indicates the location of the region in a previously coded (and reconstructed) reference frame that is to be used as a predictor for the current region. A pixel-by-pixel difference, called the error signal, between the current region and the region in the reference frame is derived. This error signal usually has lower entropy than the original signal. Therefore, the information can be encoded at a lower rate. As in WMV 8 and 9 encoders and decoders, since a motion vector value is often correlated with spatially surrounding motion vectors, compression of the data used to represent the motion vector information can be achieved by coding the differential between the current motion vector and a motion vector predictor that is based upon previously coded, neighboring motion vectors.

Some international standards describe motion estimation and compensation in interlaced video frames. For example, Section 7.6.1 of the MPEG-2 standard describes a dual-prime encoding mode. In dual-prime encoding only one motion vector is encoded (in its full format) in the bitstream together with a differential motion vector. In the case of field pictures, two motion vectors are derived from this information. The two derived motion vectors are used to form predictions from two reference fields (one top field and one bottom field) which are averaged to form the final prediction. In the case of frame pictures, this process is repeated for the two fields so that a total of four field predictions are made.

The May 28, 1998 committee draft of the MPEG4 standard describes motion compensation for interlaced and progressive video. Section 7.5.5 describes motion compensation in progressive video object planes (VOPs). Candidate motion vectors are collected from neighboring macroblocks or blocks. Candidate motion vectors from outside the VOP are treated as not valid. If only one candidate motion vector is not valid, it is set to 0. If only two are not valid, they are set to equal the third motion vector. If all three are not valid, they are set to 0. Median filtering is performed on the three candidates to calculate a predictor.

Section 7.6.2 of the committee draft of the MPEG-4 standard describes motion compensation for interlaced video. For example, Section 7.6.2.1 describes field-predicted macroblocks with one motion vector for each field, and frame-predicted macroblocks with either one motion vector per block or one motion vector per macroblock. Candidate motion vectors are collected from neighboring macroblocks or blocks, with the predictor selected by median filtering.

Section 8.4 of draft JVT-D157 of the JVT/AVC standard also describes motion compensation. The components of a motion vector of a current block are predicted using median prediction. (Prediction does not take place across boundaries of macroblocks that do not belong to the same slice.) First, the motion vector values and reference pictures of three candidate neighboring blocks are determined. If the top right block is outside the current picture or slice or not available due to decoding order, the motion vector and reference picture of the top right block are considered equal to those of the top left block. If the top, top right, and top left blocks are all outside the current picture or slice, their motion vectors and reference pictures are considered equal to those of the left block. In other cases, the motion vector value for a candidate predictor block that is intra-coded or outside the current picture or slice is considered to be 0, and the reference picture is considered to be different than the current block.

Once the motion vector values and reference pictures of the candidate predictors have been determined, if only one of the left, top, and top right blocks has the same reference picture as the current block, the predicted motion vector for the current block is equal to the motion vector value of the block with the same reference picture. Otherwise, each component of the predicted motion vector value for the current block is calculated as the median of the corresponding candidate motion vector component values of the left, top and top right blocks.

Section 8.4 also describes macroblock-adaptive frame/field coding. In interlaced frames, macroblocks are grouped into macroblock pairs (top and bottom). Macroblock pairs can be field-coded or frame-coded. In a frame-coded macroblock pair, the macroblock pair is decoded as two frame-coded macroblocks. In a field-coded macroblock pair, the top macroblock consists of the top-field lines in the macroblock pair, and the bottom macroblock consists of the bottom-field lines in the macroblock pair. If the current block is in frame coding mode, the candidate motion vectors of the neighboring blocks are also frame-based. If the current block is in field-coding mode, the candidate motion vectors of the neighboring blocks are also field-based, in the same field parity.

B. Limitations of the Standards

These international standards are limited in several important ways. For example, draft JVT-d 157 of the JVT/AVC standard and the committee draft of the MPEG-4 standard describe using median prediction to calculate motion vector predictors even when one or more candidate motion vectors are set to 0. Using median prediction when candidates are set to 0 often produces skewed motion vector predictors. The standards also do not describe predicting macroblocks with four coded field motion vectors, which places restrictive limitations on the spatial adaptivity of motion estimation and compensation. Furthermore, draft JVT-d157 performs interlaced coding and decoding through the use of macroblock pairs rather than through individual interlaced macroblocks, which limits the adaptivity of field-coding/frame-coding within a picture.

Given the critical importance of video compression and decompression to digital video, it is not surprising that video compression and decompression are richly developed fields. Whatever the benefits of previous video compression and decompression techniques, however, they do not have the advantages of the following techniques and tools.

SUMMARY

In summary, the detailed description is directed to various techniques and tools for encoding and decoding interlaced video frames. Described embodiments implement one or more of the described techniques and tools including, but not limited to, the following:

In one aspect, an encoder/decoder receives motion vector information comprising information for four field motion vectors for a macroblock in an interlaced frame-coded, forward-predicted picture (e.g., an interlaced P-frame). The encoder/decoder processes the macroblock using the four field motion vectors. Two of the four field motion vectors represent motion in a first field of the macroblock, and the other two of the four field motion vectors represent motion in a second field of the macroblock. The information for the four field motion vectors can include motion vector differentials for the four field motion vectors.

In another aspect, an encoder/decoder determines a number of valid candidate motion vectors (e.g., frame or field motion vectors from neighboring macroblocks) for predicting a field motion vector in a current macroblock (e.g., a two field motion vector macroblock or a four field motion vector macroblock) in an interlaced frame coded picture (e.g., an interlaced P-frame). The encoder/decoder calculates a motion vector predictor for the field motion vector based at least in part on the valid candidate motion vectors.

The calculation comprises determining whether to perform a median operation (e.g., a component-wise median operation) on the valid candidate motion vectors based on whether the number of valid candidate motion vectors is three. If the number of valid candidate motion vectors is three, the calculation can further comprise performing a median operation on the valid candidate motion vectors. If the number is less than three, the calculation can comprise selecting a valid candidate motion vector as the motion vector predictor, without performing a median operation. The encoder/decoder can reconstruct the field motion vector based at least in part on the motion vector predictor and motion vector differential information (which may indicate that no differential is present).

The valid candidate motion vectors can be characterized by being for a block, macroblock field, macroblock field portion, or macroblock within the interlaced frame coded picture, or within the same slice as the current macroblock, and can be an actual motion vector value and not for an intra block, macroblock field, macroblock field portion, or macroblock.

In another aspect, an encoder/decoder determines candidate motion vectors for predicting a field motion vector for a current field of a current macroblock in an interlaced frame coded picture, determines a field polarity for one or more of the candidate motion vectors, and calculates a motion vector predictor for the field motion vector based at least in part on the field polarity. The candidate motion vectors can be measured in quarter-pixel increments. The field polarities can be determined by performing a bitwise AND operation on a y-component of a candidate motion vector.

Determining a field polarity for a candidate motion vector can comprise determining whether the candidate motion vector indicates a displacement in a top field or bottom field of a reference frame, or whether the candidate motion vector indicates a displacement in a field with same polarity or opposite polarity as the current field.

In another aspect, an encoder/decoder determines one or more valid candidate motion vectors for predicting a field motion vector, determines a field polarity for each individual valid candidate motion vector of the one or more valid candidate motion vectors, allocates each individual valid candidate motion vector to one of two sets depending on its field polarity, and calculates a motion vector predictor for the field motion vector based at least in part on the two sets. The two sets can be an opposite polarity set and a same polarity set. Calculating the motion vector predictor can comprise selecting a dominant polarity valid candidate motion vector (e.g., a candidate from the set having the greatest number of valid candidates). The candidate can be selected in a specified selection order. If only one valid candidate is allocated to each set, calculating the motion vector predictor can comprise selecting the same polarity candidate rather than the opposite polarity candidate. If three valid candidates are allocated to one of the two sets, calculating the motion vector predictor can comprise performing a median operation on the three valid candidates.

The various techniques and tools can be used in combination or independently.

Additional features and advantages will be made apparent from the following detailed description of different embodiments that proceeds with reference to the accompanying drawings.

BRIEF DESCRIPTION OF THE DRAWINGS

FIG. 1 is a diagram showing motion estimation in a video encoder according to the prior art.

FIG. 2 is a diagram showing block-based compression for an 8×8 block of prediction residuals in a video encoder according to the prior art.

FIG. 3 is a diagram showing block-based decompression for an 8×8 block of prediction residuals in a video encoder according to the prior art.

FIG. 4 is a diagram showing an interlaced frame according to the prior art.

FIGS. 5A and 5B are diagrams showing locations of macroblocks for candidate motion vector predictors for a 1MV macroblock in a progressive P-frame according to the prior art.

FIGS. 6A and 6B are diagrams showing locations of blocks for candidate motion vector predictors for a 1MV macroblock in a mixed 1MV/4MV progressive P-frame according to the prior art.

FIGS. 7A, 7B, 8A, 8B, 9, and 10 are diagrams showing the locations of blocks for candidate motion vector predictors for a block at various positions in a 4MV macroblock in a mixed 1MV/4MV progressive P-frame according to the prior art.

FIG. 11 is a diagram showing candidate motion vector predictors for a current frame-coded macroblock in an interlaced P-frame according to the prior art.

FIGS. 12 and 13 are diagrams showing candidate motion vector predictors for a current field-coded macroblock in an interlaced P-frame according to the prior art.

FIG. 14 is a code diagram showing pseudo-code for performing a median-of-3 calculation according to the prior art.

FIG. 22 is a diagram showing motion vectors for luminance blocks and derived motion vectors for chrominance blocks in a 4 field MV macroblock of an interlaced P-frame.

FIG. 30 is a code listing showing pseudo-code for collecting candidate motion vectors for 1MV macroblocks in an interlaced P-frame in a combined implementation.

FIGS. 31, 32, 33, and 34 are code listings showing pseudo-code for collecting candidate motion vectors for 4 Frame MV macroblocks in an interlaced P-frame in a combined implementation.

FIGS. 35 and 36 are code listings showing pseudo-code for collecting candidate motion vectors for 2 Field MV macroblocks in an interlaced P-frame in a combined implementation.

FIGS. 37, 38, 39, and 40 are code listings showing pseudo-code for collecting candidate motion vectors for 4 Field MV macroblocks in an interlaced P-frame in a combined implementation.

FIG. 41 is a code listing showing pseudo-code for computing motion vector predictors for frame motion vectors in an interlaced P-frame in a combined implementation.

FIG. 42 is a code listing showing pseudo-code for computing motion vector predictors for field motion vectors in an interlaced P-frame in a combined implementation.

FIG. 43A and 43B are code listings showing pseudo-code for decoding a motion vector differential for interlaced P-frames in a combined implementation.

FIG. 44 is a code listing showing pseudo-code for deriving a chroma motion vector in an interlaced P-frame in a combined implementation.

DETAILED DESCRIPTION

The present application relates to techniques and tools for efficient compression and decompression of interlaced video. In various described embodiments, a video encoder and decoder incorporate techniques for encoding and decoding interlaced video, and corresponding signaling techniques for use with a bit stream format or syntax comprising different layers or levels (e.g., sequence level, frame level, field level, macroblock level, and/or block level).

Various alternatives to the implementations described herein are possible. For example, techniques described with reference to flowchart diagrams can be altered by changing the ordering of stages shown in the flowcharts, by repeating or omitting certain stages, etc. As another example, although some implementations are described with reference to specific macroblock formats, other formats also can be used.

Further, techniques and tools described with reference to forward prediction may also be applicable to other types of prediction.

The various techniques and tools can be used in combination or independently. Different embodiments implement one or more of the described techniques and tools. Some techniques and tools described herein can be used in a video encoder or decoder, or in some other system not specifically limited to video encoding or decoding.

I. Computing Environment

Figure 15:
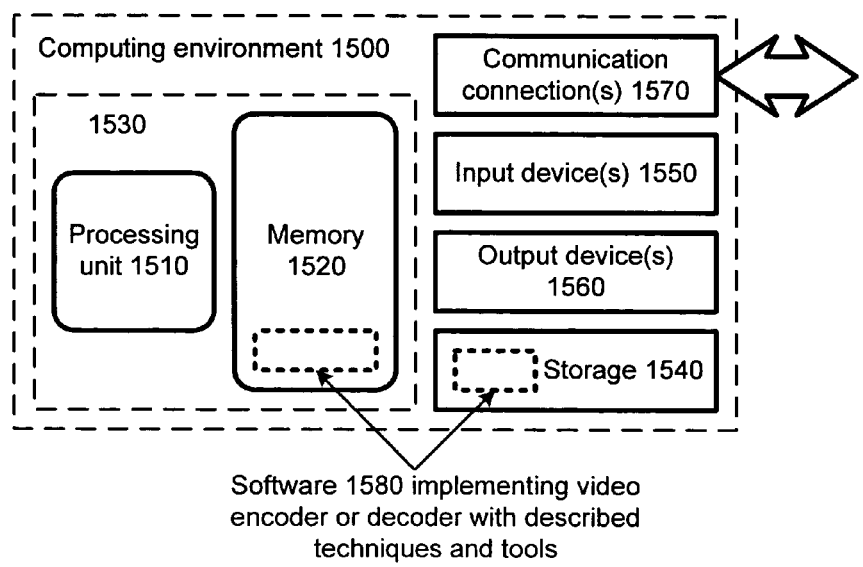
FIG. 15 is a block diagram of a suitable computing environment in conjunction with which several described embodiments may be implemented.

FIG. 15 illustrates a generalized example of a suitable computing environment 1500 in which several of the described embodiments may be implemented. The computing environment 1500 is not intended to suggest any limitation as to scope of use or functionality, as the techniques and tools may be implemented in diverse general-purpose or special-purpose computing environments.

With reference to FIG. 15, the computing environment 1500 includes at least one processing unit 1510 and memory 1520. In FIG. 15, this most basic configuration 1530 is included within a dashed line. The processing unit 1510 executes computer-executable instructions and may be a real or a virtual processor. In a multi-processing system, multiple processing units execute computer-executable instructions to increase processing power. The memory 1520 may be volatile memory (e.g., registers, cache, RAM), non-volatile memory (e.g., ROM, EEPROM, flash memory, etc.), or some combination of the two. The memory 1520 stores software 1580 implementing a video encoder or decoder with one or more of the described techniques and tools.

A computing environment may have additional features. For example, the computing environment 1500 includes storage 1540, one or more input devices 1550, one or more output devices 1560, and one or more communication connections 1570. An interconnection mechanism (not shown) such as a bus, controller, or network interconnects the components of the computing environment 1500. Typically, operating system software (not shown) provides an operating environment for other software executing in the computing environment 1500, and coordinates activities of the components of the computing environment 1500.

The storage 1540 may be removable or non-removable, and includes magnetic disks, magnetic tapes or cassettes, CD-ROMs, DVDs, or any other medium which can be used to store information and which can be accessed within the computing environment 1500. The storage 1540 stores instructions for the software 1580 implementing the video encoder or decoder.

The input device(s) 1550 may be a touch input device such as a keyboard, mouse, pen, or trackball, a voice input device, a scanning device, or another device that provides input to the computing environment 1500. For audio or video encoding, the input device(s) 1550 may be a sound card, video card, TV tuner card, or similar device that accepts audio or video input in analog or digital form, or a CD-ROM or CD-RW that reads audio or video samples into the computing environment 1500. The output device(s) 1560 may be a display, printer, speaker, CD-writer, or another device that provides output from the computing environment 1500.

The communication connection(s) 1570 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The techniques and tools can be described in the general context of computer-readable media. Computer-readable media are any available media that can be accessed within a computing environment. By way of example, and not limitation, with the computing environment 1500, computer-readable media include memory 1520, storage 1540, communication media, and combinations of any of the above.

The techniques and tools can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment.

For the sake of presentation, the detailed description uses terms like "estimate," "compensate," "predict," and "apply" to describe computer operations in a computing environment. These terms are high-level abstractions for operations performed by a computer, and should not be confused with acts performed by a human being. The actual computer operations corresponding to these terms vary depending on implementation.

II. Generalized Video Encoder and Decoder

Figure 16:
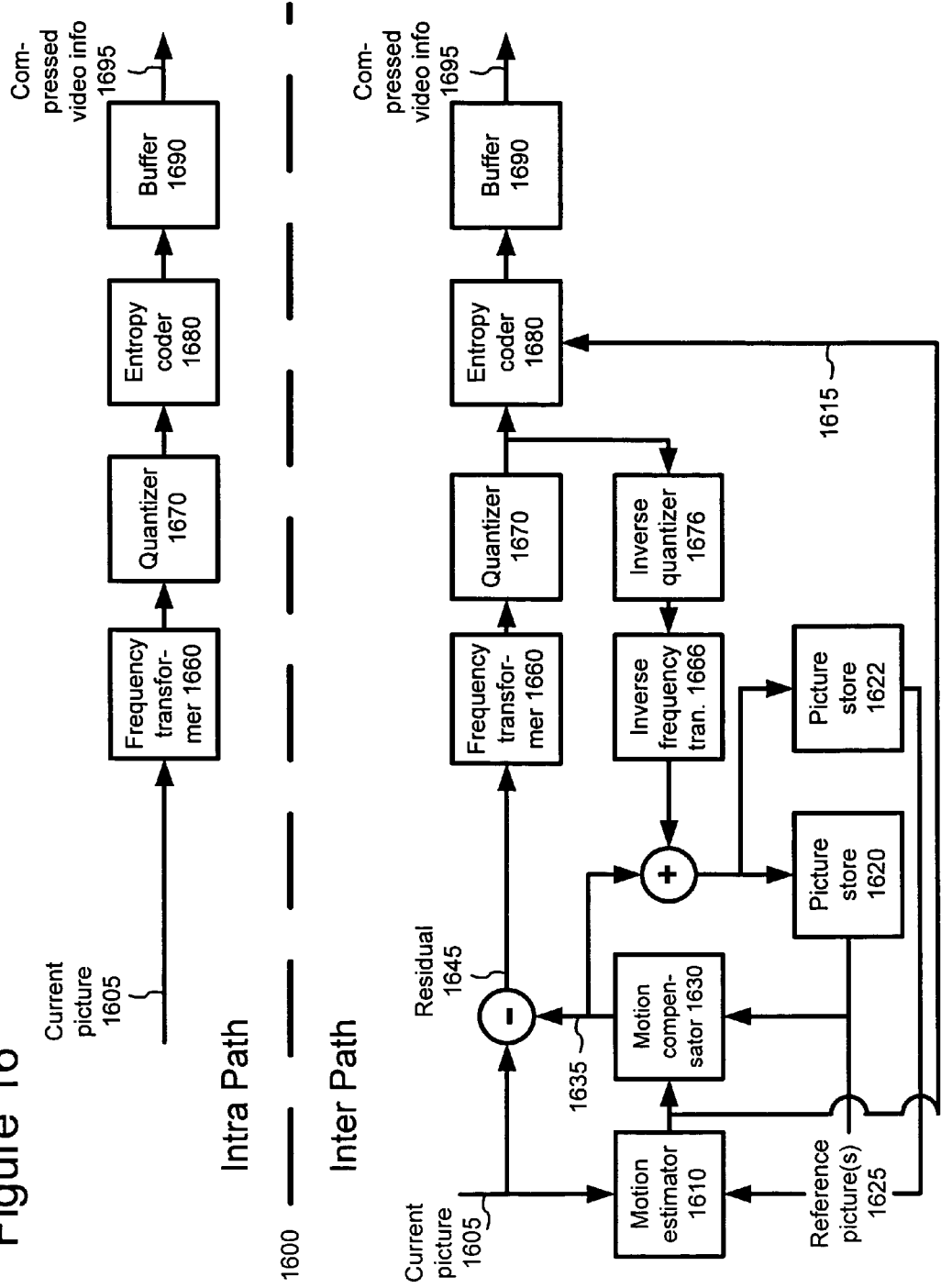
FIG. 16 is a block diagram of a generalized video encoder system in conjunction with which several described embodiments may be implemented.
Figure 17:
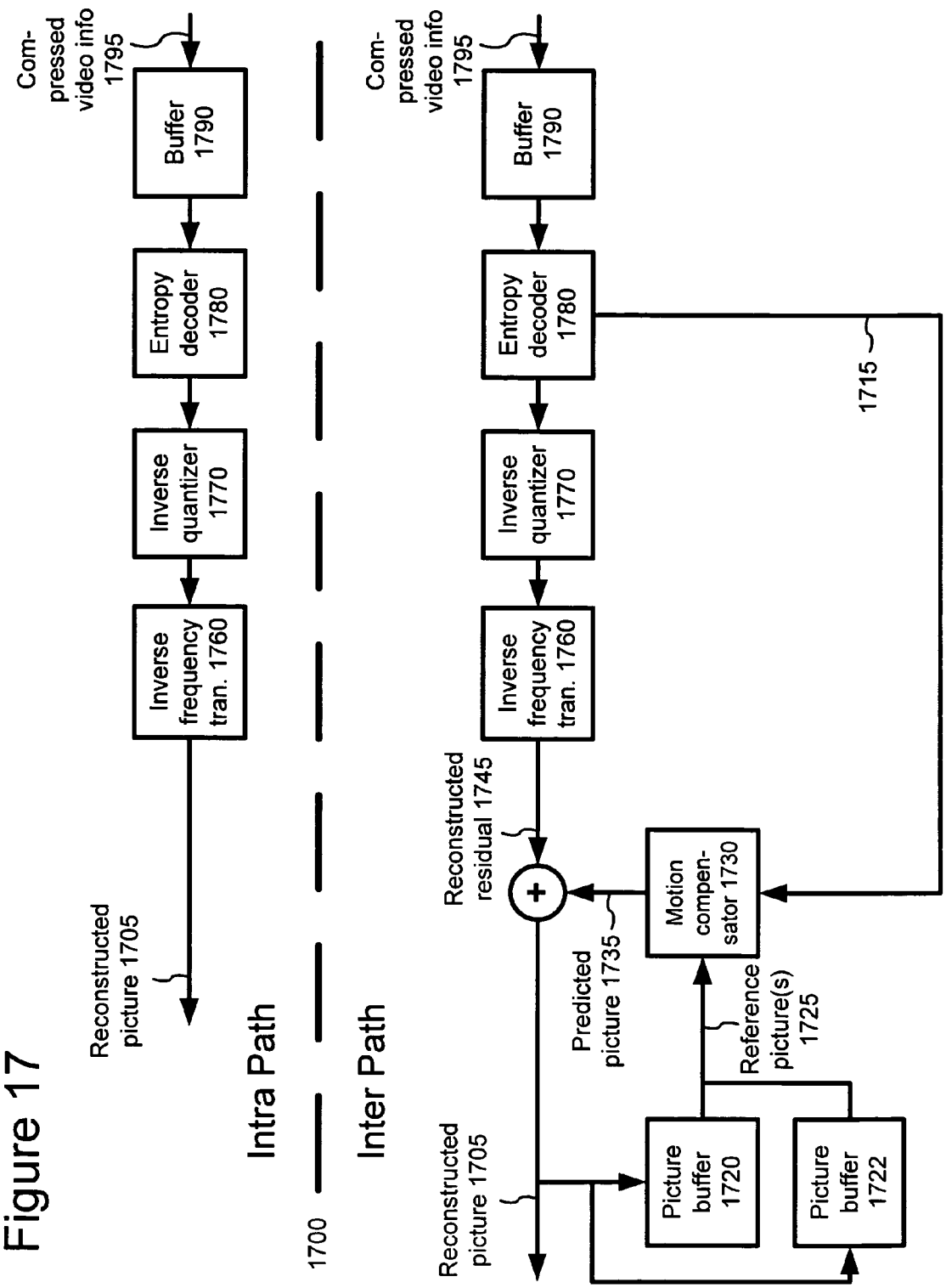
FIG. 17 is a block diagram of a generalized video decoder system in conjunction with which several described embodiments may be implemented.

FIG. 16 is a block diagram of a generalized video encoder 1600 in conjunction with which some described embodiments may be implemented. FIG. 17 is a block diagram of a generalized video decoder 1700 in conjunction with which some described embodiments may be implemented.

The relationships shown between modules within the encoder 1600 and decoder 1700 indicate general flows of information in the encoder and decoder; other relationships are not shown for the sake of simplicity. In particular, FIGS. 16 and 17 usually do not show side information indicating the encoder settings, modes, tables, etc. used for a video sequence, picture, macroblock, block, etc. Such side information is sent in the output bitstream, typically after entropy encoding of the side information. The format of the output bitstream can be a Windows Media Video version 9 format or other format.

The encoder 1600 and decoder 1700 process video pictures, which may be video frames, video fields or combinations of frames and fields. The bitstream syntax and semantics at the picture and macroblock levels may depend on whether frames or fields are used. There may be changes to macroblock organization and overall timing as well. The encoder 1600 and decoder 1700 are block-based and use a 4:2:0 macroblock format for frames, with each macroblock including four 8×8 luminance blocks (at times treated as one 16×16 macroblock) and two 8×8 chrominance blocks. For fields, the same or a different macroblock organization and format may be used. The 8×8 blocks may be further sub-divided at different stages, e.g., at the frequency transform and entropy encoding stages. Example video frame organizations are described in more detail below. Alternatively, the encoder 1600 and decoder 1700 are object-based, use a different macroblock or block format, or perform operations on sets of pixels of different size or configuration than 8×8 blocks and 16×16 macroblocks.

Depending on implementation and the type of compression desired, modules of the encoder or decoder can be added, omitted, split into multiple modules, combined with other modules, and/or replaced with like modules. In alternative embodiments, encoders or decoders with different modules and/or other configurations of modules perform one or more of the described techniques.

A. Video Frame Organizations

In some implementations, the encoder 1600 and decoder 1700 process video frames organized as follows. A frame contains lines of spatial information of a video signal. For progressive video, these lines contain samples starting from one time instant and continuing through successive lines to the bottom of the frame. A progressive video frame is divided into macroblocks such as the macroblock 1800 shown in FIG. 18. The macroblock 1800 includes four 8×8 luminance blocks (Y1 through Y4) and two 8×8 chrominance blocks that are co-located with the four luminance blocks but half resolution horizontally and vertically, following the conventional 4:2:0 macroblock format. The 8×8 blocks may be further sub-divided at different stages, e.g., at the frequency transform (e.g., 8×4, 4×8 or 4×4 DCTs) and entropy encoding stages. A progressive I-frame is an intra-coded progressive video frame. A progressive P-frame is a progressive video frame coded using forward prediction, and a progressive B-frame is a progressive video frame coded using bi-directional prediction. Progressive P- and B-frames may include intra-coded macroblocks as well as different types of predicted macroblocks.

Figure 19A:
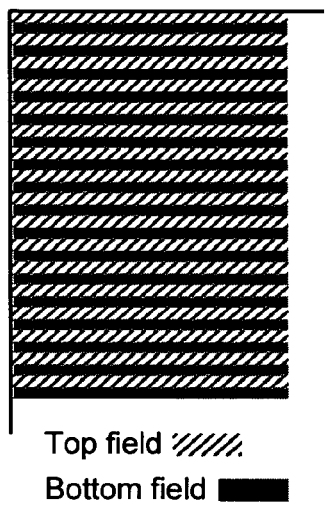
FIG. 19A is a diagram of part of an interlaced video frame, showing alternating lines of a top field and a bottom field.

An interlaced video frame consists of two scans of a frame—one comprising the even lines of the frame (the top field) and the other comprising the odd lines of the frame (the bottom field). The two fields may represent two different time periods or they may be from the same time period. FIG. 19A shows part of an interlaced video frame 1900, including the alternating lines of the top field and bottom field at the top left part of the interlaced video frame 1900.

Figure 18:
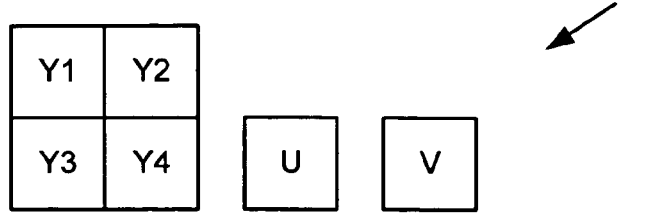
FIG. 18 is a diagram of a macroblock format used in several described embodiments.
Figure 19B:
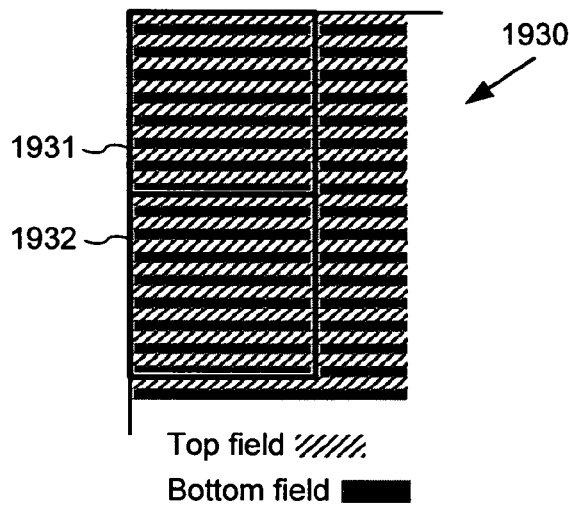
FIG. 19B is a diagram of the interlaced video frame organized for encoding/decoding as a frame.

FIG. 19B shows the interlaced video frame 1900 of FIG. 19A organized for encoding/decoding as a frame 1930. The interlaced video frame 1900 has been partitioned into macroblocks such as the macroblocks 1931 and 1932, which use a 4:2:0 format as shown in FIG. 18. In the luminance plane, each macroblock 1931, 1932 includes 8 lines from the top field alternating with 8 lines from the bottom field for 16 lines total, and each line is 16 pixels long. (The actual organization and placement of luminance blocks and chrominance blocks within the macroblocks 1931, 1932 are not shown, and in fact may vary for different encoding decisions.) Within a given macroblock, the top-field information and bottom-field information may be coded jointly or separately at any of various phases. An interlaced I-frame is two intra-coded fields of an interlaced video frame, where a macroblock includes information for the two fields. An interlaced P-frame is two fields of an interlaced video frame coded using forward prediction, and an interlaced B-frame is two fields of an interlaced video frame coded using bidirectional prediction, where a macroblock includes information for the two fields. Interlaced P- and B-frames may include intra-coded macroblocks as well as different types of predicted macroblocks. Interlaced BI-frames are a hybrid of interlaced I-frames and interlaced B-frames; they are intra-coded, but are not used as anchors for other frames.

Figure 19C:
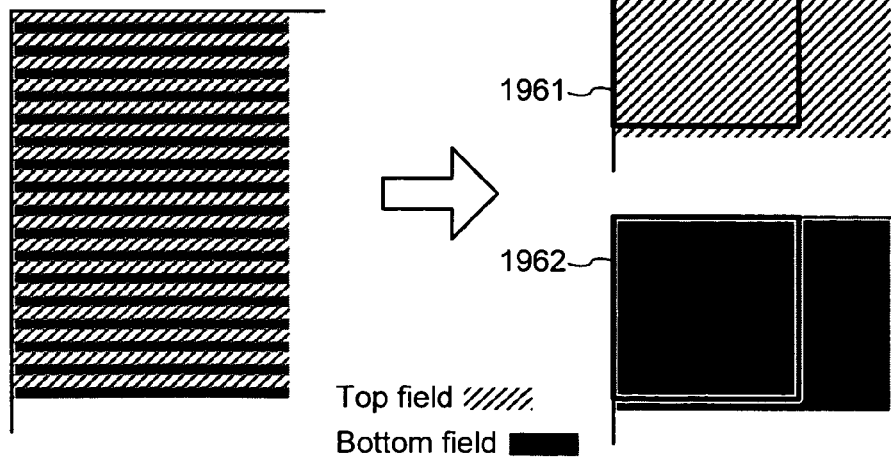
FIG. 19C is a diagram of the interlaced video frame organized for encoding/decoding as fields.

FIG. 19C shows the interlaced video frame 1900 of FIG. 19A organized for encoding/decoding as fields 1960. Each of the two fields of the interlaced video frame 1900 is partitioned into macroblocks. The top field is partitioned into macroblocks such as the macroblock 1961, and the bottom field is partitioned into macroblocks such as the macroblock 1962. (Again, the macroblocks use a 4:2:0 format as shown in FIG. 18, and the organization and placement of luminance blocks and chrominance blocks within the macroblocks are not shown.) In the luminance plane, the macroblock 1961 includes 16 lines from the top field and the macroblock 1962 includes 16 lines from the bottom field, and each line is 16 pixels long. An interlaced I-field is a single, separately represented field of an interlaced video frame. An interlaced P-field is a single, separately represented field of an interlaced video frame coded using forward prediction, and an interlaced B-field is a single, separately represented field of an interlaced video frame coded using bi-directional prediction. Interlaced P- and B-fields may include intra-coded macroblocks as well as different types of predicted macroblocks. Interlaced BI-fields are a hybrid of interlaced I-fields and interlaced B-fields; they are intra-coded, but are not used as anchors for other fields.

Interlaced video frames organized for encoding/decoding as fields can include various combinations of different field types. For example, such a frame can have the same field type in both the top and bottom fields or different field types in each field. In one implementation, the possible combinations of field types include I/I, I/P, P/I, P/P, B/B, B/BI, BI/B, and BI/BI.

The term picture generally refers to source, coded or reconstructed image data. For progressive video, a picture is a progressive video frame. For interlaced video, a picture may refer to an interlaced video frame, the top field of the frame, or the bottom field of the frame, depending on the context.

Alternatively, the encoder 1600 and decoder 1700 are object-based, use a different macroblock or block format, or perform operations on sets of pixels of different size or configuration than 8×8 blocks and 16×16 macroblocks.

B. Video Encoder

FIG. 16 is a block diagram of a generalized video encoder system 1600. The encoder system 1600 receives a sequence of video pictures including a current picture 1605 (e.g., progressive video frame, interlaced video frame, or field of an interlaced video frame), and produces compressed video information 1695 as output. Particular embodiments of video encoders typically use a variation or supplemented version of the generalized encoder 1600.

The encoder system 1600 compresses predicted pictures and key pictures. For the sake of presentation, FIG. 16 shows a path for key pictures through the encoder system 1600 and a path for predicted pictures. Many of the components of the encoder system 1600 are used for compressing both key pictures and predicted pictures. The exact operations performed by those components can vary depending on the type of information being compressed.

A predicted picture (e.g., progressive P-frame or B-frame, interlaced P-field or B-field, or interlaced P-frame or B-frame) is represented in terms of prediction (or difference) from one or more other pictures (which are typically referred to as reference pictures or anchors). A prediction residual is the difference between what was predicted and the original picture. In contrast, a key picture (e.g., progressive I-frame, interlaced I-field, or interlaced I-frame) is compressed without reference to other pictures.

If the current picture 1605 is a forward-predicted picture, a motion estimator 1610 estimates motion of macroblocks or other sets of pixels of the current picture 1605 with respect to one or more reference pictures, for example, the reconstructed previous picture 1625 buffered in the picture store 1620. If the current picture 1605 is a bi-directionally-predicted picture, a motion estimator 1610 estimates motion in the current picture 1605 with respect to up to four reconstructed reference pictures (for an interlaced B-field, for example). Typically, a motion estimator estimates motion in a B-picture with respect to one or more temporally previous reference pictures and one or more temporally future reference pictures. Accordingly, the encoder system 1600 can use the separate stores 1620 and 1622 for multiple reference pictures. For more information on progressive B-frames and interlaced B-frames and B-fields, see U.S. patent application Ser. No. 10/622,378, entitled, "Advanced Bi-Directional Predictive Coding of Video Frames," filed Jul. 18, 2003, and U.S. patent application Ser. No. 10/882,135, entitled, "Advanced Bi-Directional Predictive Coding of Interlaced Video," filed Jun. 29, 2004, which is hereby incorporated herein by reference.

The motion estimator 1610 can estimate motion by pixel, ½ pixel, ¼ pixel, or other increments, and can switch the resolution of the motion estimation on a picture-by-picture basis or other basis. The motion estimator 1610 (and compensator 1630) also can switch between types of reference picture pixel interpolation (e.g., between bicubic and bilinear) on a per-frame or other basis. The resolution of the motion estimation can be the same or different horizontally and vertically. The motion estimator 1610 outputs as side information motion information 1615 such as differential motion vector information. The encoder 1600 encodes the motion information 1615 by, for example, computing one or more predictors for motion vectors, computing differentials between the motion vectors and predictors, and entropy coding the differentials. To reconstruct a motion vector, a motion compensator 1630 combines a predictor with differential motion vector information. Various techniques for computing motion vector predictors, computing differential motion vectors, and reconstructing motion vectors for interlaced P-frames are described below.

The motion compensator 1630 applies the reconstructed motion vector to the reconstructed picture(s) 1625 to form a motion-compensated current picture 1635. The prediction is rarely perfect, however, and the difference between the motion-compensated current picture 1635 and the original current picture 1605 is the prediction residual 1645. During later reconstruction of the picture, the prediction residual 1645 is added to the motion compensated current picture 1635 to obtain a reconstructed picture that is closer to the original current picture 1605. In lossy compression, however, some information is still lost from the original current picture 1605. Alternatively, a motion estimator and motion compensator apply another type of motion estimation/compensation.

A frequency transformer 1660 converts the spatial domain video information into frequency domain (i.e., spectral) data. For block-based video pictures, the frequency transformer 1660 applies a DCT, variant of DCT, or other block transform to blocks of the pixel data or prediction residual data, producing blocks of frequency transform coefficients. Alternatively, the frequency transformer 1660 applies another conventional frequency transform such as a Fourier transform or uses wavelet or sub-band analysis. The frequency transformer 1660 may apply an 8×8, 8×4, 4×8, 4×4 or other size frequency transform.

A quantizer 1670 then quantizes the blocks of spectral data coefficients. The quantizer applies uniform, scalar quantization to the spectral data with a step-size that varies on a picture-by-picture basis or other basis. Alternatively, the quantizer applies another type of quantization to the spectral data coefficients, for example, a non-uniform, vector, or non-adaptive quantization, or directly quantizes spatial domain data in an encoder system that does not use frequency transformations. In addition to adaptive quantization, the encoder 1600 can use frame dropping, adaptive filtering, or other techniques for rate control.

The encoder 1600 may use special signaling for a skipped macroblock, which is a macroblock that has no information of certain types (e.g., no motion information for the macroblock and no residual information).

When a reconstructed current picture is needed for subsequent motion estimation/compensation, an inverse quantizer 1676 performs inverse quantization on the quantized spectral data coefficients. An inverse frequency transformer 1666 then performs the inverse of the operations of the frequency transformer 1660, producing a reconstructed prediction residual (for a predicted picture) or a reconstructed key picture. If the current picture 1605 was a key picture, the reconstructed key picture is taken as the reconstructed current picture (not shown). If the current picture 1605 was a predicted picture, the reconstructed prediction residual is added to the motion-compensated current picture 1635 to form the reconstructed current picture. One or both of the picture stores 1620, 1622 buffers the reconstructed current picture for use in motion compensated prediction. In some embodiments, the encoder applies a de-blocking filter to the reconstructed frame to adaptively smooth discontinuities and other artifacts in the picture.

The entropy coder 1680 compresses the output of the quantizer 1670 as well as certain side information (e.g., motion information 1615, quantization step size). Typical entropy coding techniques include arithmetic coding, differential coding, Huffman coding, run length coding, LZ coding, dictionary coding, and combinations of the above. The entropy coder 1680 typically uses different coding techniques for different kinds of information (e.g., DC coefficients, AC coefficients, different kinds of side information), and can choose from among multiple code tables within a particular coding technique.

The entropy coder 1680 provides compressed video information 1695 to the multiplexer ["MUX"] 1690. The MUX 1690 may include a buffer, and a buffer level indicator may be fed back to bit rate adaptive modules for rate control. Before or after the MUX 1690, the compressed video information 1695 can be channel coded for transmission over the network. The channel coding can apply error detection and correction data to the compressed video information 1695.

C. Video Decoder

FIG. 17 is a block diagram of a general video decoder system 1700. The decoder system 1700 receives information 1795 for a compressed sequence of video pictures and produces output including a reconstructed picture 1705 (e.g., progressive video frame, interlaced video frame, or field of an interlaced video frame). Particular embodiments of video decoders typically use a variation or supplemented version of the generalized decoder 1700.

The decoder system 1700 decompresses predicted pictures and key pictures. For the sake of presentation, FIG. 17 shows a path for key pictures through the decoder system 1700 and a path for forward-predicted pictures. Many of the components of the decoder system 1700 are used for decompressing both key pictures and predicted pictures. The exact operations performed by those components can vary depending on the type of information being decompressed.

A DEMUX 1790 receives the information 1795 for the compressed video sequence and makes the received information available to the entropy decoder 1780. The DEMUX 1790 may include a jitter buffer and other buffers as well.

Before or after the DEMUX 1790, the compressed video information can be channel decoded and processed for error detection and correction.

The entropy decoder 1780 entropy decodes entropy-coded quantized data as well as entropy-coded side information (e.g., motion information 1715, quantization step size), typically applying the inverse of the entropy encoding performed in the encoder. Entropy decoding techniques include arithmetic decoding, differential decoding, Huffman decoding, run length decoding, LZ decoding, dictionary decoding, and combinations of the above. The entropy decoder 1780 typically uses different decoding techniques for different kinds of information (e.g., DC coefficients, AC coefficients, different kinds of side information), and can choose from among multiple code tables within a particular decoding technique.

The decoder 1700 decodes the motion information 1715 by, for example, computing one or more predictors for motion vectors, entropy decoding differential motion vectors, and combining decoded differential motion vectors with predictors to reconstruct motion vectors.

A motion compensator 1730 applies motion information 1715 to one or more reference pictures 1725 to form a prediction 1735 of the picture 1705 being reconstructed. For example, the motion compensator 1730 uses one or more macroblock motion vector to find macroblock(s) in the reference picture(s) 1725. One or more picture stores (e.g., picture store 1720, 1722) store previous reconstructed pictures for use as reference pictures. Typically, B-pictures have more than one reference picture (e.g., at least one temporally previous reference picture and at least one temporally future reference picture). Accordingly, the decoder system 1700 can use separate picture stores 1720 and 1722 for multiple reference pictures. The motion compensator 1730 can compensate for motion at pixel, ½ pixel, ¼ pixel, or other increments, and can switch the resolution of the motion compensation on a picture-by-picture basis or other basis. The motion compensator 1730 also can switch between types of reference picture pixel interpolation (e.g., between bicubic and bilinear) on a per-frame or other basis. The resolution of the motion compensation can be the same or different horizontally and vertically. Alternatively, a motion compensator applies another type of motion compensation. The prediction by the motion compensator is rarely perfect, so the decoder 1700 also reconstructs prediction residuals.

An inverse quantizer 1770 inverse quantizes entropy-decoded data. In general, the inverse quantizer applies uniform, scalar inverse quantization to the entropy-decoded data with a step-size that varies on a picture-by-picture basis or other basis. Alternatively, the inverse quantizer applies another type of inverse quantization to the data, for example, to reconstruct after a non-uniform, vector, or non-adaptive quantization, or directly inverse quantizes spatial domain data in a decoder system that does not use inverse frequency transformations.

An inverse frequency transformer 1760 converts the quantized, frequency domain data into spatial domain video information. For block-based video pictures, the inverse frequency transformer 1760 applies an inverse DCT ["IDCT"], variant of IDCT, or other inverse block transform to blocks of the frequency transform coefficients, producing pixel data or prediction residual data for key pictures or predicted pictures, respectively. Alternatively, the inverse frequency transformer 1760 applies another conventional inverse frequency transform such as an inverse Fourier transform or uses wavelet or sub-band synthesis. The inverse frequency transformer 1760 may apply an 8×8, 8×4, 4×8, 4×4, or other size inverse frequency transform.

For a predicted picture, the decoder 1700 combines the reconstructed prediction residual 1745 with the motion compensated prediction 1735 to form the reconstructed picture 1705. When the decoder needs a reconstructed picture 1705 for subsequent motion compensation, one or both of the picture stores (e.g., picture store 1720) buffers the reconstructed picture 1705 for use in predicting the next picture. In some embodiments, the decoder 1700 applies a de-blocking filter to the reconstructed picture to adaptively smooth discontinuities and other artifacts in the picture.

III. Interlaced P-Frames

A typical interlaced video frame consists of two fields (e.g., a top field and a bottom field) scanned at different times. In general, it is more efficient to encode stationary regions of an interlaced video frame by coding fields together ("frame mode" coding). On the other hand, it is often more efficient to code moving regions of an interlaced video frame by coding fields separately ("field mode" coding), because the two fields tend to have different motion. A forward-predicted interlaced video frame may be coded as two separate forward-predicted fields—interlaced P-fields. Coding fields separately for a forward-predicted interlaced video frame may be efficient, for example, when there is high motion throughout the interlaced video frame, and hence much difference between the fields. An interlaced P-field references one or more previously decoded fields. For example, in some implementations, an interlaced P-field references either one or two previously decoded fields. For more information on interlaced P-fields, see U.S. Provisional Patent Application No. 60/501,081, entitled "Video Encoding and Decoding Tools and Techniques," filed Sep. 7, 2003, and U.S. patent application Ser. No. 10/857,473, entitled, "Predicting Motion Vectors for Fields of Forward-predicted Interlaced Video Frames," filed May 27, 2004, which is incorporated herein by reference.

Or, a forward-predicted interlaced video frame may be coded using a mixture of field coding and frame coding, as an interlaced P-frame. For a macroblock of an interlaced P-frame, the macroblock includes lines of pixels for the top and bottom fields, and the lines may be coded collectively in a frame-coding mode or separately in a field-coding mode.

A. Macroblock Types in Interlaced P-Frames

In some implementations, macroblocks in interlaced P-frames can be one of five types: 1MV, 2 Field MV, 4 Frame MV, 4 Field MV, and Intra.

In a 1MV macroblock, the displacement of the four luminance blocks in the macroblock is represented by a single motion vector. A corresponding chroma motion vector can be derived from the luma motion vector to represent the displacements of each of the two 8×8 chroma blocks for the motion vector. For example, referring again to the macroblock arrangement shown in FIG. 18, a 1MV macroblock 1800 includes four 8×8 luminance blocks and two 8×8 chrominance blocks. The displacement of the luminance blocks (Y1 through Y4) are represented by single motion vector, and a corresponding chroma motion vector can be derived from the luma motion vector to represent the displacements of each of the two chroma blocks (U and V).

Figure 20:
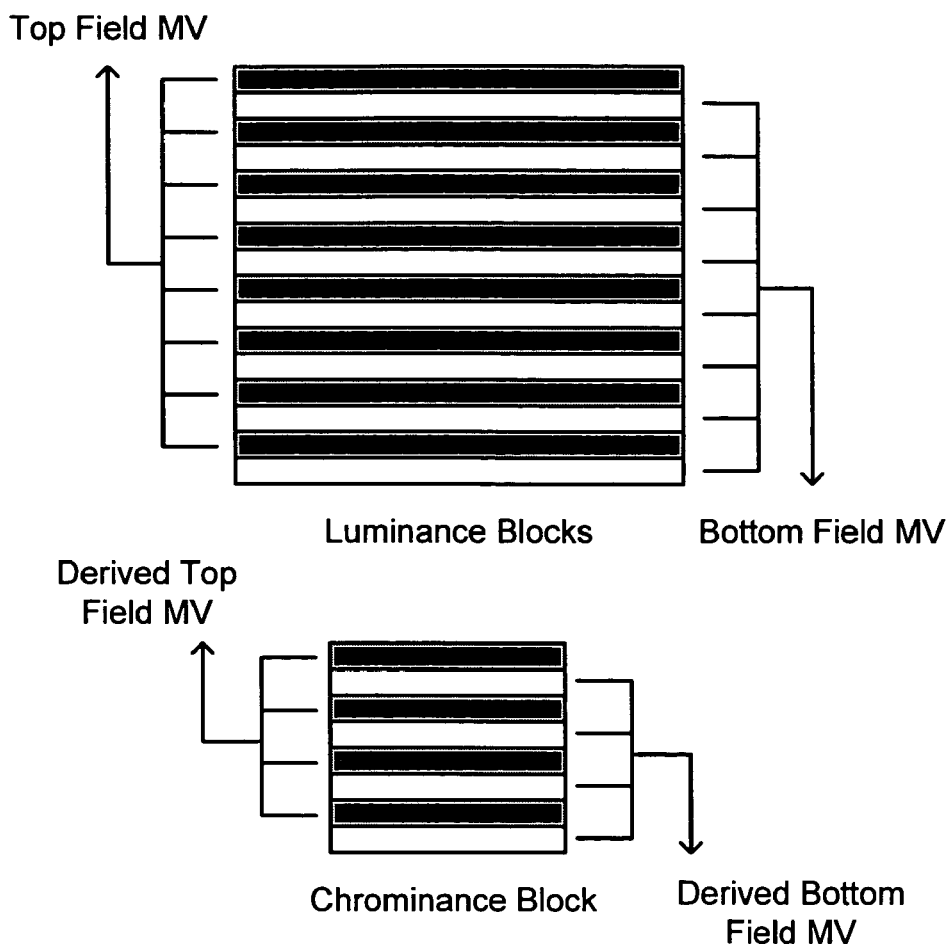
FIG. 20 is a diagram showing motion vectors for luminance blocks and derived motion vectors for chrominance blocks in a 2 field MV macroblock of an interlaced P-frame.

In a 2 Field MV macroblock, the displacement of each field for the 16×16 luminance component in the macroblock is described by a different motion vector. For example, FIG. 20 shows that a top field motion vector describes the displacement of the even lines of the luminance component and that a bottom field motion vector describes the displacement of the odd lines of the luminance component. Using the top field motion vector, an encoder can derive a corresponding top field chroma motion vector that describes the displacement of the even lines of the chroma blocks. Similarly, an encoder can derive a bottom field chroma motion vector that describes the displacements of the odd lines of the chroma blocks.

Figure 21:
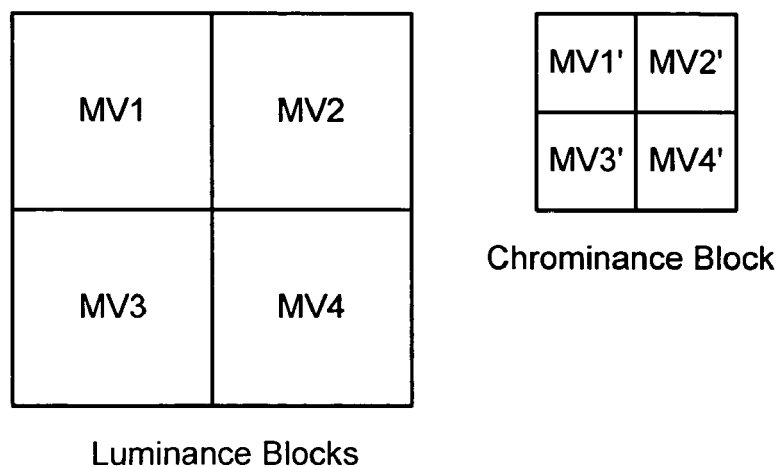
FIG. 21 is a diagram showing different motion vectors for each of four luminance blocks, and derived motion vectors for each of four chrominance sub-blocks, in a 4 frame MV macroblock of an interlaced P-frame.

Referring to FIG. 21, in a 4 Frame MV macroblock, the displacement of each of the four luminance blocks is described by a different motion vector (MV1, MV2, MV3 and MV4). Each chroma block can be motion compensated by using four derived chroma motion vectors (MV1', MV2', MV3' and MV4') that describe the displacement of four 4×4 chroma sub-blocks. A motion vector for each 4×4 chroma sub-block can be derived from the motion vector for the spatially corresponding luminance block.

Referring to FIG. 22, in a 4 Field MV macroblock, the displacement of each field in the 16×16 luminance component is described by two different motion vectors. The lines of the luminance component are subdivided vertically to form two 8×16 regions each comprised of an 8×8 region of even lines interleaved with an 8×8 region of odd lines. For the even lines, the displacement of the left 8×8 region is described by the top left field block motion vector and the displacement of the right 8×8 region is described by the top right field block motion vector. For the odd lines, the displacement of the left 8×8 region is described by the bottom left field block motion vector and the displacement of the right 8×8 region is described by the bottom right field block motion vector. Each chroma block also can be partitioned into four regions and each chroma block region can be motion compensated using a derived motion vector.

For Intra macroblocks, motion is assumed to be zero.

B. Computing Motion Vector Predictors in Interlaced P-Frames

In general, the process of computing the motion vector predictor(s) for a current macroblock in an interlaced P-frame consists of two steps. First, up to three candidate motion vectors for the current macroblock are gathered from its neighboring macroblocks. For example, in one implementation, candidate motion vectors are gathered based on the arrangement shown in FIGS. 23A-23B (and various special cases for top row macroblocks, etc.). Alternatively, candidate motion vectors can be gathered in some other order or arrangement. Second, the motion vector predictor(s) for the current macroblock is computed from the set of candidate motion vectors. For example, the predictor can be computed using median-of-3 prediction, or by some other method.

IV. Innovations in Motion Vector Prediction in Interlaced P-Frames

The process of motion vector prediction can be conceptually separated into two steps. First, a set of candidate motion vectors is collected from the neighboring blocks and, if appropriate, converted to an appropriate type depending on the type of prediction used for the current motion vector. Then, a motion vector predictor is derived from the set of candidate motion vectors. As described in detail below, a current motion vector predictor can be derived from candidate motion vectors in different ways, such as by performing a median operation on a full set of valid candidate motion vectors, by just choosing one of the candidate motion vectors if a full set of valid candidate motion vector is not available, or by some other method.

As explained above in Section III, each macroblock in an interlaced P-frame can be motion compensated using 1 frame motion vector, 4 frame motion vectors, 2 field motion vectors, or 4 field motion vectors. Each field motion vector can refer to either the top field or bottom field of the reference frame, independent of which field is referred to by the other. In some implementations, motion vector prediction takes into account several factors, such as a neighboring macroblock or block's motion vector and motion prediction type, current motion vector type, etc., to derive a motion vector predictor for the current motion vector of the current macroblock (or block or field thereof).

Described embodiments implement one or more of the described techniques and tools for predicting, coding and decoding motion vectors in interlaced frame coded pictures, including, but not limited to, the following:
1. Predicting macroblocks in interlaced P-frames using four field motion vectors (e.g., in combination with other macroblock types such as 1MV, 4 Frame MV, 2 Field MV, and/or intra.)
2. Improving motion vector prediction by limiting use of median operations to cases where all three candidate neighbor motion vectors are available, and taking one of the neighboring motion vectors in a pre-specified order in other cases.
3. For field motion vectors, considering field polarities in the collection of legal candidate motion vectors.

The described techniques and tools can be used in combination with one another or with other techniques and tools, or can be used independently.

A. 4 Field MV Macroblocks in Interlaced P-Frames

In some implementations, an encoder/decoder processes macroblocks having four field motion vectors (e.g., 4 Field MV macroblocks) in interlaced P-frames. 4 Field MV macroblocks provide improved spatial adaptivity to motion for motion estimation and compensation for field-coded macroblocks in interlaced P-frames.

Figure 24:
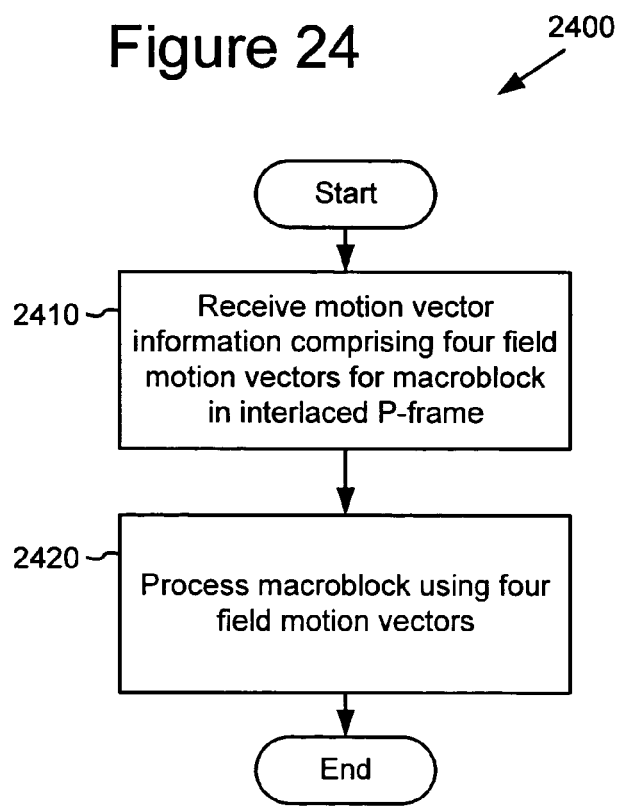
FIG. 24 is a flow chart showing a technique for processing a macroblock having four field motion vectors in an interlaced P-frame.

For example, FIG. 24 shows a technique 2400 for processing a macroblock having four field motion vectors in an interlaced P-frame. At 2410, an encoder/decoder receives motion vector information (e.g., motion vector differentials, motion vector values) for four field motion vectors for a macroblock in an interlaced P-frame. Then, at 2420, the encoder/decoder processes the macroblock (e.g., by reconstructing the macroblock) using the four field motion vectors.

Alternatively, an encoder/decoder performs motion estimation/compensation in an interlaced P-frame without 4 Field MV macroblocks.

B. Gathering Candidate Motion Vectors

Figure 23A:
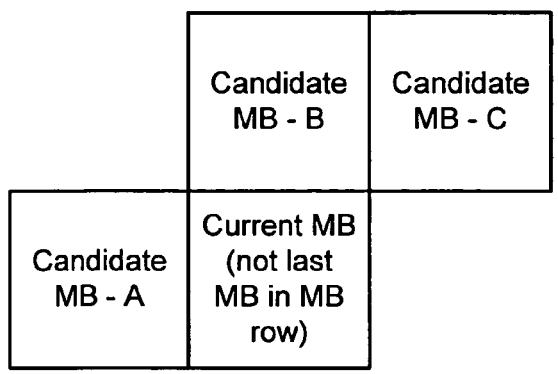
FIGS. 23A-23B are diagrams showing candidate predictors for a current macroblock of an interlaced P-frame.
Figure 23B:
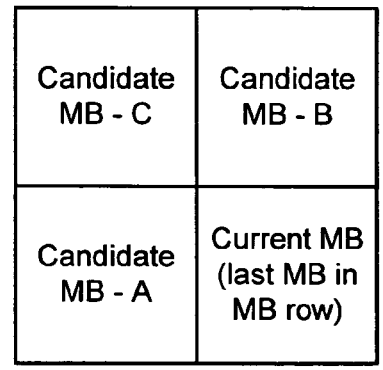

In some implementations, the order of the collection of candidate motion vectors is important. For example, three candidate motion vectors for a current macroblock in an interlaced P-frame are gathered from its neighboring macroblocks, as shown in FIGS. 23A-23B. In one implementation the order of collection starts with neighboring macroblock A, proceeds to macroblock B, and ends at macroblock C.

The pseudo-code in FIGS. 30-40 describes how candidate motion vectors are collected in one implementation. The encoder/decoder checks neighboring macroblocks to determine if they "exist" (i.e., are valid) for purposes of predicting a motion vector for a current macroblock (including for a block, field of the macroblock, or half field of the macroblock). A predictor candidate is considered to be non-existent (i.e., not valid) if the corresponding macroblock/block is outside the frame boundary or if the corresponding macroblock/block is part of a different slice. Thus, motion vector prediction is not performed across slice boundaries.

As shown in FIGS. 30-40, if a neighboring macroblock is valid and is not intra-coded, a motion vector from the neighboring macroblock is added to a set of candidate motion vectors. The actual motion vector added to the set of candidates depends on the position of the neighboring macroblock relative to the current macroblock (e.g., position A, B, or C), and on the type (e.g., 1MV, 4 Frame MV, 2 Field MV, or 4 Frame MV) of both the neighboring macroblock and the current macroblock.

Pseudo-code 3000 in FIG. 30 shows how the up to three candidate motion vectors for a current motion vector in 1MV macroblocks are collected in one implementation.

Pseudo-code 3100, 3200, 3300, and 3400 in FIGS. 31, 32, 33, and 34, respectively, show how the candidate motion vectors from the neighboring macroblocks/blocks are collected for each of the four frame block motion vectors in a current 4 Frame MV macroblock in one implementation. In this implementation, the encoder/decoder uses the algorithms shown in pseudo-code 3100, 3200, 3300, and 3400 to collect the up to three candidate motion vectors for the top left frame block motion vector, the top right frame block motion vector, the bottom left frame block motion vector, and the bottom right frame block motion vector, respectively.

Pseudo-code 3500 and 3600 in FIGS. 35 and 36, respectively, show how the candidate motion vectors from the neighboring macroblocks are collected for each of the two field motion vectors in a current 2 Field MV macroblock in one implementation. In this implementation, the encoder/decoder uses the algorithms shown in pseudo-code 3500 and 3600 to collect the up to three candidate motion vectors for the top field motion vector and the bottom field motion vector, respectively.

Pseudo-code 3700, 3800, 3900, and 4000 in FIGS. 37, 38, 39 and 40, respectively, show how the candidate motion vectors from the neighboring macroblocks/blocks are collected for each of the four field block motion vectors in a current 4 Field MV macroblock in one implementation. In this implementation, the encoder/decoder uses the algorithms shown in pseudo-code 3700, 3800, 3900, and 4000 to collect the up to three candidate motion vectors for the top left field block motion vector, the top right field block motion vector, the bottom left field block motion vector, and the bottom right field block motion vector, respectively.

In some cases, the selected candidate motion vector is actually an average of motion vectors in the neighboring macroblock. In one implementation, given two field motion vectors ($MVX_1$, $MVY_1$) and ($MVX_2$, $MVY_2$), the average operation used to form a candidate frame motion vector ($MVX_A$, $MVY_A$) is:

$$MVX_A = (MVX_1 + MVX_2 + 1) >> 1;$$

$$MVY_A = (MVY_1 + MVY_2 + 1) >> 1;$$

Alternatively, candidate motion vectors can be collected according to collection rules differing from those shown in FIGS. 30-40. For example, the particular motion vectors chosen to be candidates from neighboring macroblocks having more than one motion vector (e.g., 4 Frame MV, 2 Field MV, or 4 Field MV macroblocks) can be varied. As another example, the ordering of the motion vectors in the set of candidates can be adjusted from the described A-B-C ordering to some other ordering.

C. Computing Frame MV Predictors from Candidate Motion Vectors

The pseudo-code 4100 in FIG. 41 describes how the motion vector predictor ($PMV_x$, $PMV_y$) is computed for frame motion vectors in one implementation. In the pseudo-code 4100, TotalValidMV denotes the total number of valid motion vectors in the set of candidate motion vectors (TotalValidMV=0, 1, 2, or 3), and the ValidMV array includes the valid motion vectors in the set of candidate motion vectors.

In one implementation, pseudo-code 4100 is used to compute the predictor from a set of candidate motion vectors for the motion vector in 1MV macroblocks as well as for each one of the four frame block motion vectors in 4 Frame MV macroblocks.

D. Computing Field MV Predictors from Candidate Motion Vectors

Techniques and tools for computing motion vector predictors for field motion vectors given a set of candidate motion vectors are described in this section. The techniques and tools described in this section can be used for computing the predictor for each of the two field motion vectors (in 2 Field MV macroblocks) as well as for each one of the four field motion vectors (in 4 Field MV macroblocks).

Figure 25:
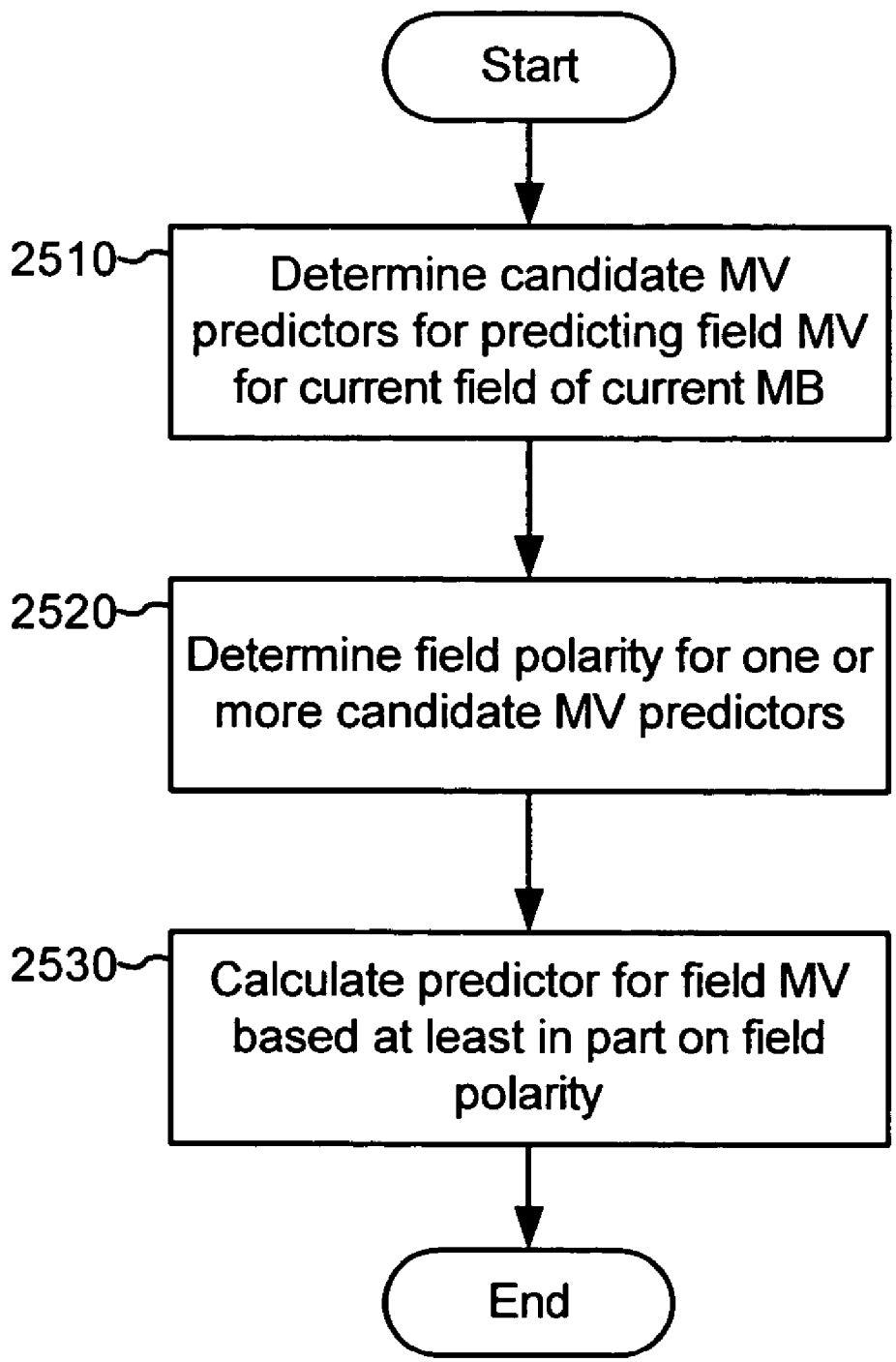
FIG. 25 is a flow chart showing a technique for calculating motion vector predictors for a field-coded macroblock based on the polarity of candidate motion vectors.

In some implementations, an encoder/decoder considers the polarity of a field referred to by a candidate motion vector when computing predictors. FIG. 25 shows a technique 2500 for calculating motion vector predictors for a field-coded macroblock based on the polarity of candidate motion vectors. At 2510, the encoder/decoder determines candidate motion vectors for predicting a field motion vector for a current field of a current macroblock. At 2520, the encoder/decoder determines a field polarity for one or more valid candidates. Then, at 2530, the encoder/decoder calculates a motion vector predictor for the field motion vector based at least in part on the field polarities of the one or more valid candidates. For example, in one implementation, the candidate motion vectors are separated into two sets, where one set contains only motion vectors that point to the same field as the current field and the other set contains motion vectors that point to the opposite field. The encoder/decoder then uses the one of the two sets to calculate a motion vector predictor. While not shown in FIG. 25, the process of calculating a motion vector predictor for a current macroblock can be repeated for each motion vector of the macroblock, and for additional macroblocks in a frame.

Assuming that the motion vectors are represented in quarter pixel units, the encoder/decoder can check whether a candidate motion vector points to the same field or opposite field (relative to the polarity of the current field) by performing the following check on its y-component:

```
if (ValidMV_y & 4) {
    ValidMV points to the opposite field.
} else {
    ValidMV points to the same field.
}
```

In the pseudo-code above, $ValidMV_y$ is the y-component of the candidate motion vector measured in quarter-pixel increments. Therefore, in binary, the least significant bit of $ValidMV_y$ is the quarter-pel bit, the second least significant bit is the half-pel bit, and the third least significant bit is the full-pel bit. The bitwise AND operation ($ValidMV_y$ & 4) therefore determines whether the full-pel bit is 1 (indicating an odd integer) or 0 (indicating an even integer). If the integer offset is odd, the candidate motion vector references the opposite polarity field in the reference frame. If the integer offset is even, the candidate motion vector references the same polarity field in the reference frame.

Alternatively, the polarity of candidate motion vectors is determined in some other way, or the polarity of candidates is not considered during calculation of motion vector predictors.

The pseudo-code 4200 in FIG. 42 describes how the motion vector predictor ($PMV_x$, $PMV_y$) is computed for a field motion vector in one implementation. In the pseudo-code 4200, SameFieldMV [ ] and OppFieldMV [ ] denote the two sets of candidate motion vectors and NumSameFieldMV and NumOppFieldMV denote the number of candidate motion vectors that belong to each set. In the example shown in pseudo-code 4200, the number of available candidate motion vectors in these sets determines whether a median operation will be used to calculate a motion vector predictor.

Figure 26:
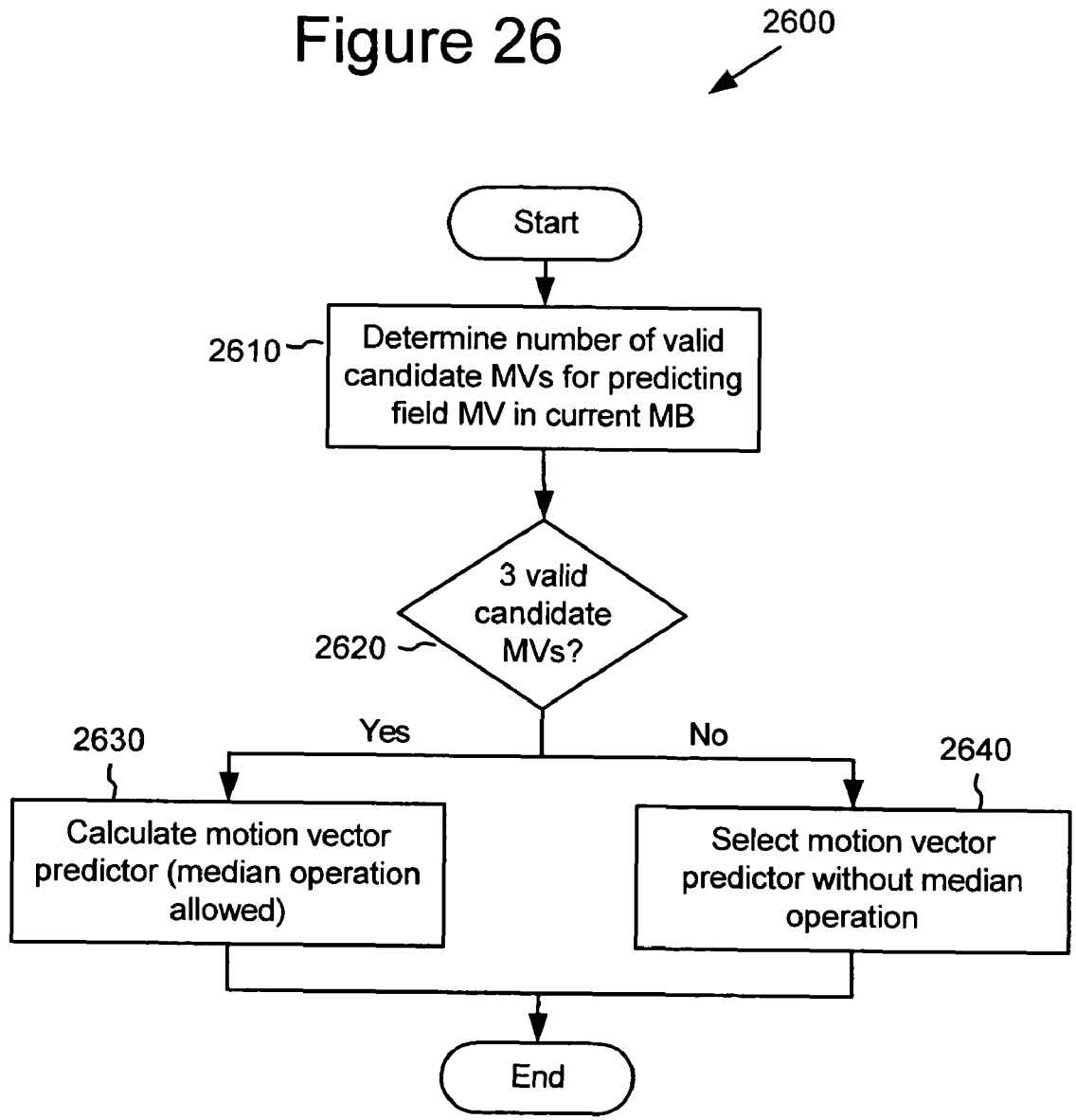
FIG. 26 is a flow chart showing a technique for determining whether to perform a median operation when calculating a motion vector predictor for a field motion vector.

FIG. 26 shows a technique 2600 for determining whether to perform a median operation when calculating a motion vector predictor for a field motion vector. At 2610, an encoder/decoder determines the number of valid candidate motion vectors for predicting a field motion vector in a current macroblock. At 2620, if there are three valid candidate motion vectors, then at 2630, a median operation can be used during calculation of the predictor. At 2640, if there are not three valid candidates (i.e., there are two or fewer valid candidates), a motion vector predictor is selected from among the available valid candidates using another method—a median operation is not used.

In the example in the pseudo-code 4200, the encoder/decoder derives the motion vector predictor by performing a median operation (e.g., median3) on the candidate x-components or y-components when all three candidate motion vectors are valid, and when all three valid candidate motion vectors are of the same polarity. If all three candidate motion vectors are valid, but not all of them are the same polarity, the encoder/decoder chooses the set that has the most candidates to derive the motion vector predictor. In the case where both sets have the same number of candidates, the encoder/decoder uses the set SameFieldMV [ ]. For the case where there are less than three candidates, the encoder/decoder selects the first candidate from the chosen set in a pre-specified order. In this example, the order of candidate motion vectors in each set starts with candidate A if it exists, followed by candidate B if it exists, and then candidate C if it exists. For example, if the encoder/decoder uses set SameFieldMV [ ] and if the set SameFieldMV [ ] contains only candidate B and candidate C, then the encoder/decoder uses candidate B as the motion vector predictor. If the number of valid candidates is zero, the encoder/decoder sets the predictor to (0, 0).

Alternatively, motion vector predictors can be computed in ways other than those described above. For example, although pseudo-code 4200 includes a bias toward selecting same-field candidates, the computation of predictors can be adjusted to remove the bias or to use an opposite field bias. As another example, median operations can be used in more situations (e.g., when two valid field motion vector candidates are present), or not at all, or a non-median operation for two valid candidates may be an averaging operation. As yet another example, the ordering of the candidates in the sets can be adjusted, or the candidates can all be stored in one set.

V. Combined Implementations

A detailed combined implementation for a bitstream syntax, semantics, and decoder are now described, in addition to an alternative combined implementation with minor differences from the main combined implementation.

A. Bitstream Syntax

In various combined implementations, data for interlaced P-frames is presented in the form of a bitstream having plural layers (e.g., sequence, entry point, frame, field, macroblock, block and/or sub-block layers).

In the syntax diagrams, arrow paths show the possible flows of syntax elements. Syntax elements shown with square-edged boundaries indicate fixed-length syntax elements; those with rounded boundaries indicate variable-length syntax elements and those with a rounded boundary within an outer rounded boundary indicate a syntax element (e.g., a bitplane) made up of simpler syntax elements. A fixed-length syntax element is defined to be a syntax element for which the length of the syntax element is not dependent on data in the syntax element itself; the length of a fixed-length syntax element is either constant or determined by prior data in the syntax flow. A lower layer in a layer diagram (e.g., a macroblock layer in a frame-layer diagram) is indicated by a rectangle within a rectangle.

Figure 27:
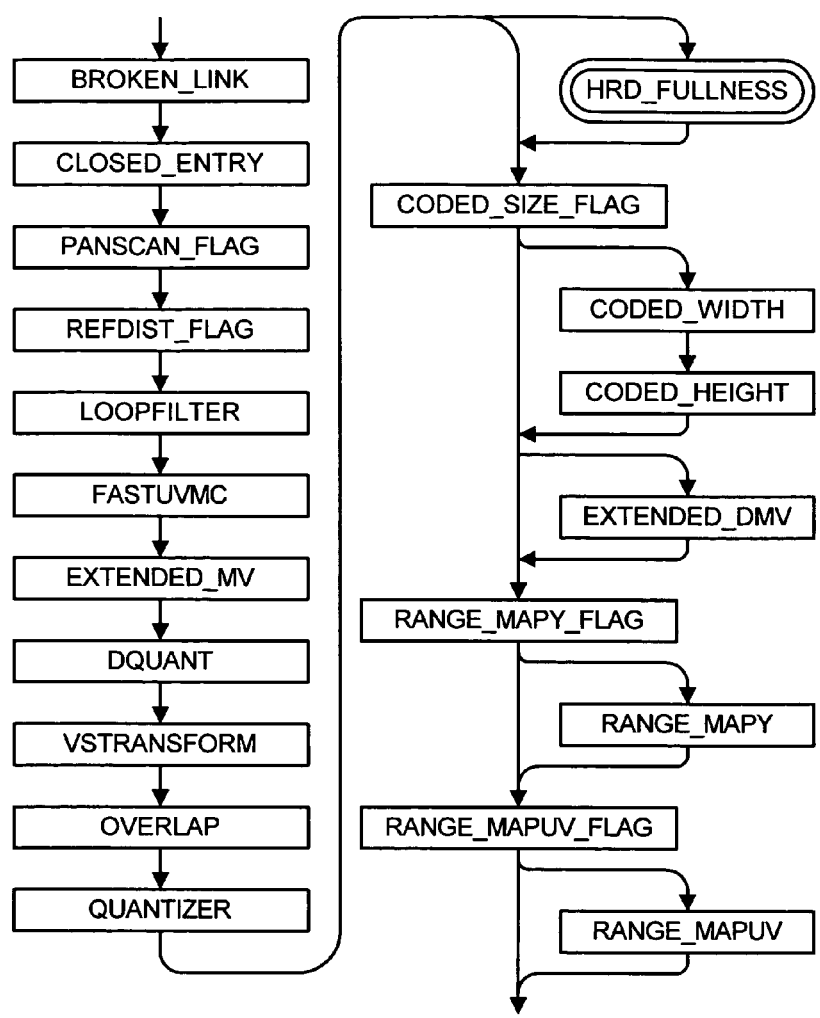
FIG. 27 is a diagram showing an entry-point-layer bitstream syntax in a combined implementation.

Entry-point-level bitstream elements are shown in FIG. 27. In general, an entry point marks a position in a bitstream (e.g., an I-frame or other key frame) at which a decoder can begin decoding. In other words, no pictures before the entry point in the bitstream are needed to decode pictures after the entry point. An entry point header can be used to signal changes in coding control parameters (e.g., enabling or disabling compression tools (e.g., in-loop deblocking filtering) for frames following an entry point).

Figure 28:
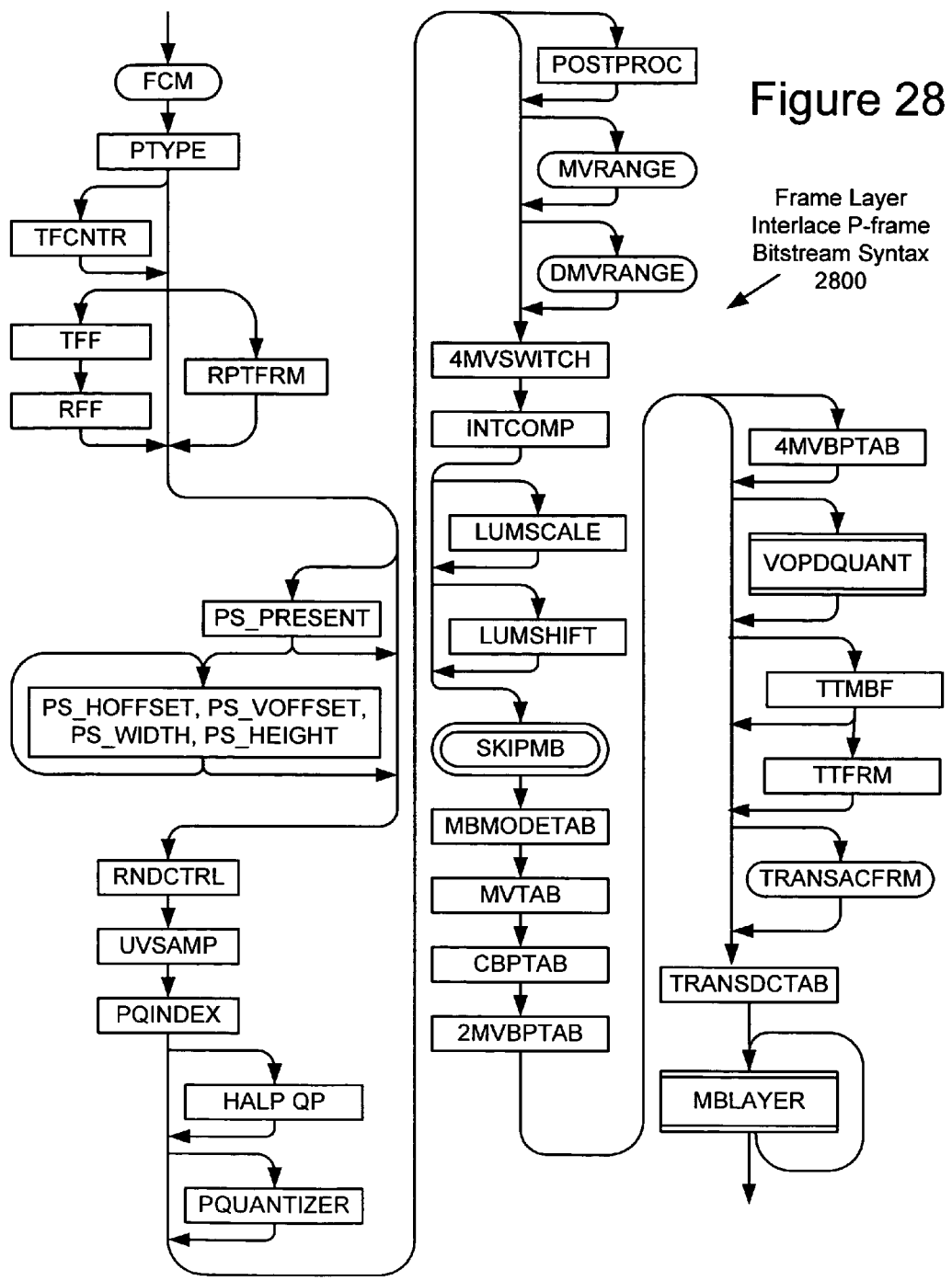
FIG. 28 is a diagram showing a frame-layer bitstream syntax for interlaced P-frames in a combined implementation.
Figure 29:
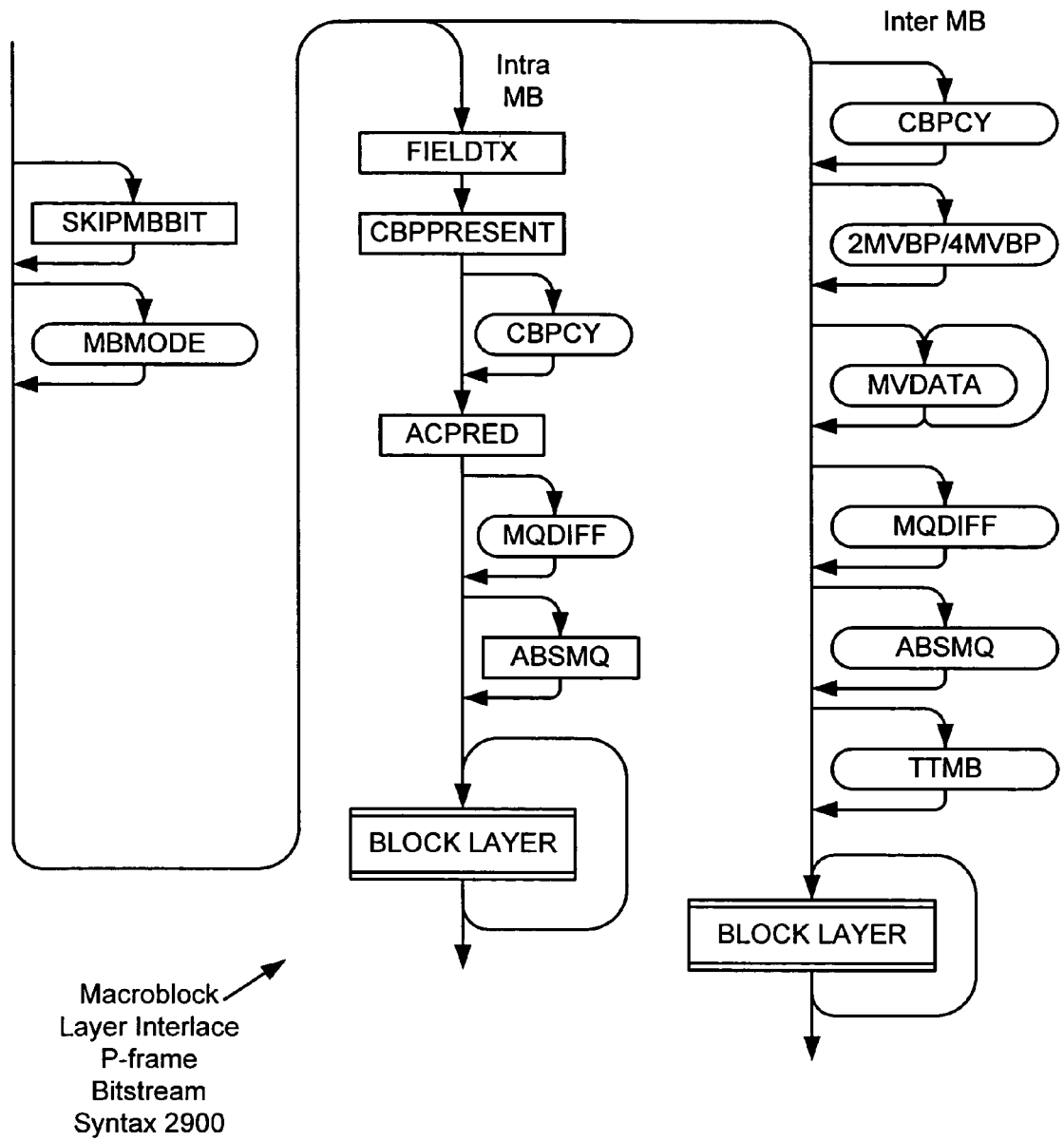
FIG. 29 is a diagram showing a macroblock-layer bitstream syntax for macroblocks of interlaced P-frames in a combined implementation.

For interlaced P-frames, frame-level bitstream elements are shown in FIG. 28. Data for each frame consists of a frame header followed by data for the macroblock layer. The bitstream elements that make up the macroblock layer for interlaced P-frames (whether for intra or various inter type macroblocks) are shown in FIG. 29.

The following sections describe selected bitstream elements in the frame and macroblock layers that are related to signaling for interlaced P-frames. Although the selected bitstream elements are described in the context of a particular layer, some bitstream elements can be used in more than one layer.

1. Selected Entry Point Layer Elements

Loop Filter (LOOPFILTER) (1 Bit)

LOOPFILTER is a Boolean flag that indicates whether loop filtering is enabled for the entry point segment. If LOOPFILTER=0, then loop filtering is not enabled. If LOOPFILTER=1, then loop filtering is enabled. In an alternative combined implementation, LOOPFILTER is a sequence level element.

Extended Motion Vectors (EXTENDED_MV) (1 Bit)

EXTENDED_V is a 1-bit syntax element that indicates whether extended motion vectors is turned on (value 1) or off (value 0). EXTENDED_MV indicates the possibility of extended motion vectors (signaled at frame level with the syntax element MVRANGE) in P-frames and B-frames.

Extended Differential Motion Vector Range (EXTENDED_DMV)(1 Bit)

EXTENDED_DMV is a 1-bit syntax element that is present if EXTENDED_MV=1. If EXTENDED_DMV is 1, extended differential motion vector range (DMVRANGE) shall be signaled at frame layer for the P-frames and B-frames within the entry point segment. If EXTENDED_DMV is 0, DMVRANGE shall not be signaled.

FAST UV Motion Comp (FASTUVMC) (1 Bit)

FASTUVMC is a Boolean flag that controls the sub-pixel interpolation and rounding of chroma motion vectors. If FASTUVMC=1, the chroma motion vectors that are at quarter-pel offsets will be rounded to the nearest half or full-pel positions. If FASTUVMC=0, no special rounding or filtering is done for chroma. The FASTUVMC syntax element is ignored in interlaced P-frames and interlaced B-frames. Variable Sized Transform (VSTRANSFORM) (1 Bit)

VSTRANSFORM is a Boolean flag that indicates whether variable-sized transform coding is enabled for the sequence. If VSTRANSFORM=0, then variable-sized transform coding is not enabled. If VSTRANSFORM=1, then variable-sized transform coding is enabled.

2. Selected Frame Layer Elements

Frame Coding Mode (FCM) (Variable Size)

FCM is a variable length codeword ["VLC"] used to indicate the picture coding type. FCM takes on values for frame coding modes as shown in Table 1 below:

TABLE 1

Frame Coding Mode VLC

| FCM value | Frame Coding Mode |
|---|---|
| 0 | Progressive |
| 10 | Frame-Interlace |
| 11 | Field-Interlace |

Picture Type (PTYPE) (Variable Size)

PTYPE is a variable size syntax element present in the frame header for interlaced P-frames (or other kinds of interlaced frames such as interlaced B-frames and interlaced I-frames). PTYPE takes on values for different frame types according to Table 2 below.

TABLE 2

Picture Type VLC

| PTYPE VLC | Picture Type |
|---|---|
| 110 | I |
| 0 | P |
| 10 | B |
| 1110 | BI |
| 1111 | Skipped |

If PTYPE indicates that the frame is skipped then the frame is treated as a P-frame which is identical to its reference frame. The reconstruction of the skipped frame is equivalent conceptually to copying the reference frame. A skipped frame means that no further data is transmitted for this frame.

UV Sampling Format (UVSAMP) (1 Bit)

UVSAMP is a 1-bit syntax element that is present when the sequence-level field INTERLACE=1. UVSAMP indicates the type of chroma subsampling used for the current frame. If UVSAMP=1, then progressive subsampling of the chroma is used, otherwise, interlace subsampling of the chroma is used. This syntax element does not affect decoding of the bitstream.

Extended MV Range (MVRANGE) (Variable Size)

MVRANGE is a variable-sized syntax element present when the entry-point-layer EXTENDED_MV bit is set to 1. The MVRANGE VLC represents a motion vector range.

Extended Differential MV Range (DMVRANGE) (Variable Size)

DMVRANGE is a variable-sized syntax element present if the entry-point-layer syntax element EXTENDED_DMV=1. The DMVRANGE VLC represents a motion vector differential range.

4 Motion Vector Switch (4MVSWITCH) (Variable Size or 1 Bit)

For interlaced P-frames, the 4MVSWITCH syntax element is a 1-bit flag. If 4MVSWITCH is set to zero, the macroblocks in the picture have only one motion vector or two motion vectors, depending on whether the macroblock has been frame-coded or field-coded, respectively. If 4MVSWITCH is set to 1, there may be 1, 2 or 4 motion vectors per macroblock.

Skipped Macroblock Decoding (SKIPMB) (Variable Size)

For interlaced P-frames, the SKIPMB syntax element is a compressed bitplane containing information that indicates the skipped/not-skipped status of each macroblock in the picture. The decoded bitplane represents the skipped/not-skipped status for each macroblock with 1-bit values. A value of 0 indicates that the macroblock is not skipped. A value of 1 indicates that the macroblock is coded as skipped. A skipped status for a macroblock in interlaced P-frames means that the decoder treats the macroblock as 1MV with a motion vector differential of zero and a coded block pattern of zero. No other information is expected to follow for a skipped macroblock.

Macroblock Mode Table (MBMODETAB) (2 or 3 Bits)

The MBMODETAB syntax element is a fixed-length field. For interlaced P-frames, MBMODETAB is a 2-bit value that indicates which one of four code tables is used to decode the macroblock mode syntax element (MBMODE) in the macroblock layer. There are two sets of four code tables and the set that is being used depends on whether 4MV is used or not, as indicated by the 4MVSWITCH flag.

Motion Vector Table (MVTAB) (2 or 3 Bits)

The MVTAB syntax element is a fixed length field. For interlaced P-frames, MVTAB is a 2-bit syntax element that indicates which of the four progressive (or, one-reference) motion vector code tables are used to code the MVDATA syntax element in the macroblock layer.

2MV Block Pattern Table (2MVBPTAB) (2 Bits)

The 2MVBPTAB syntax element is a 2-bit value that signals which of four code tables is used to decode the 2MV block pattern (2MVBP) syntax element in 2MV field macroblocks.

4MV Block Pattern Table (4MVBPTAB) (2 Bits)

The 4MVBPTAB syntax element is a 2-bit value that signals which of four code tables is used to decode the 4MV block pattern (4MVBP) syntax element in 4MV macroblocks. For interlaced P-frames, it is present if the 4MVSWITCH syntax element is set to 1.

Macroblock-Level Transform Type Flag (TTMBF) (1 Bit)

This syntax element is present in P-frames and B-frames if the sequence-level syntax element VSTRANSFORM=1. TTMBF is a one-bit syntax element that signals whether transform type coding is enabled at the frame or macroblock level. If TTMBF=1, the same transform type is used for all blocks in the frame. In this case, the transform type is signaled in the Frame-level Transform Type (TTFRM) syntax element that follows. If TTMBF=0, the transform type may vary throughout the frame and is signaled at the macroblock or block levels.

Frame-Level Transform Type (TTFRM) (2 Bits)

This syntax element is present in P-frames and B-frames if VSTRANSFORM=1 and TTMBF=1. TTFRM signals the transform type used to transform the 8×8 pixel error signal in predicted blocks. The 8×8 error blocks may be transformed using an 8×8 transform, two 8×4 transforms, two 4×8 transforms or four 4×4 transforms.

3. Selected Macroblock Layer Elements

FIG. 29 is a diagram showing a macroblock-level bitstream syntax for macroblocks interlaced P-frames in the combined implementation. Specific bitstream elements are described below. Data for a macroblock consists of a macroblock header followed by block layer data. Bitstream elements in the macroblock layer for interlaced P-frames (e.g., SKIPMBBIT) may potentially be present for macroblocks in other interlaced pictures (e.g., interlaced B-frames, etc.)

Skip MB Bit (SKIPMBBIT)(1 Bit)

SKIPMBBIT is a 1-bit syntax element present in interlaced P-frame macroblocks and interlaced B-frame macroblocks if the frame-level syntax element SKIPMB indicates that raw mode is used. If SKIPMBBIT=1, the macroblock is skipped. SKIPMBBIT also may be labeled as SKIPMB at the macroblock level.

Macroblock Mode (MBMODE) (Variable Size)

MBMODE is a variable-size syntax element that jointly specifies macroblock type (e.g., 1MV, 2 Field MV, 4 Field MV, 4 Frame MV or Intra), transform type (e.g., field, frame, or no coded blocks), and the presence of differential motion vector data for 1MV macroblocks. MBMODE is explained in detail below.

2MV Block Pattern (2MVBP) (Variable Size)

2MVBP is a variable-sized syntax element present in interlaced P-frame and interlaced B-frame macroblocks. In interlaced P-frame macroblocks, 2MVBP is present if MBMODE indicates that the macroblock has two field motion vectors. In this case, 2MVBP indicates which of the 2 luma blocks contain non-zero motion vector differentials.

4MV Block Pattern (4MVBP) (Variable Size)

4MVBP is a variable-sized syntax element present in interlaced P-field, interlaced B-field, interlaced P-frame and interlaced B-frame macroblocks. In interlaced P-frame, 4MVBP is present if MBMODE indicates that the macroblock has four motion vectors. In this case, 4MVBP indicates which of the four luma blocks contain non-zero motion vector differentials.

Field Transform Flag (FIELDTX) (1 Bit)

FIELDTX is a 1-bit syntax present in interlaced B-frame intra-coded macroblocks. This syntax element indicates whether a macroblock is frame or field coded (basically, the internal organization of the macroblock). FIELDTX=1 indicates that the macroblock is field-coded. Otherwise, the macroblock is frame-coded. In inter-coded macroblocks, this syntax element can be inferred from MBMODE as explained in detail below.

CBP Present Flag (CBPPRESENT) (1 Bit)

CBPPRESENT is a 1-bit syntax present in intra-coded macroblocks in interlaced P-frames and interlaced B-frames. If CBPPRESENT is 1, the CBPCY syntax element is present for that macroblock and is decoded. If CBPPRESENT is 0, the CBPCY syntax element is not present and shall be set to zero.

Coded Block Pattern (CBPCY) (Variable Size)

CBPCY is a variable-length syntax element indicates the transform coefficient status for each block in the macroblock. CBPCY decodes to a 6-bit field which indicates whether coefficients are present for the corresponding block. For intra-coded macroblocks, a value of 0 in a particular bit position indicates that the corresponding block does not contain any non-zero AC coefficients. A value of 1 indicates that at least one non-zero AC coefficient is present. The DC coefficient is still present for each block in all cases. For inter-coded macroblocks, a value of 0 in a particular bit position indicates that the corresponding block does not contain any non-zero coefficients. A value of 1 indicates that at least one non-zero coefficient is present. For cases where the bit is 0, no data is encoded for that block.

Motion Vector Data (MVDATA) (Variable Size)

MVDATA is a variable sized syntax element that encodes differentials for the motion vector(s) for the macroblock, the decoding of which is described in detail in below.

MB-level Transform Type (TTMB) (Variable Size)

TTMB is a variable-size syntax element in P-picture and B-picture macroblocks when the picture layer syntax element TTMBF=0. TTMB specifies a transform type, transform type signal level, and subblock pattern.

B. Decoding Interlaced P-Frames

A process for decoding interlaced P-frames in a combined implementation is described below.

1. Macroblock Layer Decoding of Interlaced P-Frames

In an interlaced P-frame, each macroblock may be motion compensated in frame mode using one or four motion vectors or in field mode using two or four motion vectors. A macroblock that is inter-coded does not contain any intra blocks. In addition, the residual after motion compensation may be coded in frame transform mode or field transform mode. More specifically, the luma component of the residual is re-arranged according to fields if it is coded in field transform mode but remains unchanged in frame transform mode, while the chroma component remains the same. A macroblock may also be coded as intra.

Motion compensation may be restricted to not include four (both field/frame) motion vectors, and this is signaled through 4MVSWITCH. The type of motion compensation and residual coding is jointly indicated for each macroblock through MBMODE and SKIPMB. MBMODE employs a different set of tables according to 4MVSWITCH.

Macroblocks in interlaced P-frames are classified into five types: 1MV, 2 Field MV, 4 Frame MV, 4 Field MV, and Intra. These five types are described in further detail in above in Sections III and IV. The first four types of macroblock are inter-coded while the last type indicates that the macroblock is intra-coded. The macroblock type is signaled by the MBMODE syntax element in the macroblock layer along with the skip bit. (A skip condition for the macroblock also can be signaled at frame level in a compressed bit plane.) MBMODE jointly encodes macroblock types along with various pieces of information regarding the macroblock for different types of macroblock.

Skipped Macroblock Signaling

The macroblock-level SKIPMBBIT field indicates the skip condition for a macroblock. If the SKIPMBBIT field is 1, then the current macroblock is said to be skipped and there is no other information sent after the SKIPMBBIT field. (At frame level, the SKIPMB field indicates the presence of SKIPMBBIT at macroblock level (in raw mode) or stores skip information in a compressed bit plane. The decoded bitplane contains one bit per macroblock and indicates the skip condition for each respective macroblock.) The skip condition implies that the current macroblock is 1MV with zero differential motion vector (i.e. the macroblock is motion compensated using its 1MV motion predictor) and there are no coded blocks (CBP=0). In an alternative combined implementation, the residual is assumed to be frame-coded for loop filtering purposes.

On the other hand, if the SKIPMB field is not 1, the MBMODE field is decoded to indicate the type of macroblock and other information regarding the current macroblock, such as information described in the following section.

Macroblock Mode Signaling

MBMODE jointly specifies the type of macroblock (1MV, 4 Frame MV, 2 Field MV, 4 Field MV, or intra), types of transform for inter-coded macroblock (i.e. field or frame or no coded blocks), and whether there is a differential motion vector for a 1MV macroblock. MBMODE can take one of 15 possible values:

Let <MVP> denote the signaling of whether a nonzero 1MV differential motion vector is present or absent. Let <Field/Frame transform> denote the signaling of whether the residual of the macroblock is (1) frame transform coded; (2) field transform coded; or (3) zero coded blocks (i.e. CBP=0). MBMODE signals the following information jointly:

MBMODE={<1MV, MVP, Field/Frame transform>, <2 Field MV, Field/Frame transform>, <4 Frame MV, Field/Frame transform>, <4 Field MV, Field/Frame transform>, <INTRA>};

The case <1MV, MVP=0, CBP=0>, is not signaled by MBMODE, but is signaled by the skip condition.

For inter-coded macroblocks, the CBPCY syntax element is not decoded when <Field/frame Transform> in MBMODE indicates no coded blocks. On the other hand, if <Field/frame Transform> in MBMODE indicates field or frame transform, then CBPCY is decoded. The decoded <Field/frame Transform> is used to set the flag FIELDTX. If it indicates that the macroblock is field transform coded, FIELDTX is set to 1. If it indicates that the macroblock is frame transform coded, FIELDTX is set to 0. If it indicates a zero-coded block, FIELDTX is set to the same type as the motion vector, i.e., FIELDTX is set to 1 if it is a field motion vector and to 0 if it is a frame motion vector.

For non-1MV inter-coded macroblocks, an additional field is sent to indicate which of the differential motion vectors is non-zero. In the case of 2 Field MV macroblocks, the 2MVBP field is sent to indicate which of the two motion vectors contain nonzero differential motion vectors. Similarly, the 4MVBP field is sent to indicate which of the four motion vectors contain nonzero differential motion vectors.

For intra-coded macroblocks, the Field/Frame transform and zero coded blocks are coded in separate fields.

2. Motion Vector Decoding for Interlaced P-Frames

Motion Vector Predictors for Interlaced P-Frames

The process of computing the motion vector predictor(s) for the current macroblock consists of two steps. First, three candidate motion vectors for the current macroblock are gathered from its neighboring macroblocks. Second, the motion vector predictor(s) for the current macroblock is computed from the set of candidate motion vectors. FIGS. 23A-23B show neighboring macroblocks from which the candidate motion vectors are gathered. The order of the collection of candidate motion vectors is important. In this combined implementation, the order of collection always starts at A, proceeds to B, and ends at C. A predictor candidate is considered to be non-existent if the corresponding block is outside the frame boundary or if the corresponding block is part of a different slice. Thus, motion vector prediction is not performed across slice boundaries.

The following sections describe how the candidate motion vectors are collected for different types of macroblocks and how the motion vector predictors are computed.

1MV Candidate Motion Vectors

In this combined implementation, the pseudo-code 3000 in FIG. 30 is used to collect the up to three candidate motion vectors for the motion vector.

4 Frame MV Candidate Motion Vectors

For 4 Frame MV macroblocks, for each of the four frame block motion vectors in the current macroblock, the candidate motion vectors from the neighboring blocks are collected. In this combined implementation, the pseudo-code 3100 in FIG. 31 is used to collect the up to three candidate motion vectors for the top left frame block motion vector. The pseudo-code 3200 in FIG. 32 is used to collect the up to three candidate motion vectors for the top right frame block motion vector. The pseudo-code 3300 in FIG. 33 is used to collect the up to three candidate motion vectors for the bottom left frame block motion vector. The pseudo-code 3400 in FIG. 34 is used to collect the up to three candidate motion vectors for the bottom right frame block motion vector.

2 Field MV Candidate Motion Vectors

For 2 Field MV macroblocks, for each of the two field motion vectors in the current macroblock, the candidate motion vectors from the neighboring blocks are collected. The pseudo-code 3500 in FIG. 35 is used to collect the up to three candidate motion vectors for the top field motion vector. The pseudo-code 3600 in FIG. 36 is used to collect the up to three candidate motion vectors for the bottom field motion vector.

4 Field MV Candidate Motion Vectors

For 4 Field MV macroblocks, for each of the four field blocks in the current macroblock, the candidate motion vectors from the neighboring blocks are collected. The pseudo-code 3700 in FIG. 37 is used to collect the up to three candidate motion vectors for the top left field block motion vector. The pseudo-code 3800 in FIG. 38 is used to collect the up to three candidate motion vectors for the top right field block motion vector. The pseudo-code 3900 in FIG. 39 is used to collect the up to three candidate motion vectors for the bottom left field block motion vector. The pseudo-code 4000 in FIG. 40 is used to collect the up to three candidate motion vectors for the bottom right field block motion vector.

Average Field Motion Vectors

Given two field motion vectors $(MVX_1, MVY_2)$ and $(MVX_2, MVY_2)$, the average operation used to form a candidate motion vector $(MVX_A, MVY_A)$ is:

$$MVX_A = (MVX_1 + MVX_2 + 1) >> 1;$$

$$MVY_A = (MVY_1 + MVY_2 + 1) >> 1;$$

Computing Frame MV Predictors from Candidate Motion Vectors

This section describes how motion vector predictors are calculated for frame motion vectors given a set of candidate motion vectors. In this combined implementation, the operation is the same for computing the predictor for 1MV or for each one of the four frame block motion vectors in 4 Frame MV macroblocks.

The pseudo-code 4100 in FIG. 41 describes how the motion vector predictor $(PMV_x, PMV_y)$ is computed for frame motion vectors. In the pseudo-code 4100, TotalValidMV denotes the total number of motion vectors in the set of candidate motion vectors (TotalValidMV=0, 1, 2, or 3), and the ValidMV array denotes the motion vector in the set of candidate motion vectors.

Computing Field MV Predictors from Candidate Motion Vectors

This section describes how motion vector predictors are computed for field motion vectors given the set of candidate motion vectors in a combined implementation. In this combined implementation, the operation is the same for computing the predictor for each of the two field motion vectors in 2 Field MV macroblocks or for each of the four field block motion vectors in 4 Field MV macroblocks.

First, the candidate motion vectors are separated into two sets, where one set contains only candidate motion vectors that point to the same field as the current field and the other set contains candidate motion vectors that point to the opposite field. Assuming that the candidate motion vectors are represented in quarter pixel units, the following check on its y-component verifies whether a candidate motion vector points to the same field:

```
if (ValidMV_y & 4) {
    ValidMV points to the opposite field.
} else {
    ValidMV points to the same field.
}
```

The pseudo-code 4200 in FIG. 42 describes how the motion vector predictor $(PMV_x, PMV_y)$ is computed for field motion vectors. In the pseudo-code 4200, SameFieldMV and OppFieldMV denote the two sets of candidate motion vectors and NumSameFieldMV and NumOppFieldMV denote the number of candidate motion vectors that belong to each set. The order of candidate motion vectors in each set starts with candidate A if it exists, followed by candidate B if it exists, and then candidate C if it exists. For example, if the set SameFieldMV contains only candidate B and candidate C, then SameFieldMV[0] is candidate B.

Decoding Motion Vector Differentials

The MVDATA syntax elements contain motion vector differential information for the macroblock. Depending on the type of motion compensation and motion vector block pattern signaled at each macroblock, there may be from zero to four MVDATA syntax elements per macroblock. More specifically, For 1MV macroblocks, there may be either zero or one MVDATA syntax element present depending on the MVP field in MBMODE.

For 2 Field MV macroblocks, there may be either zero, one, or two MVDATA syntax element(s) present depending on 2MVBP.

For 4 Frame/Field MV macroblocks, there may be either zero, one, two, three, or four MVDATA syntax element(s) present depending on 4MVBP.

In this combined implementation, the motion vector differential is decoded in the same way as a one reference field motion vector differential for interlaced P-fields, without a half-pel mode. (The pseudo-code 4300 in FIG. 43A illustrates how the motion vector differential is decoded for a one-reference field. The pseudo-code 4310 in FIG. 43B illustrates how the motion vector differential is decoded for a one-reference field in an alternative combined implementation. Pseudo-code 4310 decodes motion vector differentials in a different way. For example, pseudo-code 4310 omits handling of extended motion vector differential ranges.)

Reconstructing Motion Vectors

Given the motion vector differential dmv, the luma motion vector is reconstructed by adding the differential to the predictor as follows:

$$mv\_x=(dmv\_x+predictor\_x)smod\ range\_x$$

$$mv\_y=(dmv\_y+predictor\_y)smod\ range\_y$$

The smod operation ensures that the reconstructed vectors are valid. (A smod b) lies within −b and b−1. range_x and range_y depend on MVRANGE.

Given a luma frame or field motion vector, a corresponding chroma frame or field motion vector is derived to compensate a portion (or potentially all) of the chroma ($C_b/C_r$) block. The FASTUVMC syntax element is ignored in interlaced P-frames and interlaced B-frames. The pseudo-code 4400 in FIG. 44 describes how a chroma motion vector CMV is derived from a luma motion vector LMV in interlace P-frames.

Having described and illustrated the principles of our invention with reference to various embodiments, it will be recognized that the various embodiments can be modified in arrangement and detail without departing from such principles. It should be understood that the programs, processes, or methods described herein are not related or limited to any particular type of computing environment, unless indicated otherwise. Various types of general purpose or specialized computing environments may be used with or perform operations in accordance with the teachings described herein. Elements of embodiments shown in software may be implemented in hardware and vice versa.

In view of the many possible embodiments to which the principles of our invention may be applied, we claim as our invention all such embodiments as may come within the scope and spirit of the following claims and equivalents thereto.

We claim:

1. A method of decoding encoded video information using a video decoder, the method comprising:
   receiving encoded video information in a bitstream; and
   with the video decoder, decoding a current interlaced frame coded picture using the encoded video information, wherein the decoding includes motion vector prediction for a field motion vector for a current field of a current macroblock in the current interlaced frame coded picture, and wherein the motion vector prediction includes:
      with the video decoder, determining a number of one or more valid candidate motion vectors for predicting the field motion vector for the current field of the current macroblock in the current interlaced frame coded picture, wherein the current field has a polarity, and wherein the field motion vector and the one or more valid candidate motion vectors refer to a reference frame;
      with the video decoder, for each of the one or more valid candidate motion vectors, determining field polarity of the valid candidate motion vector, including determining whether the valid candidate motion vector refers to a same polarity field in the reference frame or opposite polarity field in the reference frame, wherein the same polarity field in the reference frame has polarity the same as the polarity of the current field, and wherein the opposite polarity field in the reference frame has polarity opposite the polarity of the current field; and
      with the video decoder, calculating a motion vector predictor for the field motion vector based at least in part on the one or more valid candidate motion vectors and based at least in part on the determined field polarities of the one or more valid candidate motion vectors, wherein the calculating the motion vector predictor includes:
         determining a number of same field candidate motion vectors;
         determining a number of opposite field candidate motion vectors; and
         determining the motion vector predictor depending on the number of valid candidate motion vectors, the number of same field candidate motion vectors and the number of opposite field candidate motion vectors, including, when the number of valid candidate motion vectors is three:
            if the number of same field candidate motion vectors is three or the number of opposite field candidate motion vectors is three, computing median of the valid candidate motion vectors;
            otherwise, if the number of same field candidate motion vectors is greater than or equal to the number of opposite field candidate motion vectors, selecting one of the same field candidate motion vectors, and otherwise, selecting one of the opposite field candidate motion vectors.

2. The method of claim 1 wherein the decoding further includes reconstructing the field motion vector based at least in part on the motion vector predictor and motion vector differential information.

3. The method of claim 2 wherein the motion vector differential information indicates that no motion vector differential is present for the field motion vector.

4. The method of claim 1 wherein the number of valid candidate motion vectors is less than three, and wherein the calculating further comprises:

selecting one of the valid candidate motion vectors to use as the motion vector predictor without computing the median of the valid candidate motion vectors.

5. The method of claim 1 wherein the current macroblock is a two field motion vector macroblock.

6. The method of claim 1 wherein the current macroblock is a four field motion vector macroblock.

7. The method of claim 1 wherein at least one of the one or more valid candidate motion vectors is a frame motion vector from a neighboring macroblock.

8. The method of claim 1 wherein at least one of the one or more valid candidate motion vectors is a field motion vector from a neighboring macroblock.

9. The method of claim 1 wherein the interlaced frame coded picture is an interlaced P-frame.

10. The method of claim 1 wherein the computing the median uses a component-wise median operation.

11. The method of claim 1 wherein each of the one or more valid candidate motion vectors is characterized by being for a block, macroblock field, macroblock field portion, or macroblock within the interlaced frame coded picture.

12. The method of claim 1 wherein each of the one or more valid candidate motion vectors is characterized by being for a block, macroblock field, macroblock field portion, or macroblock within the same slice as the current macroblock.

13. The method of claim 1 wherein each of the one or more valid candidate motion vectors is characterized by being an actual motion vector value and not for an intra block, macroblock field, macroblock field portion, or macroblock.

14. The method of claim 1 wherein the calculating the motion vector predictor biases selection of the same field candidate motion vectors over the opposite field candidate motion vectors, and wherein the calculating the motion vector predictor biases selection of the one or more valid candidate motion vectors in the order: left candidate, top candidate, other candidate.

15. A computing device that implements a video decoder, wherein the computing device includes a processor, memory, an input device, an output device, a network connection and computer-readable storage media, and wherein the computer-readable storage media stores computer-executable instructions for causing the computing device to perform a method of decoding encoded video information using the video decoder, the method comprising:
receiving encoded video information in a bitstream; and
with the video decoder, decoding a current interlaced frame coded picture using the encoded video information, wherein the decoding includes motion vector prediction for a field motion vector for a current field of a current macroblock in the current interlaced frame coded picture, and wherein the motion vector prediction includes:
with the video decoder, determining one or more candidate motion vectors for predicting the field motion vector for the current field of the current macroblock in the current interlaced frame coded picture, wherein the current field has a polarity, and wherein the field motion vector and the one or more candidate motion vectors refer to a reference frame;
with the video decoder, determining a field polarity for each of the one or more candidate motion vectors, including, for each of the one or more candidate motion vectors, determining whether the candidate motion vector refers to a same polarity field or opposite polarity field in the reference frame, relative to the polarity of the current field; and
with the video decoder, calculating a motion vector predictor for the field motion vector based at least in part on the one or more field polarities of the one or more candidate motion vectors, wherein the calculating the motion vector predictor includes:
determining a number of valid candidate motion vectors;
determining a number of same field candidate motion vectors;
determining a number of opposite field candidate motion vectors; and
determining the motion vector predictor depending on the number of candidate motion vectors, the number of same field candidate motion vectors and the number of opposite field candidate motion vectors, including, when the number of valid candidate motion vectors is three:
if the number of same field candidate motion vectors is three or the number of opposite field candidate motion vectors is three, computing median of the valid candidate motion vectors;
otherwise, if the number of same field candidate motion vectors is greater than or equal to the number of opposite field candidate motion vectors, selecting one of the same field candidate motion vectors, and otherwise, selecting one of the opposite field candidate motion vectors.

16. The computing device of claim 15 wherein the one or more candidate motion vectors are measured in quarter-pixel increments.

17. The computing device of claim 15 wherein, for each of the one or more candidate motion vectors, the determining the field polarity comprises performing a bitwise AND operation on a y-component of the candidate motion vector.

18. The computing device of claim 15 wherein the current macroblock is a two field motion vector macroblock.

19. The computing device of claim 15 wherein the current macroblock is a four field motion vector macroblock.

20. The computing device of claim 15 wherein at least one of the one or more candidate motion vectors is a frame motion vector from a neighboring macroblock.

21. The computing device of claim 15 wherein at least one of the one or more candidate motion vectors is a field motion vector from a neighboring macroblock.

22. The computing device of claim 15 wherein the decoding further includes reconstructing the field motion vector based at least in part on the motion vector predictor and motion vector differential information.

23. The computing device of claim 22 wherein the motion vector differential information indicates that no motion vector differential is present for the field motion vector.

24. The computing device of claim 15 wherein, for each of the one or more candidate motion vectors, the determining the field polarity for the candidate motion vector comprises determining whether the candidate motion vector indicates a displacement in the top field or the bottom field of the reference frame.

25. The computing device of claim 15 wherein, for each of the one or more candidate motion vectors, the determining the field polarity for the candidate motion vector comprises determining whether the candidate motion vector indicates a displacement within the reference frame at the same polarity field or the opposite polarity field.

26. The computing device of claim 15 wherein the calculating the motion vector predictor biases selection of the same field candidate motion vectors over the opposite field candidate motion vectors, and wherein the calculating the motion vector predictor biases selection of the one or more valid candidate motion vectors in the order: left candidate, top candidate, other candidate.

27. The computing device of claim 15 wherein the computing the median uses a component-wise median operation.

28. A method of encoding video information using a video encoder, the method comprising:
with the video encoder, encoding a current interlaced frame coded picture to produce encoded video information, wherein the encoding includes motion vector prediction for a field motion vector for a current field of a current macroblock in the current interlaced frame coded picture, and wherein the motion vector prediction includes:
with the video encoder, determining one or more valid candidate motion vectors for predicting the field motion vector for the current field of the current macroblock in the current interlaced frame coded picture, wherein the current field has a polarity, and wherein the field motion vector and the one or more valid candidate motion vectors refer to a reference frame;
with the video encoder, determining a field polarity for each individual valid candidate motion vector of the one or more valid candidate motion vectors, including determining whether, relative to the polarity of the current field, the individual valid candidate motion vector refers to a same polarity field in the reference frame or opposite polarity field in the reference frame;
with the video encoder, allocating each individual valid candidate motion vector to one of two sets depending on its field polarity; and
with the video encoder, calculating a motion vector predictor for the field motion vector based at least in part on one or more of the two sets, wherein the calculating the motion vector predictor includes:
determining a number of valid candidate motion vectors;
determining a number of same field candidate motion vectors;
determining a number of opposite field candidate motion vectors; and
determining the motion vector predictor depending on the number of valid candidate motion vectors, the number of same field candidate motion vectors and the number of opposite field candidate motion vectors, including, when the number of valid candidate motion vectors is three:
if the number of same field candidate motion vectors is three or the number of opposite field candidate motion vectors is three, computing median of the valid candidate motion vectors;
otherwise, if the number of same field candidate motion vectors is greater than or equal to the number of opposite field candidate motion vectors, selecting one of the same field candidate motion vectors, and otherwise, selecting one of the opposite field candidate motion vectors; and
outputting the encoded video information in a bitstream.

29. The method of claim 28 wherein the two sets consist of an opposite polarity set and a same polarity set.

30. The method of claim 29 wherein the calculating a motion vector predictor comprises selecting a dominant polarity valid candidate motion vector.

31. The method of claim 30 wherein the selecting a dominant polarity valid candidate motion vector comprises selecting a first valid candidate motion vector in a specified selection order.

32. The method of claim 29 wherein the allocating comprises allocating only one same polarity valid candidate motion vector to the same polarity set and allocating only one opposite polarity valid candidate motion vector to the opposite polarity set, and wherein the calculating a motion vector predictor comprises selecting the same polarity valid candidate motion vector.

33. The method of claim 28 wherein the allocating comprises allocating three valid candidate motion vector to one of the two sets and allocating no valid candidate motion vectors to the other of the two sets.

34. The method of claim 33 wherein the calculating a motion vector predictor comprises performing a median operation on the three valid candidate motion vectors.

35. The method of claim 28 wherein the calculating the motion vector predictor biases selection of the same field candidate motion vectors over the opposite field candidate motion vectors, and wherein the calculating the motion vector predictor biases selection of the one or more valid candidate motion vectors in the order of left candidate, top candidate, other candidate.

36. A method of decoding encoded video information using a video decoder, the method comprising:
receiving encoded video information in a bitstream; and
with the video decoder, decoding a current interlaced frame coded picture using the encoded video information, wherein the decoding includes motion vector prediction for a field motion vector for a current field of a current macroblock in the current interlaced frame coded picture, and wherein the motion vector prediction includes:
with the video decoder, determining one or more valid candidate motion vectors for predicting the field motion vector for the current field of the current macroblock in the current interlaced frame coded picture, wherein the current field has a polarity, and wherein the field motion vector and the one or more valid candidate motion vectors refer to a reference frame;
with the video decoder, determining a field polarity for each individual valid candidate motion vector of the one or more valid candidate motion vectors, including determining whether, relative to the polarity of the current field, the individual valid candidate motion vector refers to a same polarity field in the reference frame or opposite polarity field in the reference frame;
with the video decoder, allocating each individual valid candidate motion vector to one of two sets depending on its field polarity; and
with the video decoder, calculating a motion vector predictor for the field motion vector based at least in part on one or more of the two sets, wherein the calculating the motion vector predictor includes:
determining a number of valid candidate motion vectors;
determining a number of same field candidate motion vectors;
determining a number of opposite field candidate motion vectors; and
determining the motion vector predictor depending on the number of valid candidate motion vectors, the number of same field candidate motion vectors and the number of opposite field candidate motion vectors, including, when the number of valid candidate motion vectors is three:
if the number of same field candidate motion vectors is three or the number of opposite field candidate motion vectors is three, computing median of the valid candidate motion vectors; otherwise, if the number of same field candidate motion vectors is greater than or equal to the number of opposite field candidate motion vectors, selecting one of the same field candidate motion vectors, and otherwise, selecting one of the opposite field candidate motion vectors.

37. The method of claim 36 wherein the two sets consist of an opposite polarity set and a same polarity set.

38. The method of claim 36 wherein the calculating the motion vector predictor biases selection of the same field candidate motion vectors over the opposite field candidate motion vectors, and wherein the calculating the motion vector predictor biases selection of the one or more valid candidate motion vectors in the order of left candidate, top candidate, other candidate.

* * * * *